United States Patent [19]

Okada et al.

[11] Patent Number: 5,477,405
[45] Date of Patent: Dec. 19, 1995

[54] PLURAL TRACK HEAD MAGNETIC RECORDING/REPRODUCING ARRANGEMENT

[75] Inventors: Masaru Okada; Yuichiro Murata; Shinichiro Eguchi, all of Amagasaki, Japan

[73] Assignee: Mitsubishi Denki Kabushiki Kaisha, Tokyo, Japan

[21] Appl. No.: 279,083

[22] Filed: Jul. 22, 1994

Related U.S. Application Data

[63] Continuation of Ser. No. 980,916, Nov. 24, 1992, abandoned.

[30] Foreign Application Priority Data

Nov. 27, 1991 [JP] Japan .................................. 3-312557
Aug. 5, 1992 [JP] Japan .................................. 4-208888
Aug. 5, 1992 [JP] Japan .................................. 4-208907

[51] Int. Cl.$^6$ .................................................. G11B 5/265
[52] U.S. Cl. ........................................................ 360/121
[58] Field of Search ................................. 360/121, 125, 360/119, 122

[56] References Cited

U.S. PATENT DOCUMENTS 5,057,957  10/1991  Ito et al. ................................ 360/121

FOREIGN PATENT DOCUMENTS 50-15520  2/1975  Japan .

Primary Examiner—Robert S. Tupper
Attorney, Agent, or Firm—Burns, Doane, Swecker & Mathis

[57] ABSTRACT

A multiple head arrangement for recording and reproducing magnetic information on a magnetic recording medium. The head structure includes an I core body and two core half bodies. A first glass member is interposed between the I core body and the first core half body at a position laterally adjacent a first read/write gap and a second glass member is interposed between the I core body and the second core half body at a position laterally adjacent a second read/write gap. A non-magnetic thin film insulation layer is interposed between the first and second core half bodies and substantially perpendicularly with respect to the read/write gaps.

14 Claims, 100 Drawing Sheets

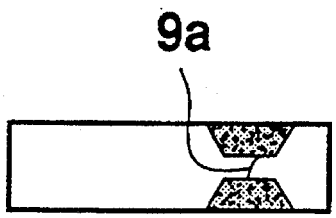
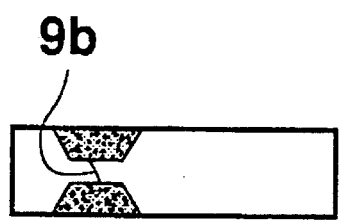
Fig. 19A     Fig. 20A
PRIOR ART   PRIOR ART
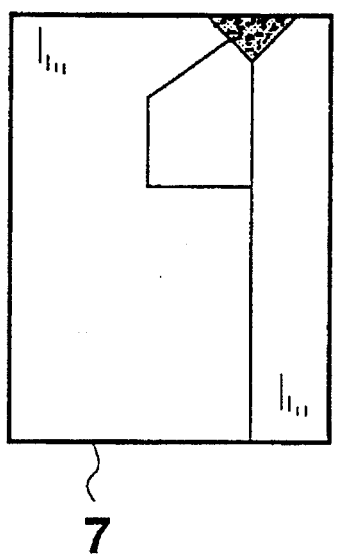
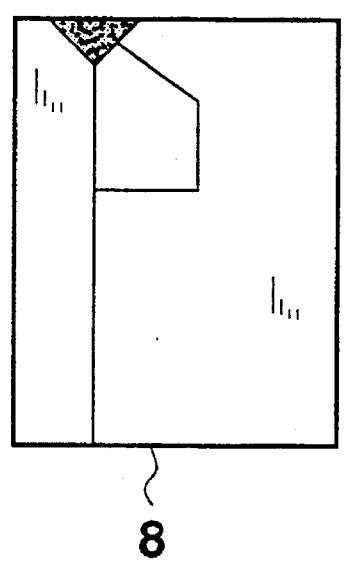
Fig. 19B     Fig. 20B
PRIOR ART   PRIOR ART

CONVENTIONAL RECORDING PATTERN

PRESENT RECORDING PATTERN

PLURAL TRACK HEAD MAGNETIC RECORDING/REPRODUCING ARRANGEMENT

This application is a continuation of application Ser. No. 07/980,916, filed Nov. 24, 1992, now abandoned.

BACKGROUND OF THE INVENTION i) Field of the Invention

The present invention relates to a combined magnetic head for carrying out a recording and a reproducing of magnetic information against a plurality of data tracks of a magnetic recording medium For use in a magnetic recording and reproducing apparatus such as a floppy disk drive, a VCR (video cassette recorder) or the like, and a producing method of the combined magnetic head.

ii) Description of the Related Arts

FIG. 17 shows a combined magnetic head of a tunnel erase system mounted on a conventional FDD (floppy disk drive), as disclosed in "All About Floppy Disk Drive", by Shoji TAKAHASHI, publishedon Nov. 15, 1989, CQ Publishing Co., Ltd., Japan. The combined magnetic head is comprised of a read/write core 1, an erase core 2, a read/write gap 3, an erase gap 4, a read/write coil 5 wound around the read/write core 1, and an erase coil 6 wound around the erase core 2. Also, the read/write core 1 and the read/write coil. 5 constitute a read/write head, and the erase core 2 and the erase coil 6 constitute an erase head.

FIG. 18 is an enlarged view showing a disk contact surface of the combined magnetic head shown in FIG. 17. The combined magnetic head of 3.5 inches, 1 Mbyte has dimensions concerning the read/write gap 3 and the erase gap 4 such as a read/write gap length of 1.5 µm, an erase gap length of 2.5 µm, a track width of 131 µm of the read/write head, a track width of 71 µm×2 of the erase head, and a gap distance of 590 µm between two gaps with respect to one data track of the floppy disk drive.

FIGS. 19A and 19B and FIGS. 20A and 20B show a combined magnetic head of a double aizimuth system (gap surfaces of two magnetic heads are not parallel with each other and have an azimuth angle), to be used as a magnetic head of a VCR different from the tunnel erase system, as disclosed in, for example, "Magnetic Head Technique", Trikeps Co., Ltd. FIGS. 19A and 20A are elevational views seen from the tape slide surface side, and FIGS. 19B and 20B are front views. This combined magnetic head comprises a magnetic head 7 having a read/write gap 9a for a long time period recording mode (EP mode) and a magnetic head 8 having a read/write gap 9b for a short time period recording mode (SP mode). In this case, a large different point between the two magnetic heads 7 and 8 is that a track width for read/write of the EP mode magnetic head 7 is narrower than that of the SP mode magnetic head 8.

Next, the operation of the combined magnetic head of the tunnel erase system shown in FIGS. 17 and 18 will now be described. The combined magnetic head acts as an electromagnetic transducer or a magnetoelectric transducer for performing a recording and reproducing of magnetic information against a plurality of data tracks of a magnetic recording medium in a floppy disk drive.

First, at writing time when the combined magnetic head acts as the electromagnetic transducer, the floppy disk drive flows a current corresponding to a data signal of writing information to the read/write coil 5 of the combined magnetic head so as to generate a strong magnetic field near the read/write gap 3 according to the current value. By this magnetic field, the magnetic recording medium of the magnetic disk surface is magnetized to carry out the writing of the data signal thereon.

Next, at reading time when the combined magnetic head acts as the magnetoelectric transducer, the magnetic flux of the magnetic recording medium magnetized as described above interlinks with the read/write coil 5 to induce a voltage in the read/write coil 5, and at this time, a current flowing in the read/write coil 5 is picked up to perform the reading of the recording information.

Assuming that the magnetic head is always located in the center of the data track and there is no position shift (off-track) of the magnetic head in the reading processing, it is sufficient to provide only the read/write head for the magnetic head and no erase head is required. However, actuality, the magnetic head usually is somewhat off-track from the center of the track. Accordingly, in order to ensure a guard band between the data recorded on the adjacent data tracks even when the off-track is generated, the erase head is provided in rear of the read/write head. Further, after the data are firstly written on the data track at the read/write gap 3, a trimming erasing is usually carried out at the erase gap 4.

In turn, as the technique for obtaining a large capacity (high density) of the floppy disk drive, there are two methods, that is, (1) by raising the track density on the magnetic recording medium surface, the number of the tracks is increased, and (2) by raising the line recording density (bit density), the number of the bits to be recorded on one track is increased.

In order to increase the track density, as a countermeasure of the off-track in which the magnetic head is somewhat shifted from the center of the track, it is insufficient to execute a positioning of the head by an open loop system by means of a stepping motor used in a conventional floppy disk drive. Hence, a closed loop (track servo) system is used. That is, a servo signal as a special signal used for positioning the magnetic head is written on the magnetic recording medium, and the servo signal is then read out of the magnetic recording medium. Then, by this servo signal, the position of the head is always corrected and the head is controlled so as to be always positioned in the right position.

In the floppy disk drive using this system, of course, the erase head is not used. However, when an overwrite characteristic of the floppy disk drive is attached much importance, for example, in case of using a barium ferrite medium having a bad overwrite performance, the erase head can sometimes be provided in front of the read/write head.

Further, when a floppy: disk drive having a large capacity due to the high track density is implemented, a problem arises, concerning compatibility with a conventional low density floppy disk drive. It is necessary for the magnetic head of the large capacity floppy disk drive to deal with both the high and low of the track density. In order to solve this problem, for example, in a floppy disk drive, as disclosed in Japanese Patent Laid-Open No. Sho 63-103408, a combined magnetic head composed of a low density magnetic head and a high density magnetic head arranged in parallel with each other at a predetermined interval is used.

Next, as to a VCR head used in the VCR for executing the recording and reproducing of image data against the magnetic recording medium in a similar manner to the floppy disk drive, a basic operational principle as an electromagnetic transducer and a magnetoelectric transducer is the same as the magnetic head of the floppy disk drive. In a usual VCR now in wide spread use, two magnetic heads for the wide and narrow track widths are used. In this case, when recording a high quality image, the writing and reading are carried out by the magnetic head for the wide track width, and, in case of a long time recording and reproducing with a small tape consumption amount, the magnetic head for the narrow track width is used to perform the recording and reproducing of the high track density.

In the VCR, of course, the off-track countermeasure is taken, and the closed loop system used in the large capacity floppy disk drive described above is frequently used. Thus, the servo signals for positioning the head are recorded on a video tape outside an image record area.

Further, as the prior art of the present invention, a variety of heads have been proposed, for example, a twin core head including two cores 12 composed of a ferrite and gaps 14, as shown in FIG. 45 and disclosed in Japanese Patent Laid-Open No. Sho 63-231711, a twin core head including two cores 12 of a ferrite material, a gap 14 and coils 16 wound around the cores 12, as shown in FIG. 46 and disclosed in Japanese Patent Laid-Open No. Sho 63-20709, a twin core head including two cores 12 made of a metal magnetic multi-layer film, a gap 14 and coils 16 wound around the cores 12, and as shown in FIG. 47 and disclosed in Japanese Patent Laid-Open No. Hei 3-71407, and a triple core head including three cores 12, a gap 14 and coils 16 wound around the cores 12, as shown in FIG. 50 and disclosed in Japanese Patent Laid-Open No. Hei 2-187909. These heads are all combined magnetic heads to be used in a magnetic recording system for recording data on a plurality of recording tracks via a guard band (unrecord area) or bands by a plurality of heads, as shown in a record magnetization pattern of the conventional magnetic heads in FIG. 48. The heads shown in FIGS. 45 to 47 have been proposed to consider the applying of the heads to an electronic still camera (video floppy), as described in their specifications. The guard band width of the electronic still camera is, for example, 40 µm as described in "In-line Gap Thin Film Head For Metal Sheet", Magnetic Recording Workshop Document MR84-31, and to take the case of the head shown in FIG. 45, a width Wo corresponds to a guard band width of 40 µm.

Also, the triple core combined magnetic head integrally composed of three magnetic heads as shown in FIG. 50 has been proposed for a recording system for recording the data on a plurality of tracks via the guard bands of the unrecord areas, as shown in a record magnetization pattern of the prior art in FIG. 51A.

As described above, in the magnetic recording system using the combined magnetic head composed of the read/write head and the erase head used in the open loop system of the conventional floppy disk drive, it is difficult to realize a large capacity floppy disk drive having a high track density and a high line recording density.

On the contrary, in the magnetic recording system of the closed loop system constituted by only the read/write head, it is necessary to provide a particular area for recording the servo signal for positioning of the head, and the data area is somewhat reduced accordingly.

Also, in the magnetic recording system using the combined magnetic head composed of the low density magnetic head and the high density magnetic head which are arranged in parallel with a predetermined interval therebetween in order to enable a lower compatibility in the large capacity floppy disk drive, the low density magnetic head and the high density magnetic head must be independently produced and are then combined with each other. Hence, the mass-productivity is low and the production cost is high.

Further, in case of the VCR head, the EP mode magnetic head and the SP mode magnetic head must be independently produced and are then combined with each other. Thus, the mass-productivity is low and the production cost is high.

Also, as to the multi track head of the electronic still camera or the like, a multi track recording via the guard bands is executed and the recording of the high track recording density can not be carried out.

Further, in the recording system where the data are recorded on the three recording tracks via the guard bands by using three magnetic heads at the same time, the high track density recording can not be performed.

Also, in a conventional magnetic head using a ferrite having a low saturation magnetic flux density and an inferior high frequency magnetic property as a core material, it is insufficient to perform a recording to a medium having a high coercive force represented by a metal medium suitable for the high density recording, and it is difficult to carry out a high frequency magnetic recording.

SUMMARY OF THE INVENTION

It is therefore an object of the present invention to provide a combined magnetic head of either a twin or triple structure in view of the aforementioned problems of the prior art, which is capable of performing a high density recording, and which has superior mass-productivity and can be produced at a low cost.

It is another object of the present invention to provide a method of producing a combined magnetic head of either a twin or triple structure in view of the aforementioned problems of the prior art, which is capable of performing a high density recording, and which has superior mass-productivity and can be produced at a low cost.

In accordance with one aspect of the present invention, there is provided a combined magnetic head for recording and reproducing magnetic information against a magnetic recording medium for use in a magnetic recording and reproducing apparatus, comprising: a pair of C core half bodies, each having a first glass member in a contact surface, a second glass member extending from a side part to the contact surface and a third glass member; a pair of I core half bodies, each having the first glass member in a contact surface and a second glass member extending from the side part of the C core half body to the contact surface; a pair of coils wound around the C core half bodies; a pair of magnetic heads, each including a track width and a read/write gap having an equal gap length and an equal gap depth; and a non-magnetic insulation layer having a thin film form with a thickness of at most 5 µm, the C core half body and the I core half body being integrated in contact with the contact surfaces by the second glass members, the two magnetic heads being symmetrically arranged in parallel via the non-magnetic insulation layer interposed therebetween, each track width being restricted by the nonmagnetic insulation layer and the first glass member adjacent to the read/write gap, the read/write gaps being aligned along an in-line, a value obtained by dividing a product of a narrower one of the two track widths and a thickness of the non-magnetic insulation layer by a product of the gap length and a length extending from a surface of the read/write gap to a front end of the third glass member of the non-magnetic insulation layer being at least 10.

In accordance with another aspect of the present invention, there is provided a combined magnetic head for recording and reproducing magnetic information against a magnetic recording medium for use in a magnetic recording and reproducing apparatus, comprising: a pair of C core half bodies, each having a first glass member in a contact surface, a second glass member extending from a side part to the contact surface and a third glass member; an I core body having two first glass members in a contact surface and a second glass member extending from the side part of the C core half body to the contact surface; a pair of coils wound around the C core half bodies; a pair of magnetic heads, each including a track width and a read/write gap having an equal gap length and an equal gap depth; and a non-magnetic insulation layer having a thin film form with a thickness of at most 5 μm, the two C core half bodies and the I core body being integrated in contact with the contact surfaces by the second glass members, the two magnetic heads being symmetrically arranged in parallel via the non-magnetic insulation layer interposed therebetween, each track width being restricted by the non-magnetic insulation layer and the first glass member adjacent to the read/write gap, the read/write gaps being aligned along an in-line, a value obtained by dividing a product of a narrower one of the two track widths and a thickness of the non-magnetic insulation layer by a product of the gap length and a length extending from a surface of the read/write gap to a front end of the third glass member of the non-magnetic insulation layer being at least 10.

The non-magnetic insulation layer is a two layer structure including a glass layer and a conductive metal layer.

One magnetic head is a lower head having a wide track width and another magnetic head is a higher head having a narrow track width.

At a recording/reproducing time, the coils are connected in series to use the two magnetic heads as a single head, and at a track positioning time, by using voltages independently readout of the two magnetic heads, a track positioning is carried out.

At a recording/reproducing time requiring a high density, the track of one magnetic head is used and the coil of another magnetic head is short-circuited during the operation of one head, and wherein at a recording/reproducing time requiring a low density, the tracks of both the magnetic heads are used.

At a recording time, the track of each magnetic head is used, and at a reproducing time, the coils are connected in series to use the two magnetic heads as a single head to make a data transfer rate double.

The combined magnetic head further comprises an erase head having approximately a double track width of the track width of one magnetic head, arranged in front of both the magnetic heads.

The combined magnetic head further comprises an erase head having approximately a double track width of the sum of the track widths of the two magnetic head, arranged in front of both the magnetic heads.

The combined magnetic head further comprises a combined magnetic head of either a tunnel erase system or a preceding erase system, arranged in parallel with both the magnetic heads at an interval therebetween.

In accordance with another aspect of the present invention, there is provided a method of producing a combined magnetic head, comprising the steps of: integrating a plurality of ferrite pieces formed with a non-magnetic film on one surface, mutually piled via the non-magnetic film, by a glass bonding method to form a ferrite piece block; integrating a pair of the ferrite piece blocks by the glass bonding method to form a ferrite piece block pair; forming necessary grooves in the ferrite piece block pair; molding glass in the grooves of the ferrite piece block pair; and forming coil grooves in the ferrite piece block pair to wind coils in the coil grooves.

Another method of producing a combined magnetic head, comprising the steps of: forming C core separation grooves in a ferrite piece to mold glass in the C core separation grooves; integrating a pair of ferrite pieces via a nonmagnetic film in contact with a glass mold side of each ferrite piece by a glass bonding method to form a C core block pair; forming grooves in the C core block pair; integrating the C core block pair and an I core ferrite piece formed with grooves by the glass bonding method; and forming coil grooves in the C core block pair to wind coils in the coil grooves.

In accordance with one aspect of the present invention, there is provided a combined magnetic head for recording and reproducing magnetic information against a magnetic recording medium for use in a magnetic recording and reproducing apparatus, comprising: first, second and third C core half bodies, each of the first and third C core half bodies having a first glass member in a contact surface, a second glass member extending from a side part to the contact surface and a third glass member, the second C core half bodies having a contact surface and the second glass member; an I core body having two first glass members in a contact surface and a second glass member extending from the side part of the C core half body to the contact surface; three coils wound around the three C core half bodies; three magnetic heads, each including a track width and a read/write gap having an equal gap length and an equal gap depth; and two non-magnetic insulation layers having a thin film form with a thickness of at most 5 μm, the three C core half bodies and the I core body being integrated in contact with the contact surfaces by the second glass members, the three magnetic heads being symmetrically arranged in parallel and in symmetric around a central magnetic head via the non-magnetic insulation layers interposed therebetween, the track width of the central magnetic head being restricted either by the two non-magnetic insulation layers; each of the track width of both side magnetic heads being restricted by the non-magnetic insulation layer and the first glass member adjacent to the read/write gap, the read/write gaps being aligned along an in-line, a value obtained by dividing a product of the track width of one of two adjacent magnetic heads and a thickness of the non-magnetic insulation layer by a product of the gap length and a length extending from a surface of the read/write gap to a front end of the third glass member of the non-magnetic insulation layer being at least 10.

The track widths of the three magnetic heads of a triple structure are equal, and a winding number of the coils is the same, and wherein a reproducing sensitivity difference of the magnetic heads is at most 10%.

In the combined magnetic head, readout signals of both the side magnetic heads are used for a track positioning of the head in a tracking servo system of a magnetic recording apparatus.

In accordance with one aspect of the present invention, there is provided a producing method of a combined magnetic head, comprising the steps of: providing C core separation grooves in a ferrite piece constituting two magnetic head part of three magnetic heads arranged in parallel via non-magnetic films to mold glass in the C core separation grooves; integrating the ferrite pieces and a ferrite piece constituting a central magnetic head in contact with the glass mold sides of the ferrite pieces via non-magnetic films therebetween by a glass bonding method to form a C core block; forming track width restriction grooves for both side magnetic heads in the C core block; integrating the C core block and an I core ferrite piece formed with grooves by the glass bonding method; and forming coil grooves in the C core block to wind coils in the coil grooves.

Still another combined magnetic head, comprises: a pair of core half bodies of a metallic multi-layer magnetic film, each body including an I core leg part and a C core leg part symmetrically arranged and a gap having an equal writing gap length and an equal gap depth, two gaps being aligned along an in-line; and a pair of read/write coils wound around the C core leg parts, the core half bodies and the read/write coils constituting two magnetic heads of a twin type.

The track widths of the two magnetic heads are equal, and the two core half bodies are symmetrical in shape around a non-magnetic film for separating a half body pair of the C core leg part, and wherein a winding number of the read/write coils of the two magnetic heads is the same, and a reproducing sensitivity difference of the two magnetic heads is at most 10%.

The value obtained by dividing a product of a narrower one of the track widths of adjacent heads and a thickness of the non-magnetic insulation layer by a product of the gap length and a length extending from a surface of the gap to a front end of a glass member of the non-magnetic film is at least 10.

One magnetic head having a narrower track width of the two magnetic heads is used solely in a high density recording operation, and in a low density recording operation, the two magnetic heads are used as a single head.

The I core leg part is either a Mn—Zn ferrite or a Ni—Zn ferrite of a single structure without including any separation insulation layer.

The combined magnetic head further comprises a tunnel erase head arranged in rear of the two magnetic heads of a twin type A further method of producing a combined magnetic head, comprises the steps of: forming a metallic multi-layer magnetic film on a ceramic piece formed with a separation groove to be formed between twin cores via a non-conductive insulation film; forming an insulation film for separating the twin cores on the ceramic piece after molding glass in the separation groove; integrating both the twin cores formed with the insulation film by welding to form a twin core block; cutting the twin core block into an I core leg part and a C core leg part to form glass grooves in both the I core leg part and the C core leg part; forming a U-shaped groove and an L-shaped groove in succession in the C core leg part and a gap material on a surface on the glass groove side; and connecting the gap material formed on the C core leg part and the I core leg part and, while glass rods are inserted in the glass grooves, integrating the I core leg part and the C core leg part by welding.

Still another method of producing a combined magnetic head, comprises the steps of: forming a separation groove for separating both magnetic heads in a pair of non-magnetic ceramic plates; forming a metallic multi-layer magnetic film on a surface formed with the separation groove; molding glass in the separation groove; integrating the ceramic plates with the contact of glass mold sides via a non-magnetic film therebetween to form a block; cutting the block in a central position of a part the metallic multi-layer magnetic films faces to each other via the non-magnetic film in a perpendicular direction to the facing surface into an I core half body and a C core half body; forming a coil winding groove in the C core half body and glass grooves in both the I core half body and the C core half body; and integrating the I core half body and the C core half body by a glass bonding method.

Another combined magnetic head of a triple structure comprises three magnetic heads, each having a gap with an equal read/write gap length and an equal gap depth; three core parts having core legs for the three magnetic heads, composed of a metallic multi-layer magnetic film except back bars; non-magnetic layers, by which the three magnetic heads are magnetically separated; and three read/write coils wound around the core legs, C core parts and I core parts of the three magnetic heads being arranged in the respective same half body sides.

The value obtained by ;dividing a product of a narrower one of the track widths of the magnetic heads and a thickness of the non-magnetic film by a product of the gap length and a length extending from a surface of the gap to a front end of a glass member of the non-magnetic film is at least 10.

The combined magnetic head further comprises an erase head having a track width wider than the sum of the track widths of the magnetic heads of the triple structure, arranged in front of, that is, an input side of a medium.

Further, a method of producing a combined magnetic head, comprises the steps of: forming separation grooves for separating two side magnetic heads from a central magnetic head in two non-magnetic ceramic pieces; forming metallic multi-layer magnetic films on surfaces formed with the separation grooves; molding glass in the separation grooves; forming further a metallic multi-layer magnetic film on the non-magnetic film of one of the ceramic pieces; integrating the two ceramic pieces by a glass bonding method to obtain a block; cutting the block in a central position of a part the metallic multi-layer magnetic films faces to each other via the non-magnetic film in a perpendicular direction to the facing surface into an I core half body and a C core half body; forming a coil winding groove in the C core half body and glass grooves in both the I core half body and the C core half body; and integrating the I core half body and the C core half body by a glass bonding method.

According to the present invention, the following effects can be obtained. That is, the cross talk between the magnetic heads arranged in parallel via a non-magnetic insulation thin film or films can be largely reduced or removed, and the head capable of a high density recording near a guard bandless can be produced at low cost.

By using the combined magnetic head according to the present invention, a twin or triple structure head having a compatibility with current or conventional 1 MB, 2 MB and 4 MB floppy disk drives is provided. Further, the combined magnetic head according to the present invention can be integrally combined with a tunnel erase head or a preceding erase head.

BRIEF DESCRIPTION OF THE DRAWINGS

The objects, features and advantages of the present invention will become more apparent from the consideration of the following detailed description, taken in conjunction with the accompanying drawings, in which:

FIGS. 19A and 19B and FIGS. 20A and 20B are top and front views of a conventional combined magnetic head of a double azimuth system mounted onto a VCR;

FIG. 34 is a perspective view of a twin head chip produced in the process shown in FIGS. 23 to 34;

DESCRIPTION OF THE PREFERRED EMBODIMENTS

Figure 1:
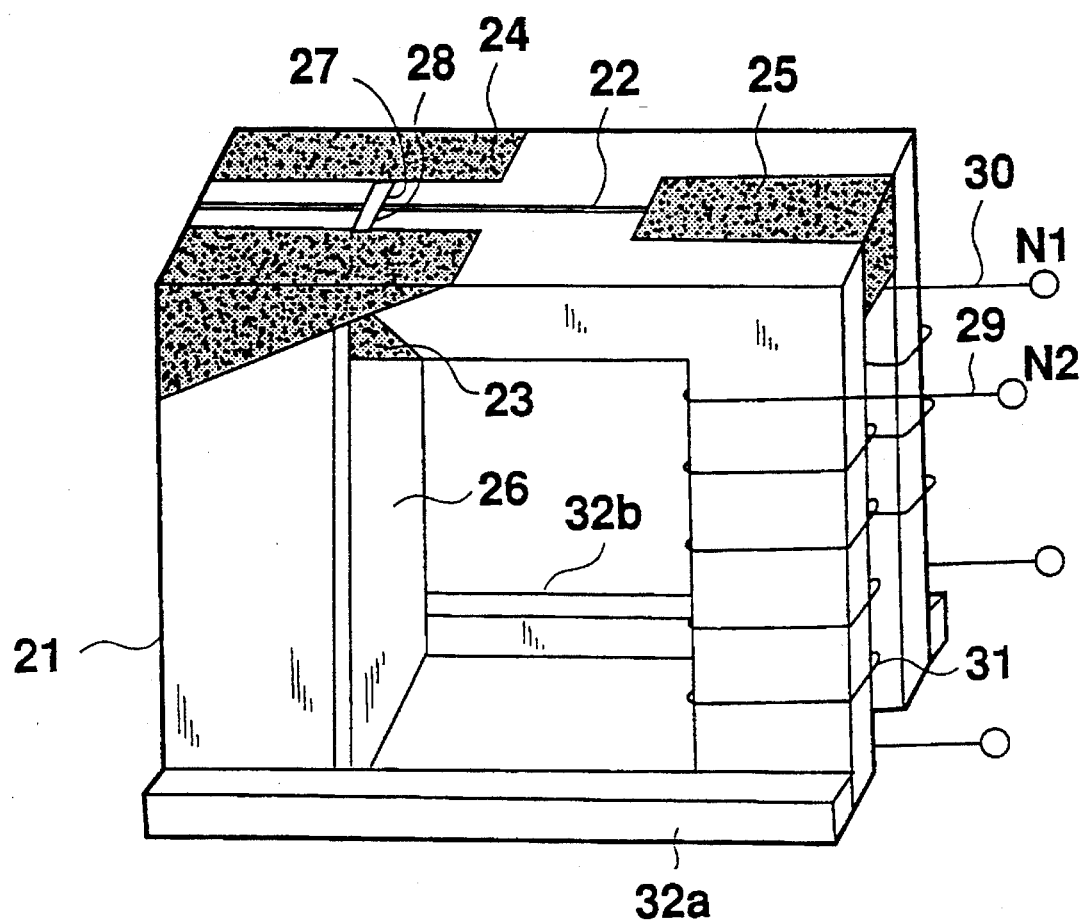
FIG. 1 is a perspective view of a first embodiment of a combined magnetic head according to the present invention.

Referring now to the drawings, wherein like reference characters designate like or corresponding parts throughout the views and thus the repeated description thereof can be omitted for brevity, there is shown in FIG. 1 the first embodiment of a combined magnetic head of a twin structure according to the present invention.

As shown in FIG. 1, thee combined magnetic head is comprised of a magnetic body (magnetic core) 21 composed of a single or poly crystalline metallic oxide such as Mn—Zn ferrite, Ni—Zn ferrite or the like constituting a magnetic circuit, a high melting point glass 22 for magnetically separating two magnetic heads, a low melting point glass 23 for integrating a magnetic core half body pair of the two magnetic heads, two low melting point glasses 24 plugged up in grooves for restricting track widths of the two magnetic heads, a low melting point glass 25 plugged up in a coil insertion groove 31 of the two magnetic heads on the magnetic disk contact surface side, a metal magnetic body 26 represented by a sendust (Fe—Si—Al) alloy, a Co—Zr—Nb amorphous alloy or the like formed by a thin film formation technique such as sputtering or the like for generating a strong magnetic field at a magnetic gap, a pair of read/write gaps 27 and 28 of the two magnetic heads, a pair of read/write coils 29 and 30 of the two magnetic heads, and a pair of back cores 32a and 32b which are attached for shunting after the coil insertion and are composed of the same material as the magnetic core 21.

In this embodiment shown in FIG. 1 as well as the other embodiments, the separation layer of the high melting point glass 22, the read/write gaps 27 and 28 and the like are shown wider than an actual width in order to make the understanding easy.

Further, the metal magnetic body 26 is formed on the gap surface of an I core half body pair arranged in the rear part with respect to the insertion direction of a magnetic disk. It is not desirable from a view point of crosstalk to form the metal magnetic body 26 on the gap surface of a C core half body pair magnetically separated. Also, relating to a ferrite head formed with the metal magnetic body 26, there is no problem even when the C core half body pair is arranged in the rear part with respect to the insertion direction of the magnetic disk. Also, at the read/write gaps 27 and 28, a thin film of a non-magnetic substance film such as $SiO_2$, $Al_2O_3$ or the like is formed by sputtering or the like.

Next, a producing method of producing the combined magnetic head shown in FIG. 1 will now be described in connection with FIGS. 2 to 13.

Figure 2:
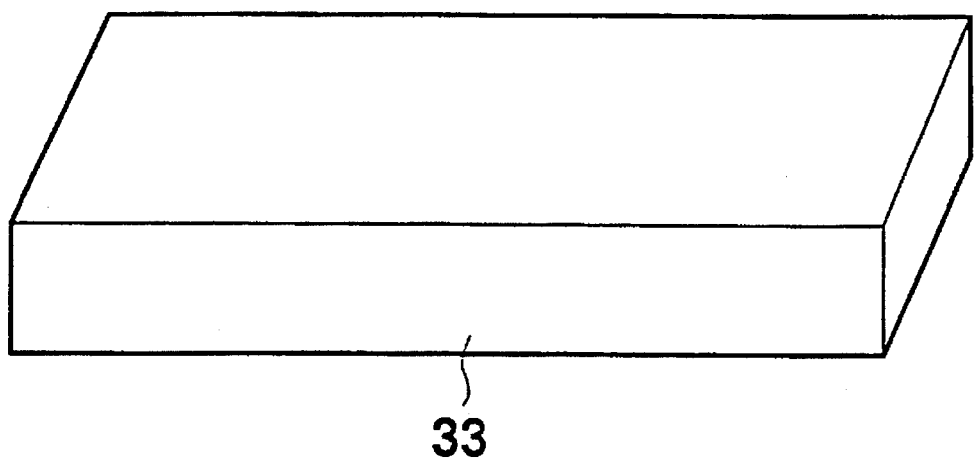
FIGS. 2 to 13 are perspective views showing a producing method of the combined magnetic head shown in FIG. 1.

First, in FIG. 2, a single or poly crystalline metallic oxide Mn—Zn ferrite piece 33 is finished to the desired dimension by a grinding processing, a lapping processing or the like, and one surface of the Mn—Zn ferrite piece 33 is finished to a mirror state for forming a thin film of a high melting point glass or a crystallized glass on the mirror finish surface.

Figure 3:
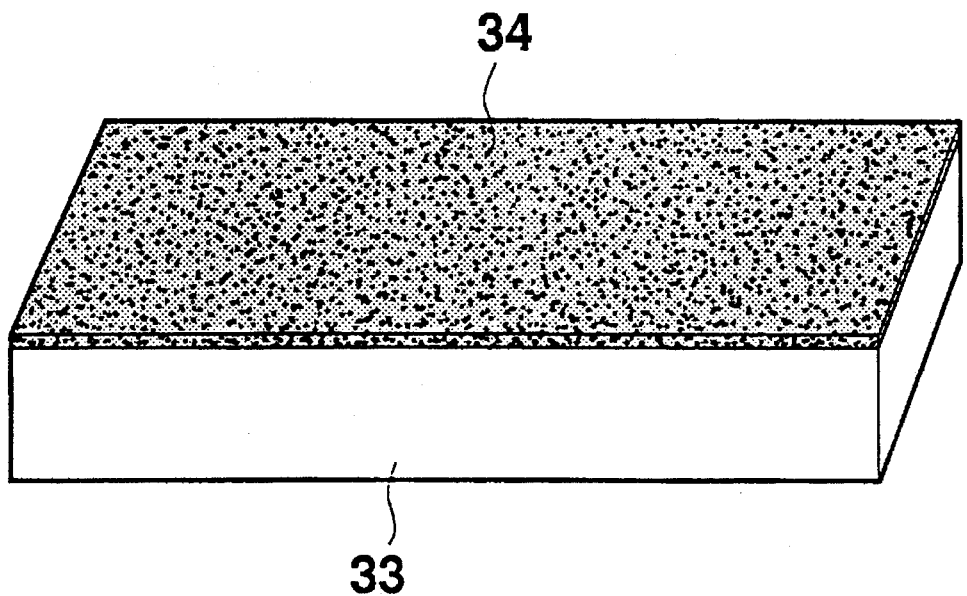

In FIG. 3, a high melting point glass (or a crystallized glass whose softening temperature becomes higher than the fusion temperature after the fusion) 34 having a thickness of ¹/₁₀ micron to several tens of microns is formed over the mirror finish surface of the Mn—Zn ferrite piece 33 by using a print method using glass powder having a small particle size, a precipitation method, a sputtering or a vapor deposition method or the like.

Figure 4:
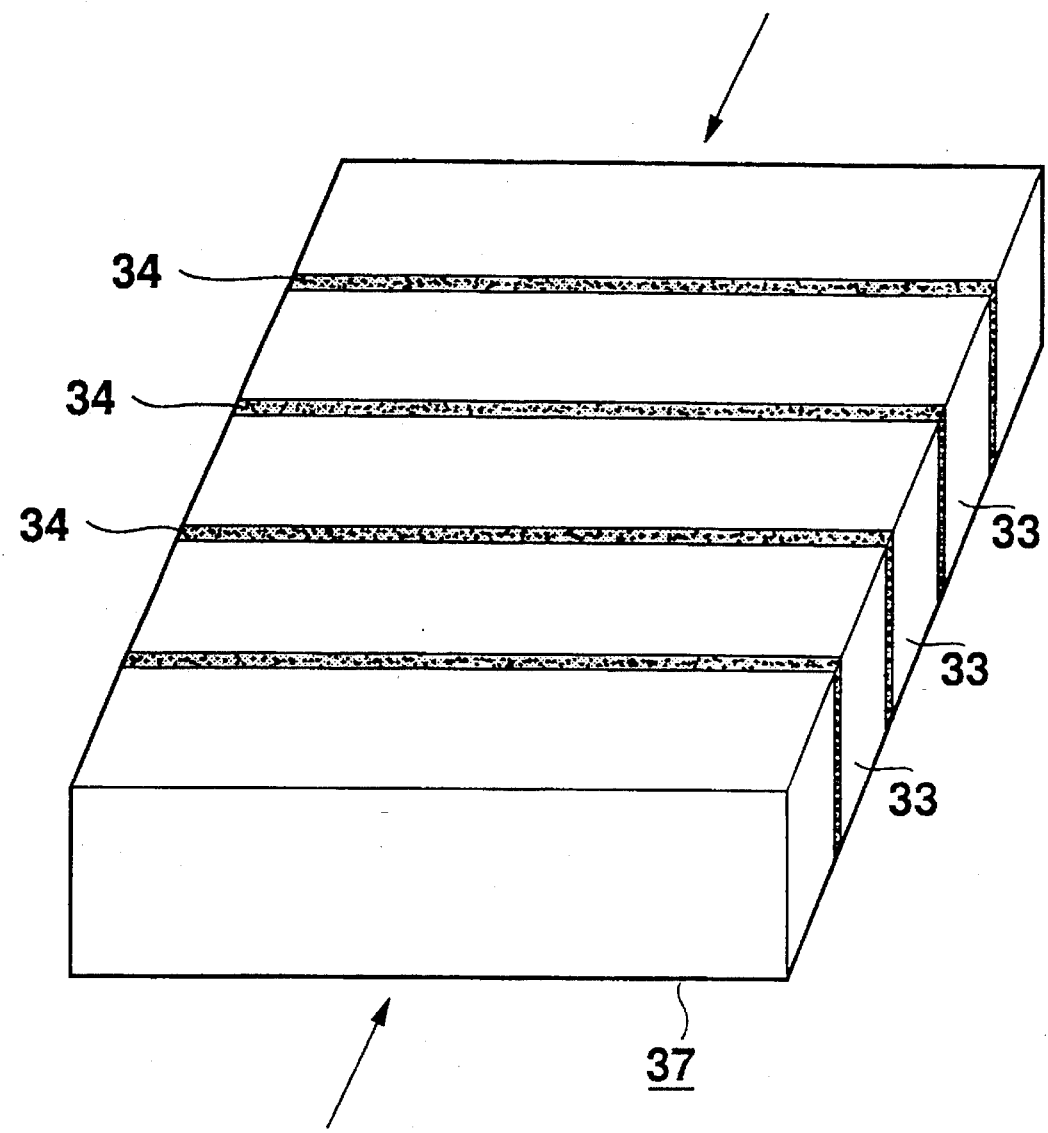

In FIG. 4, a plurality of Mn—Zn ferrite pieces 33 having the high melting point glass 34 on their one surface are piled one on another and are fused in the piled state by raising the temperature, while a load is applied to the piled ferrite pieces 33 in a direction shown by an arrow, to obtain a Mn—Zn ferrite piece block 37.

Figure 5:
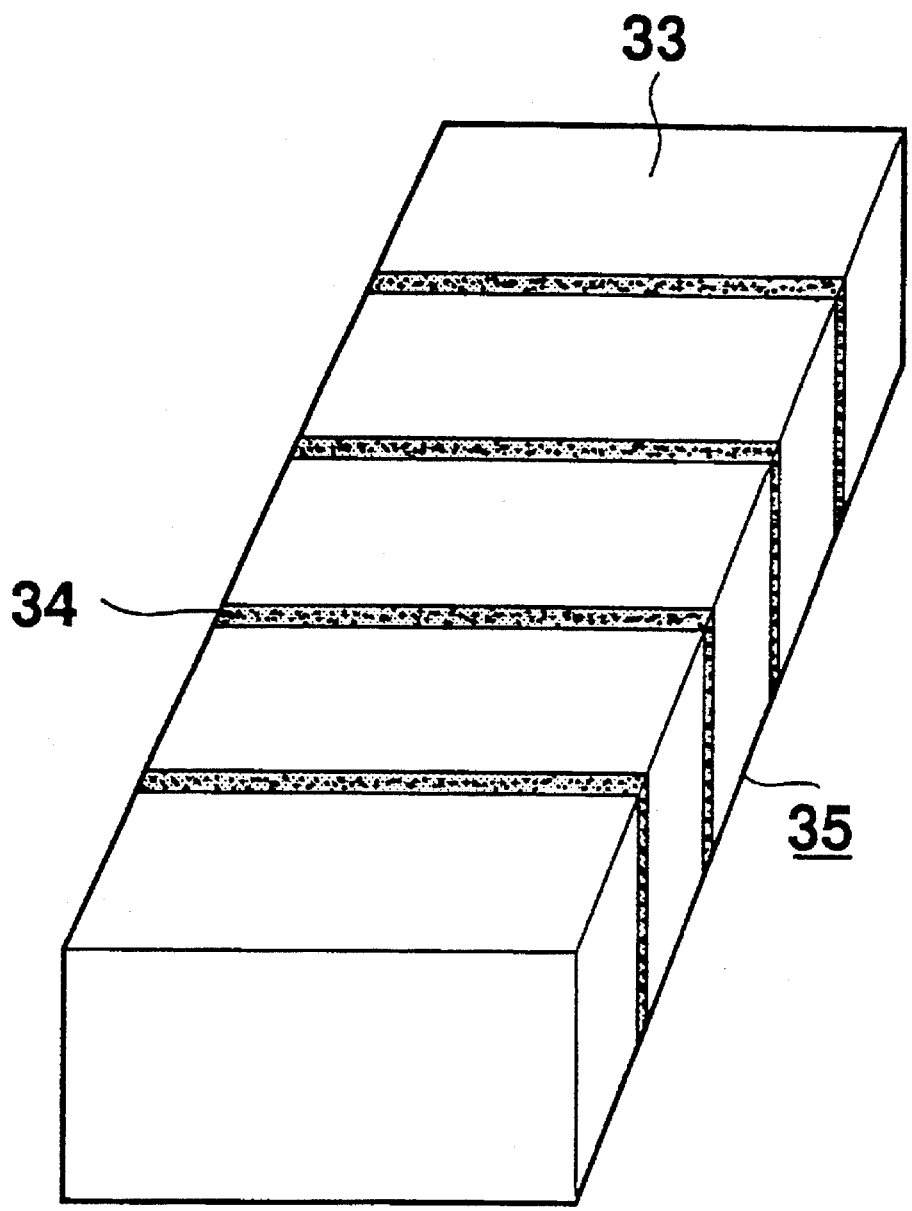

In FIG. 5, the obtained Mn—Zn ferrite piece block 37 is cut into two in a longitudinal direction to obtain two half ferrite piece blocks 35.

Figure 6:
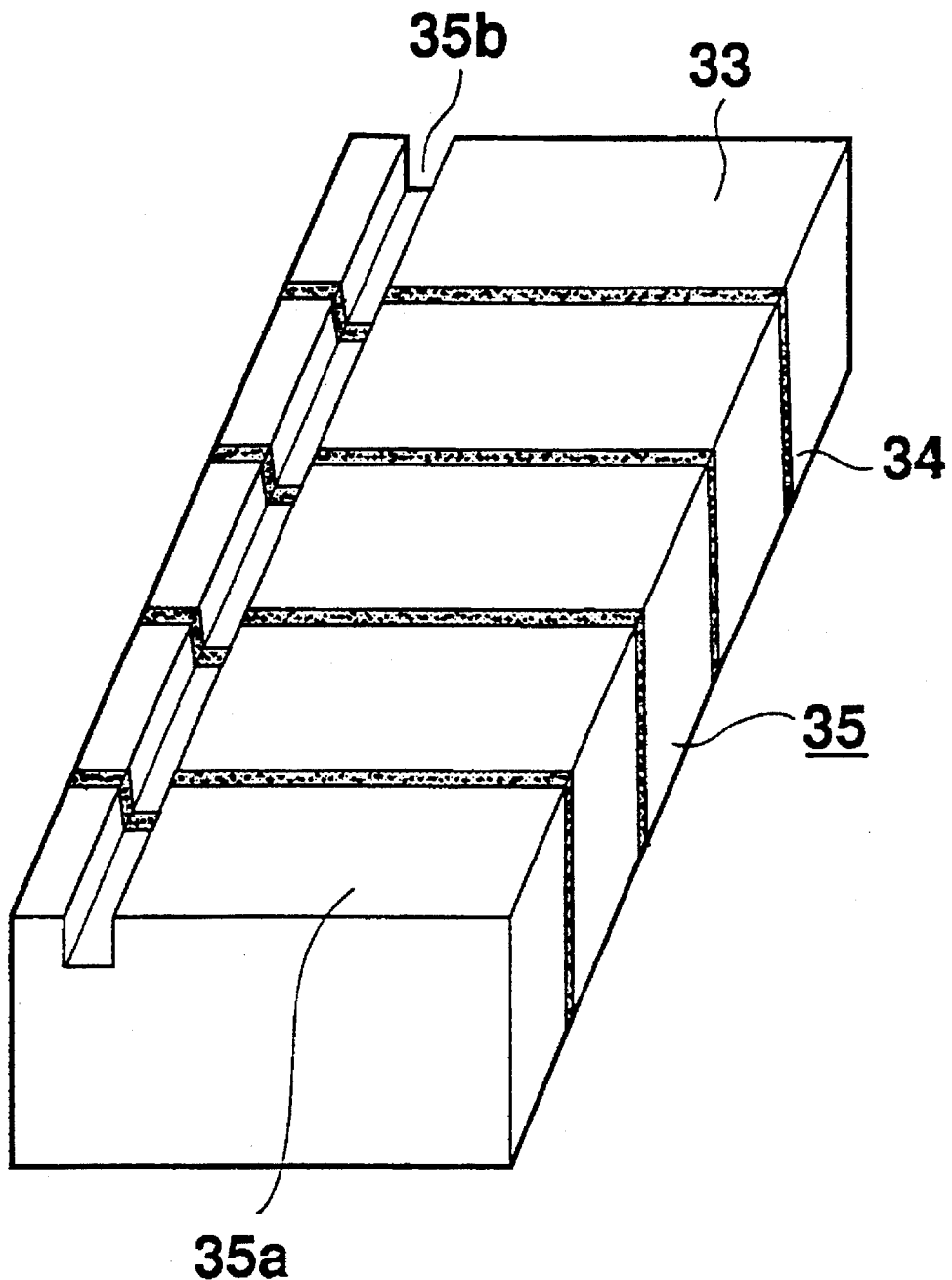

In FIG. 6, one surface of one half ferrite piece blocks 35 is polished to a mirror finish surface 35a, and a glass groove 35b for receiving a glass rod is formed on one side portion of the mirror finish surface 35a by a cutting operation using a diamond wheel or the like.

Figure 7:
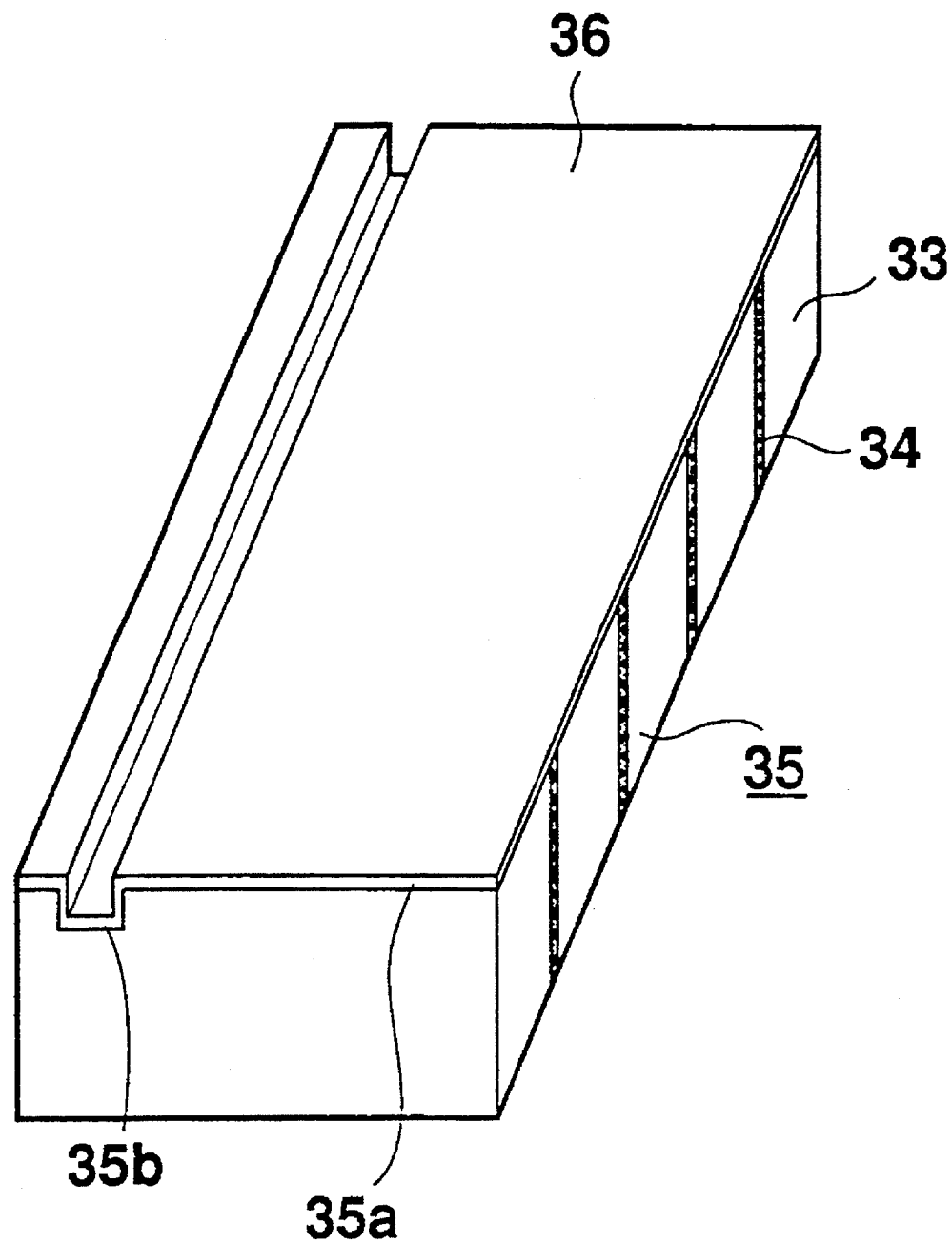

In FIG. 7, a metallic magnetic film 36 such as a sendust or the like having a thickness of several microns is formed on the surface having the glass groove 35b of the half ferrite piece block 35 and then a non-magnetic film (not shown) such as $SiO_2$, $Al_2O_3$ or the like having a thickness corresponding to half of the gap length is formed on the metallic magnetic film 36 by sputtering.

Figure 8:
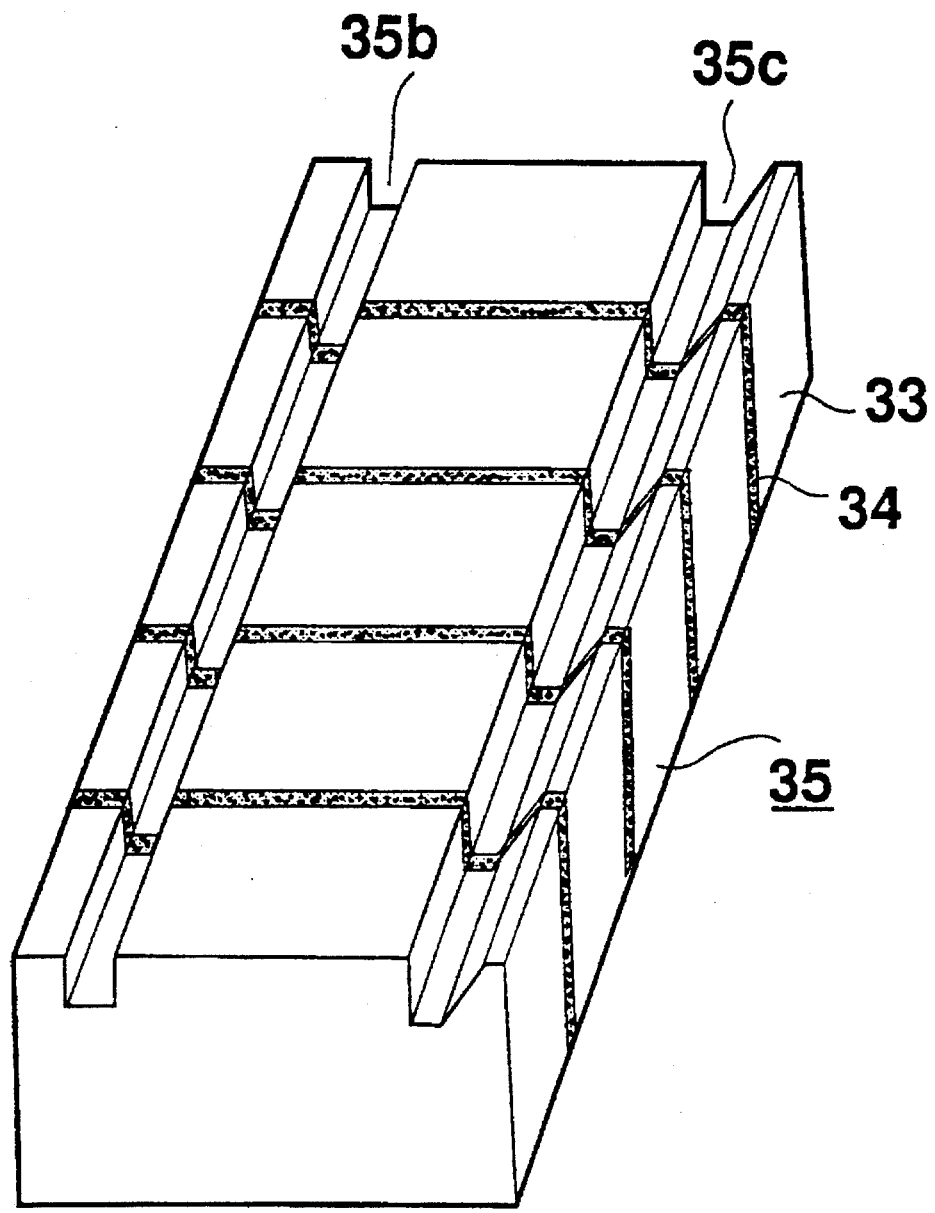

In FIG. 8, a glass groove 35b and an apex groove 35c for regulating a gap depth are formed on another half ferrite piece block 35 obtained in the step shown in FIG. 5 by a cutting operation in the same manner as the step shown in FIG. 6, and then a non-magnetic film (not shown) such as $SiO_2$, $Al_2O_3$ or the like is formed over the surface having the glass groove 35b and the apex groove 35c in the same manner as the step shown in FIG. 7.

Figure 9:
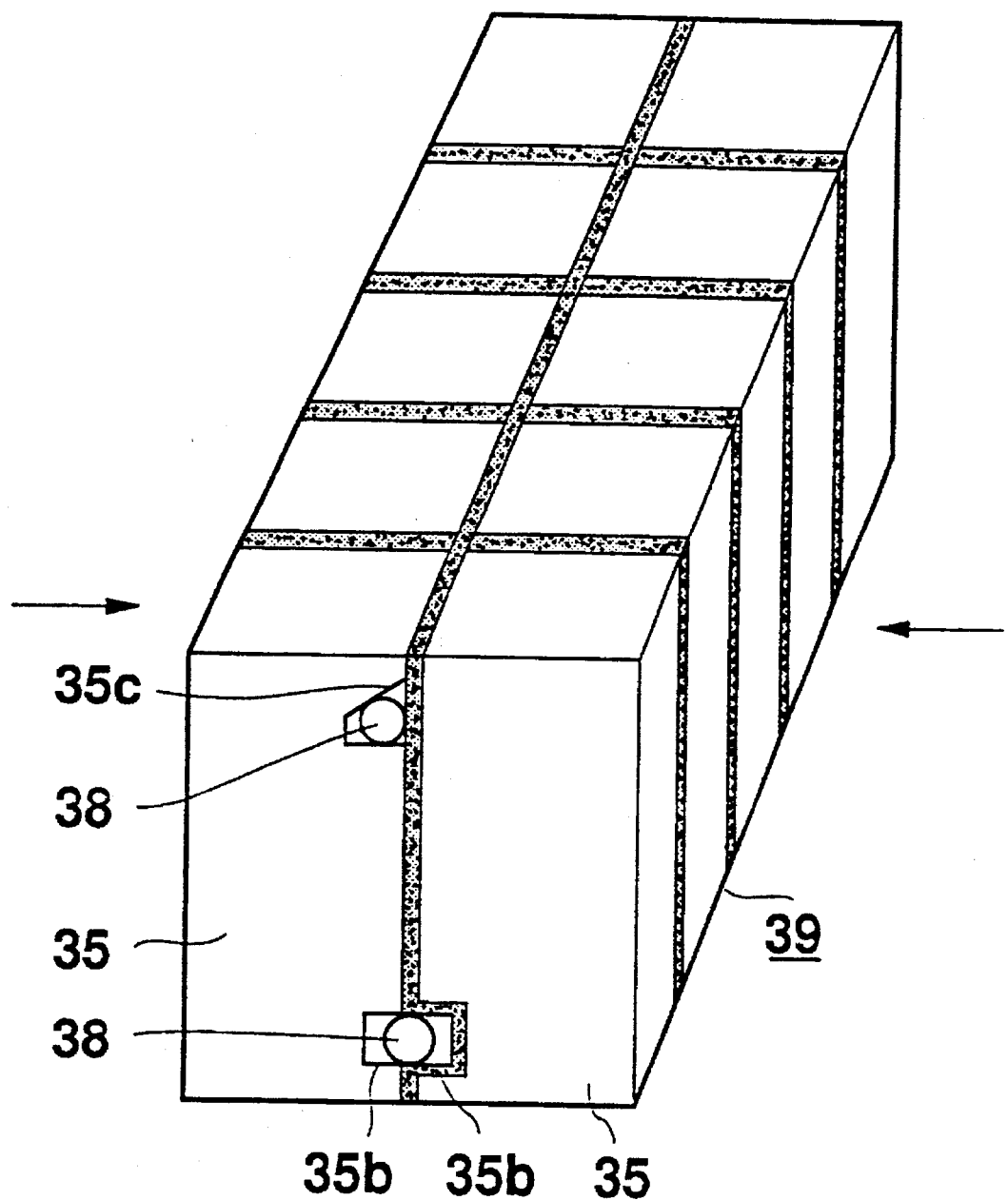

In FIG. 9, after the two half ferrite piece blocks 35 obtained in the steps shown in FIGS. 7 and 8 are assembled as shown in FIG. 9, glass rods 38 having a lower melting point than that of the high melting point glass 34 used in the step shown in FIG. 3 are inserted into the glass grooves 35b and the apex groove 35c of the half ferrite piece blocks 35, and the temperature is raised so as to fuse the glass rods 38 and to integrate the two half ferrite piece blocks 35, while the loads are applied to both the sides of the assembled half ferrite piece blocks 35 in the directions indicated by the arrows. As a result, a Mn—Zn half ferrite piece block pair 39 is formed by a so-called glass bonding method.

Figure 10:
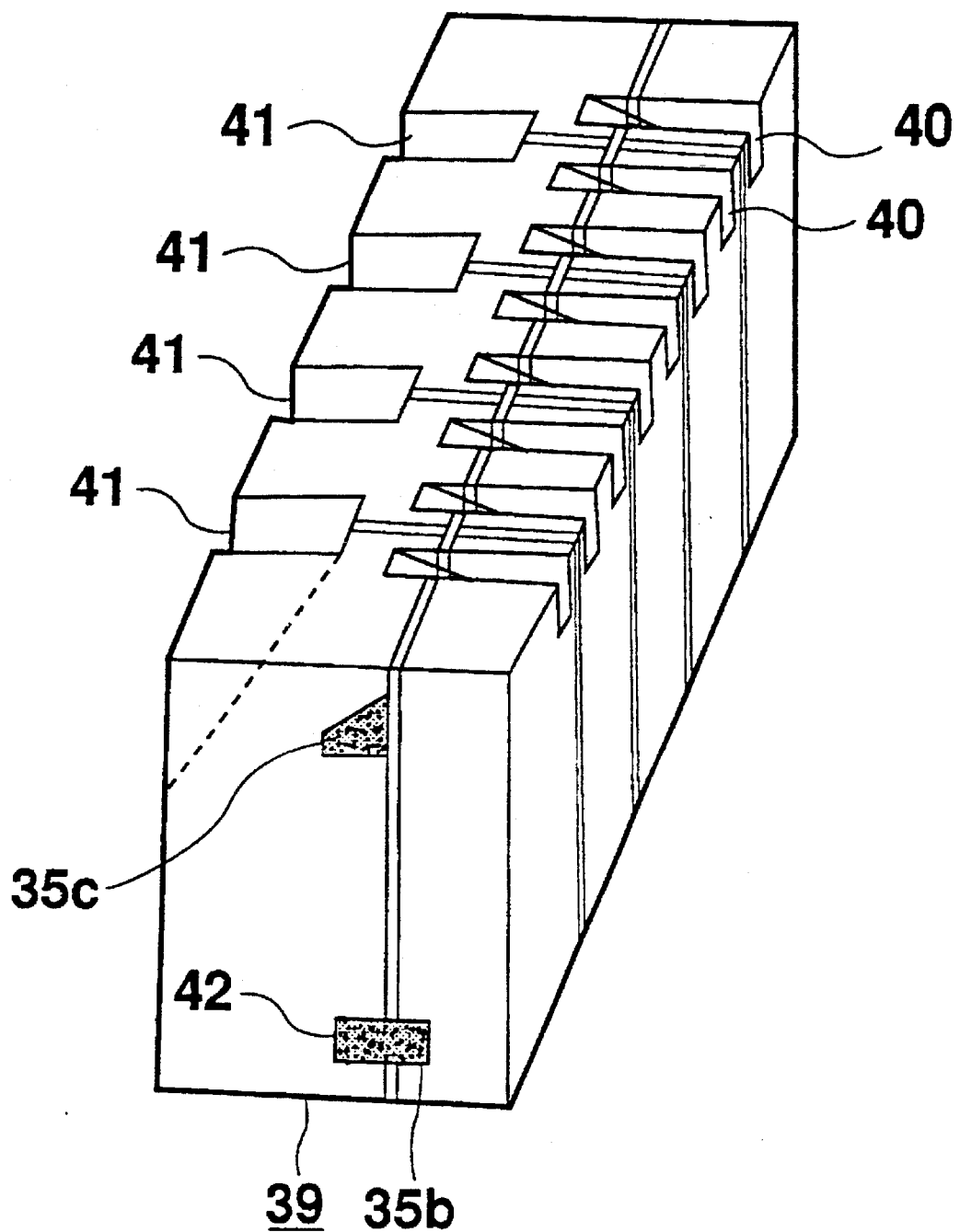

In FIG. 10, the right side surface for forming track width regulation grooves 40 in the Mn—Zn half ferrite piece block pair 39 is cut off to a predetermined dimension and the track width regulation grooves 40 are formed in the thinned right side part of the Mn—Zn half ferrite piece block pair 39 by a cutting operation. Then, head chip separation preparatory grooves 41 are formed in the opposite side to the track width regulation grooves 40 in the Mn—Zn half ferrite piece block pair 39 by a cutting operation. A numeral 42 denotes glasses molded in the glass grooves 35b and the apex groove 35c.

Figure 11:
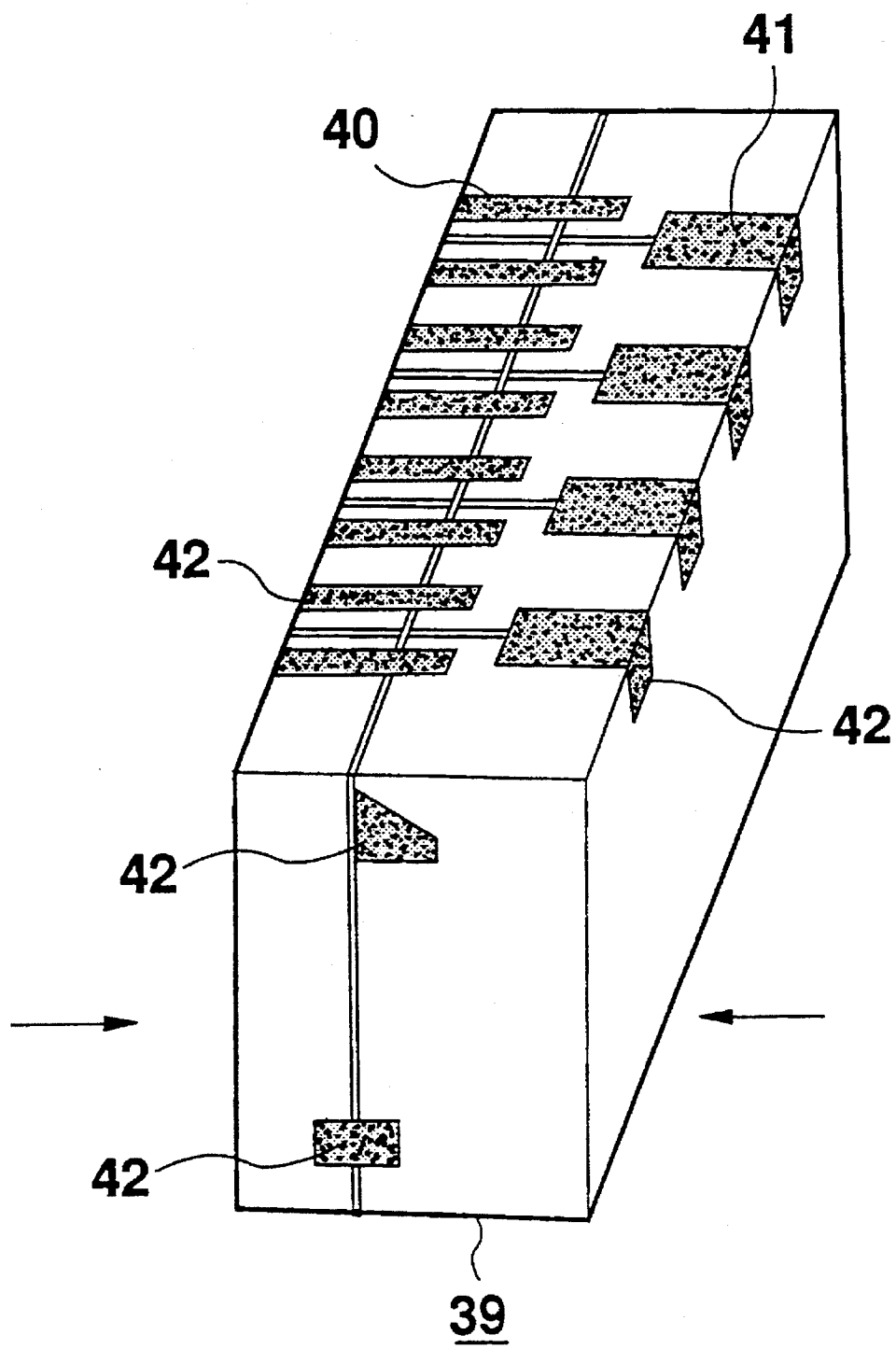
Figure 12:
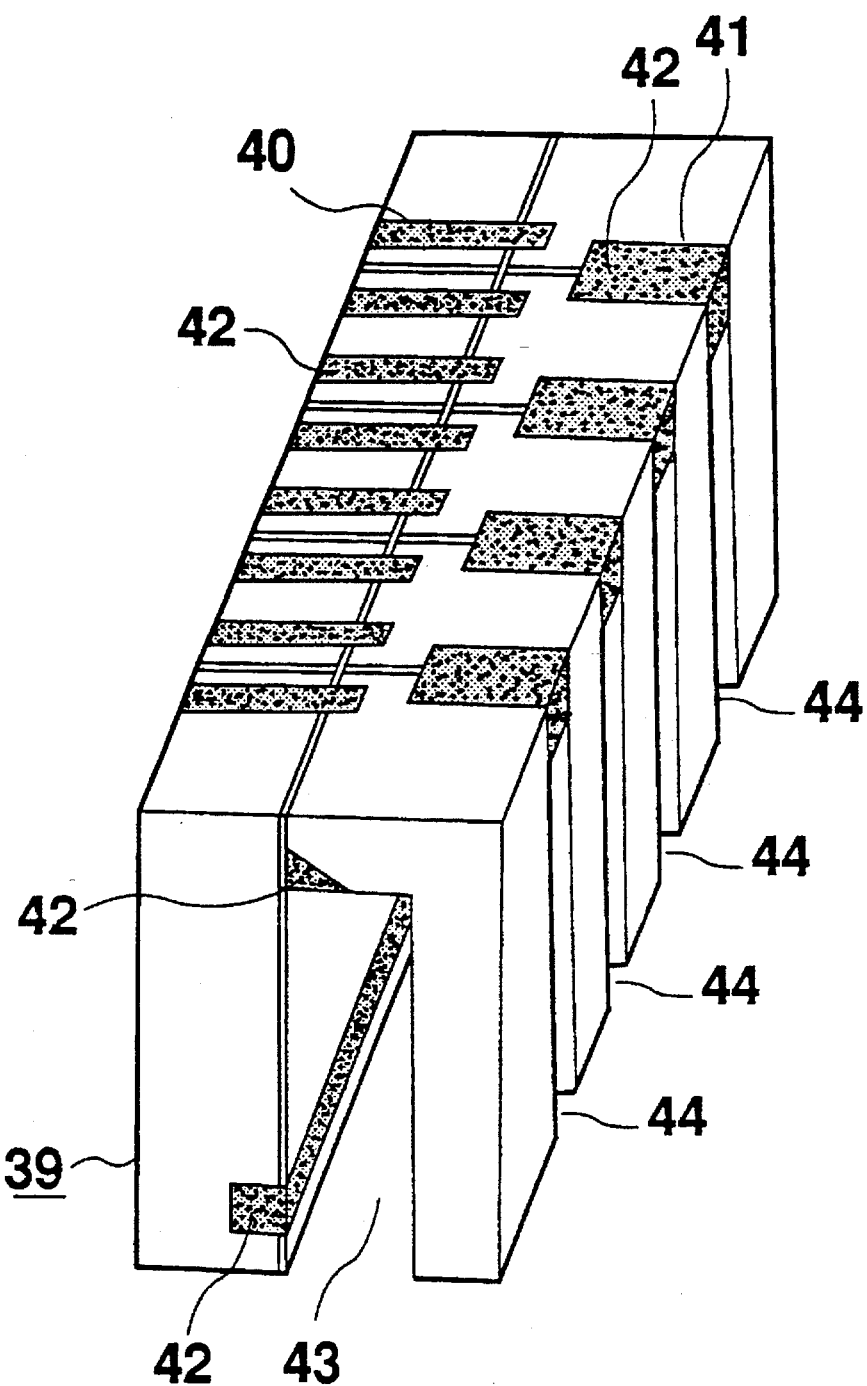

In FIG. 11, the glass rods 38 are inserted into the track width regulation grooves 40 and the head chip separation preparatory grooves 41 of the Mn—Zn half ferrite piece block pair 39, and, while the loads are applied to both the sides of the Mn—Zn half ferrite piece block pair 39 in the directions indicated by the arrows, the temperature is raised to mold the glasses 42 in the track width regulation grooves 40 and the head chip separation preparatory grooves 41. In FIG. 12, coil insertion grooves 43 and 44 are formed in the Mn—Zn half ferrite piece block pair 39 by a cutting operation.

Figure 13:
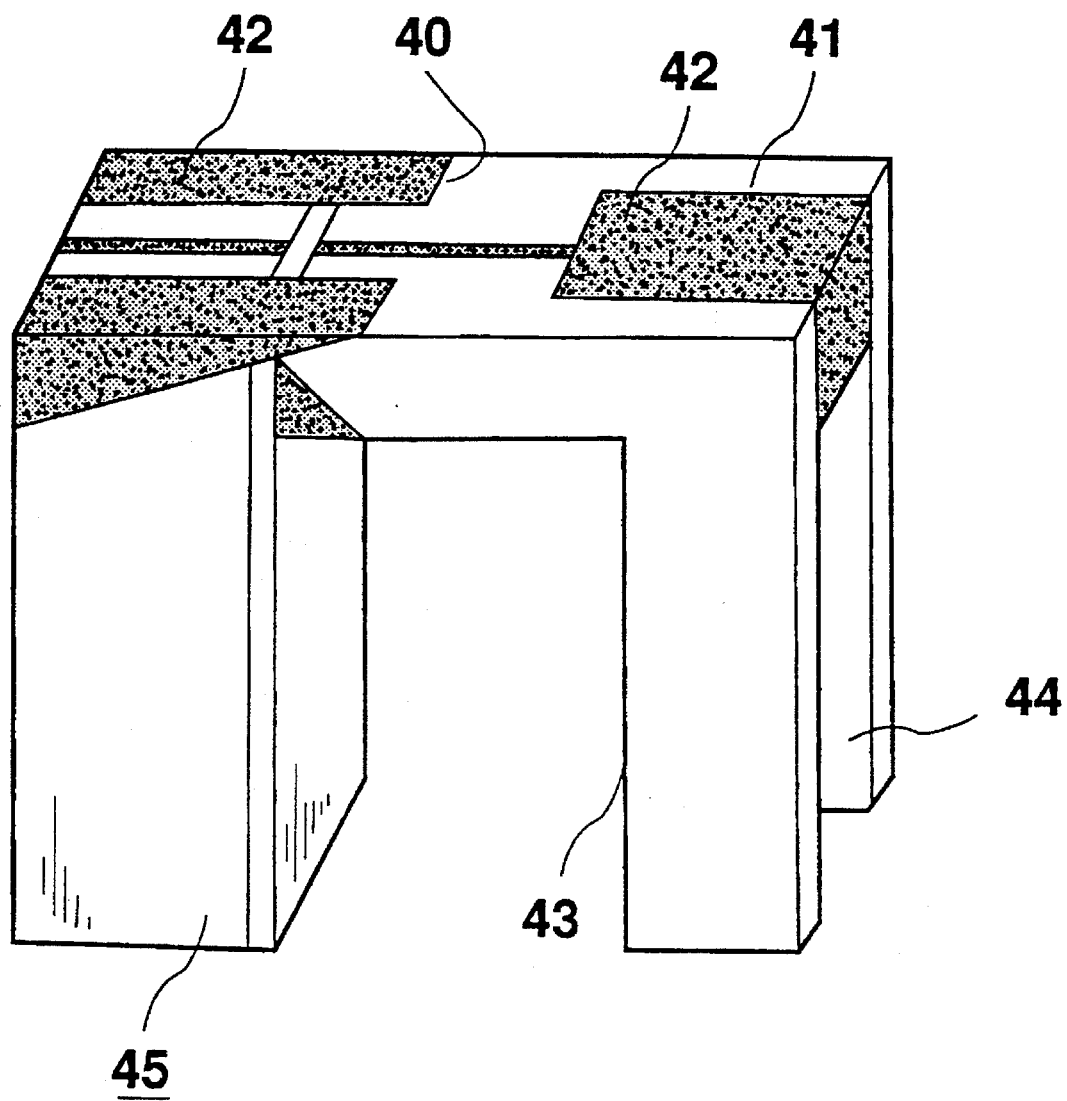
Figure 14:
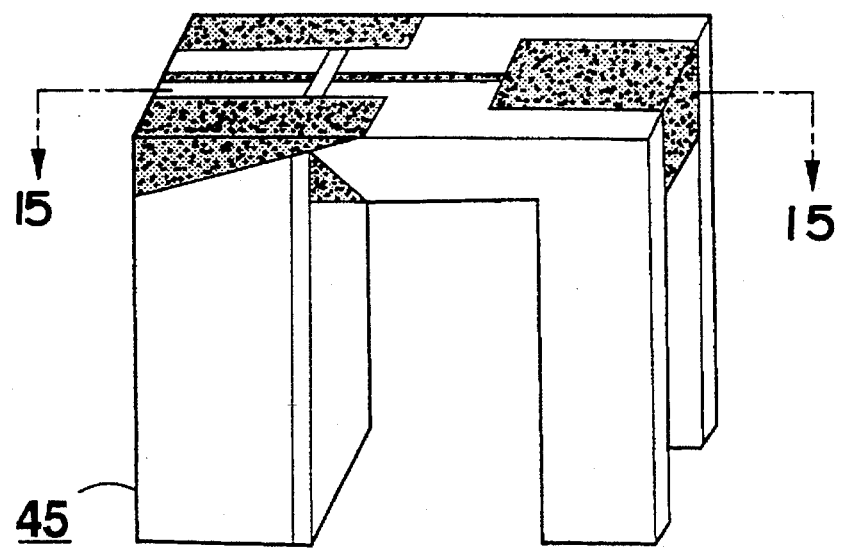
FIG. 14 is a perspective view of a head chip produced in the process shown in FIGS. 2 to 13.

In FIG. 13, the Mn—Zn half ferrite piece block pair 39 shown in FIG. 12 is sliced to obtain head chips 45. Then, coils are wound around two legs of each head chip 45, and two back cores are attached for shunting the magnetic circuit. As a result, the combined magnetic head shown in FIG. 1 is obtained.

Next, the operation of the combined magnetic head produced as described above will now be described.

First, when the combined magnetic head is suitably used for a magnetic recording and reproducing apparatus (that is, a large capacity floppy disk drive using a tracking servo adopting a new data positioning system and a fixed magnetic disk drive), as disclosed in Japanese Patent Laid-Open No. Sho 50-15520, the operation is as follows.

When information is recorded or reproduced onto or out of data tracks of a magnetic recording medium of a floppy disk drive, two recording/reproducing coils of the combined magnetic head of the twin structure are connected in series so as to be used as a single magnetic head. Hence, in this case, the recorded track width becomes the sum of the track widths of both the magnetic heads.

On the other hand, in the head positioning operation of the combined magnetic head for performing the tracking servo due to a closed loop system, both the magnetic heads are used as independent reproducing heads, and reproducing signals of the data tracks read out from both the heads are compared with each other in a comparison circuit to carry out the head positioning operation. Where the reproducing signals are used as comparison signals, when amplifiers having different gains are used as the comparison signal circuit, the track widths of the two magnetic heads can be different.

Figure 15:
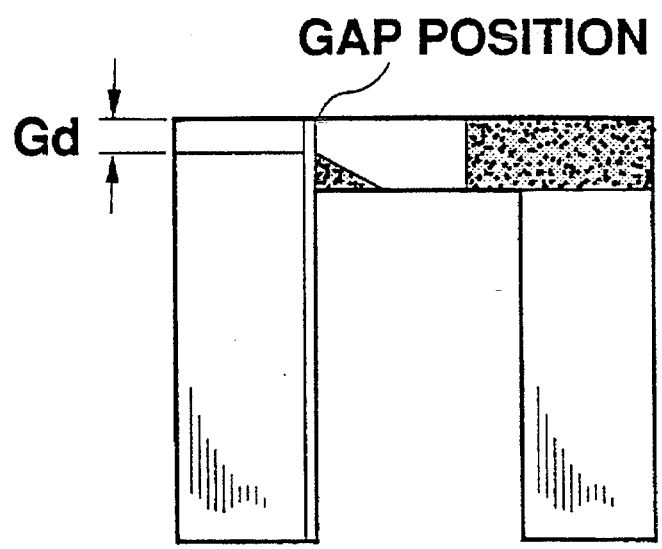
FIG. 15 is a longitudinal cross section, taken along the line Y—Y in FIG. 14, for explaining a gap depth of a combined magnetic head.
Figure 42:
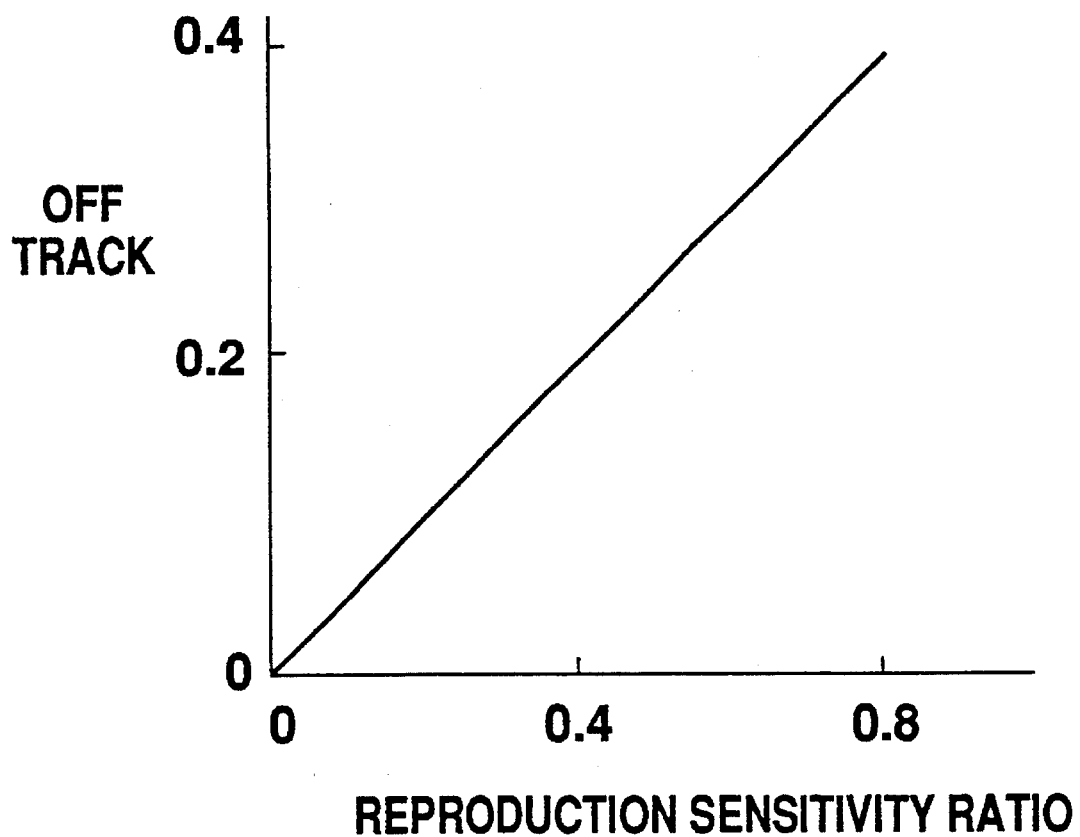
FIG. 42 is a graphical representation showing relationship between a reproduction sensitivity ratio of a twin core head and an off-track according to the present invention.

Also, in order to carry out the head positioning with high accuracy in the above-described tracking servo control, it is desirable that both the magnetic heads have the same recording/reproducing performance. For example, in order to realize 1/10 off-track of the recording track width of one magnetic head at the tracking servo control, as shown in FIG. 42 (the vertical axis represents a value obtained by dividing the off-track width by the sum of the track widths of the two heads and the horizontal axis represents a value obtained by dividing a reproduction output different between the two heads by the reproduction output of the higher sensitivity head), the sensitivity ratio between both the heads is required to be less than 0.9. For this, it is necessary to restrict differences of a magnetic gap length, a gap depth Gd shown in FIG. 15 and whole dimensions between both the heads to less than several %. In the case of the combined magnetic head of the first embodiment, as apparent from the above description of the producing method, this condition can be readily satisfied.

Further, regarding the accuracy of the tracking servo control, cross talk, that is, a magnetic interference between both the heads can be performed.

In this recording system, at the recording time, the two heads are operated as one head. In this case, when effective magnetic permeabilities of the two magnetic head are equal, the recording magnetization states and the reproduction sensitivities by the two magnetic heads become both equal, and the off-track caused by the cross talk does not occur. On the contrary, in the recording system that the two heads are used to be operated independently, cross talk becomes a serious problem. In this case, even when the sensitivities of the two heads are equal, since the magnetization state of the adjacent tracks is different, in particular, the cross talk in the reproduction system becomes a large theme. In order to reduce this cross talk, similarly to a head for an electronic still camera, it is effective to widen the interval between the cores of both the magnetic heads. However, when the interval between the cores is broadened, a dead zone where the data are not recorded in the data track area is increased, and the recording density is undesirably reduced. Accordingly, in the combined magnetic head according to the present invention, both the heads are closed as near as possible, and both the heads are separated by a thin film insulation layer having a thickness of less than 5 μm. Further, an insulation length of a C core part is shortened, and a value obtained by dividing a product of the track width of one side head (when the track widths of the two heads are different, the shorter track width) and a thickness of a non-magnetic insulation layer by a product of the gap length and the length of the non-magnetic insulation layer is set to at least 10 to realize a recording of a small cross talk and almost near to no guard band, as hereinafter described in detail. As clear from a calculation result of a relationship between the cross talk and the core dimension shown in FIG. 43, approximately at most 0.1 of cross talk of a practical area can be obtained. Further, for utilizing an eddy current reaction between both the heads, it is effective to provide a conductive metallic non-magnetic film onto the insulation layer of each magnetic head. More specifically, in place of the high melting point glass 22, a two-layer structure composed of a glass and a conductive metal can be preferably used.

As described above, by using the tracking servo system suitable for making a large capacity, since there is no need to provide a particular servo data area in a part of the data track area compared with a conventional recording track recorded and reproduced by a magnetic head of a conventional sector servo system, as disclosed in the above-described "All About Floppy Disk Drive", a line recording density (bit density) is improved and the peripheral circuits can be simplified to realize a cost reduction of a magnetic recording/reproducing apparatus.

Next, the second embodiment according to the present invention will now be described.

Like a conventional combined magnetic head comprised of a low density head and a high density head arranged in parallel with an interval therebetween, as disclosed in Japanese Patent Laid-Open No. Sho 63-103408, when the combined magnetic head is used, as a magnetic head of a large capacity floppy disk drive having a lower compatibility function, the operation of the combined magnetic head will be described. As described above, when the large capacity floppy disk drive holding the compatibility with current low density floppy disk drives is realized, it is necessary to enable to deal with the high and low of the track density. In this embodiment, as shown in FIG. 16, a combined magnetic head of a twin structure provided with a preceding erase head in front (with respect to a rotating direction of a magnetic recording medium) of the combined magnetic head is most suitable to achieve such an object.

Figure 16:
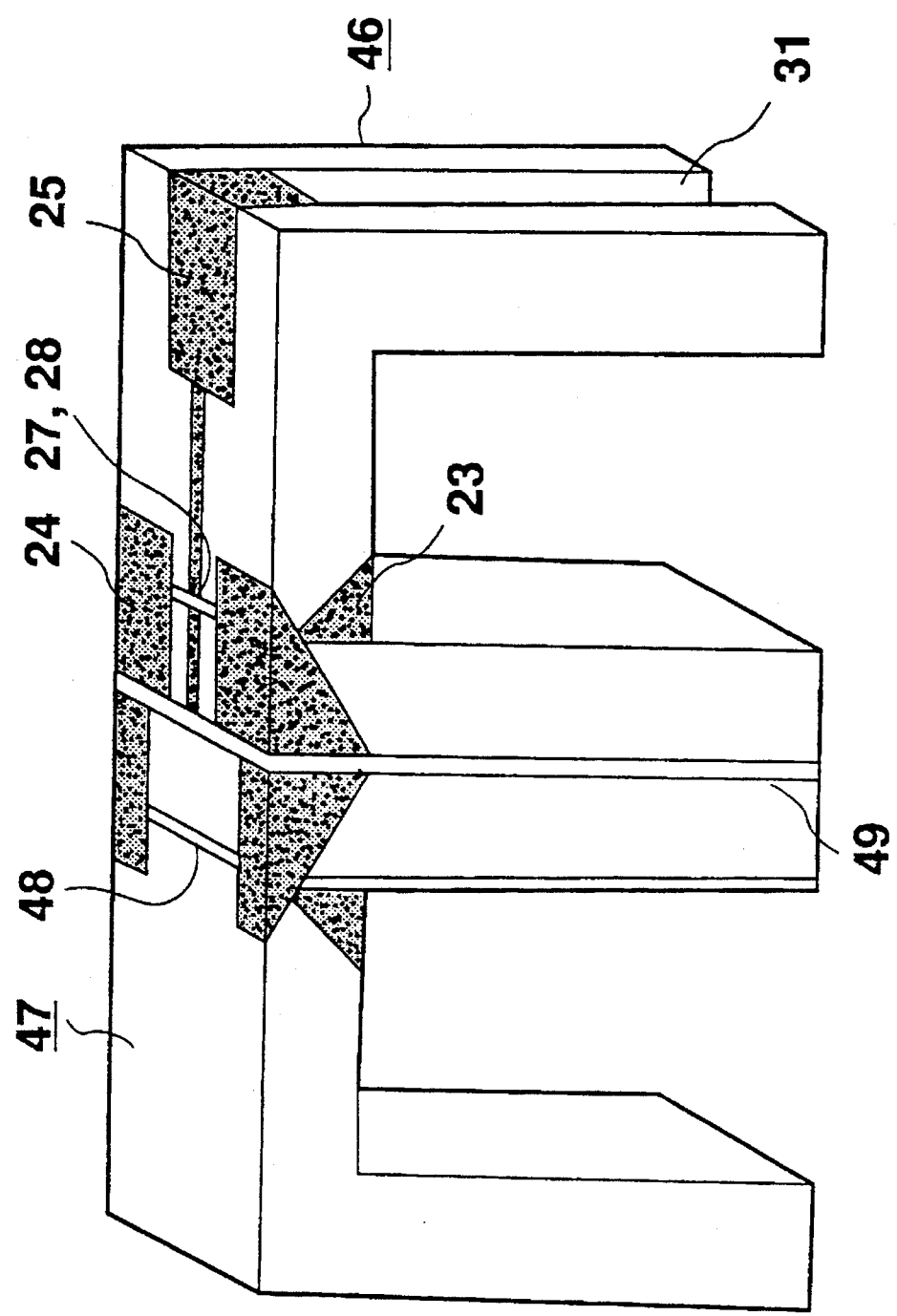
FIG. 16 is a perspective view of a second embodiment of a combined magnetic head according to the present invention.

In FIG. 16, the in-line two gaps magnetic head having the preceding erase head is comprised of a combined magnetic head 46 of a twin structure, an erase head 47 having an erase gap 48 and a non-magnetic central spacer 49 composed of a glass or the like for magnetically separating the combined magnetic head 46 from the erase head 47.

Generally, in a floppy disk drive, it is quite important to ensure the compatibility of the data for satisfying the request of users. Hence, for example, to take the case of a current 3.5 inches floppy disk drive with 2 MB (Mbyte), this floppy disk drive has the read/write function of the magnetic recording medium of a 1 MB floppy disk drive for the lower compatibility. As described above, in order to spread the large capacity floppy disk drive having the different track density from the conventional floppy disk drive, it is required to provide compatibility with the lower density device, and in order to realize the compatibility, a combined magnetic head composed of an upper magnetic head of a high density narrow track width and a lower magnetic head of a low density wide track width must be used.

In this case, the erase head 47 arranged in front of the read/write head is used as a preceding erase head for the off-track countermeasure of the lower floppy disk drive which does not use the tracking servo. The track width of the erase head 47 is determined to be approximately double the track width of the read/write head. Now, the preceding erase head system is recently standardized by the JIS (Japan Industrial Standard) and is put to practical use in a 4 MB floppy disk drive having compatibility with the 2 MB and 1 MB floppy disk drives.

In FIG. 16, one magnetic head of the combined magnetic head of the twin structure is used as the upper head, as described above. In this case, a conventional sector servo system as the tracking servo is used. Also, when the two magnetic heads with the different track widths are contiguous to each other, the cross talk between the two heads becomes a problem. In this embodiment, when one read/write head is operated, the read/write coil of the other head is electrically short-circuited to prevent the circulation of the leakage flux. In order to perform a more effective suppression of the cross talk, the thickness of the insulation layer between the twin cores is thinned and the length of the insulation layer part of the C core part is shortened. Further, it is desirable to provide a conductive metallic magnetic film such as copper for using the eddy current reaction between the insulation layers between the two magnetic heads of the twin structure.

In the combined magnetic heads of the first and second embodiments according to the present invention, as described above, compared with the conventional combined magnetic head composed of the low density head and the high density head which are independently produced and are arranged in parallel, as disclosed in Japanese Patent Laid-Open No. Sho 63-103408, since the two magnetic heads of the twin structure are integrally formed, the combined magnetic head can be produced at a low cost, and the gap positions of both the heads can be aligned on the in-line.

Relating to a VCR head, although a double azimuth head system using magnetic heads with different track widths of a long time mode and a short,time mode becomes expensive and a relative positioning of the two magnetic heads is difficult, in the first and second embodiments according to the present invention, the combined magnetic heads can be produced at a low cost and the relative positioning of the two magnetic heads can not be required.

When the combined magnetic head of the first or second embodiment according to the present invention is used as the VTR head, first, the track,width of one magnetic head of the combined magnetic head of the twin structure is set to a track width for a long time recording/reproducing mode, and the track width of the other magnetic head is set so that the sum of both the track widths may be just set to a track width of a short time recording/reproducing mode.

In this case, when the combined magnetic head is used in the long time recording/reproducing, only the magnetic head set to the track width for the long time mode is used. In this instance, since both the heads are adjacent to each other, the cross talk between both the heads becomes a problem. That is, at the recording time, when the current corresponding to the data signal flows in one read/write coil of one head, the leakage flux is circulated in the other head, and the recording can be also carried out on the magnetic recording medium in the gap magnetic field from the other head. Also, at the reproducing time, similarly, since the magnetic flux reproduced in one magnetic head is circulated to the head core of the other magnetic head, the image quality is dropped. In order to avoid this phenomenon, when one magnetic head is operated, the coil of the other magnetic head is electrically short-circuited. Thus, the reaction magnetic flux is generated by the inductive current due to the short-circuit and hence the circulation of the magnetic flux due to the close alignment of both the heads can be prevented in the recording/reproducing time.

Next, at the short time recording/reproducing time mode, the two magnetic heads of the twin structure are operated as a single magnetic head. In this case, the coils of both the heads can be connected in series, and, when the consistency of the inductance of the magnetic heads in the long time recording/reproducing mode is required, it is better to provide a special coil. Further, since the non-magnetic layer between both the magnetic heads becomes an unrecord layer, the non-magnetic layer is preferably determined to less than 5 microns.

Further, although the combined magnetic head having no erase head is shown in the first embodiment, when a barium medium having a bad overwrite property is used, the erase head 47 can be provided in front of the read/write head to use the combined magnetic head structure shown in FIG. 16.

Next, the third embodiment according to the present invention will now be described.

Figure 21:
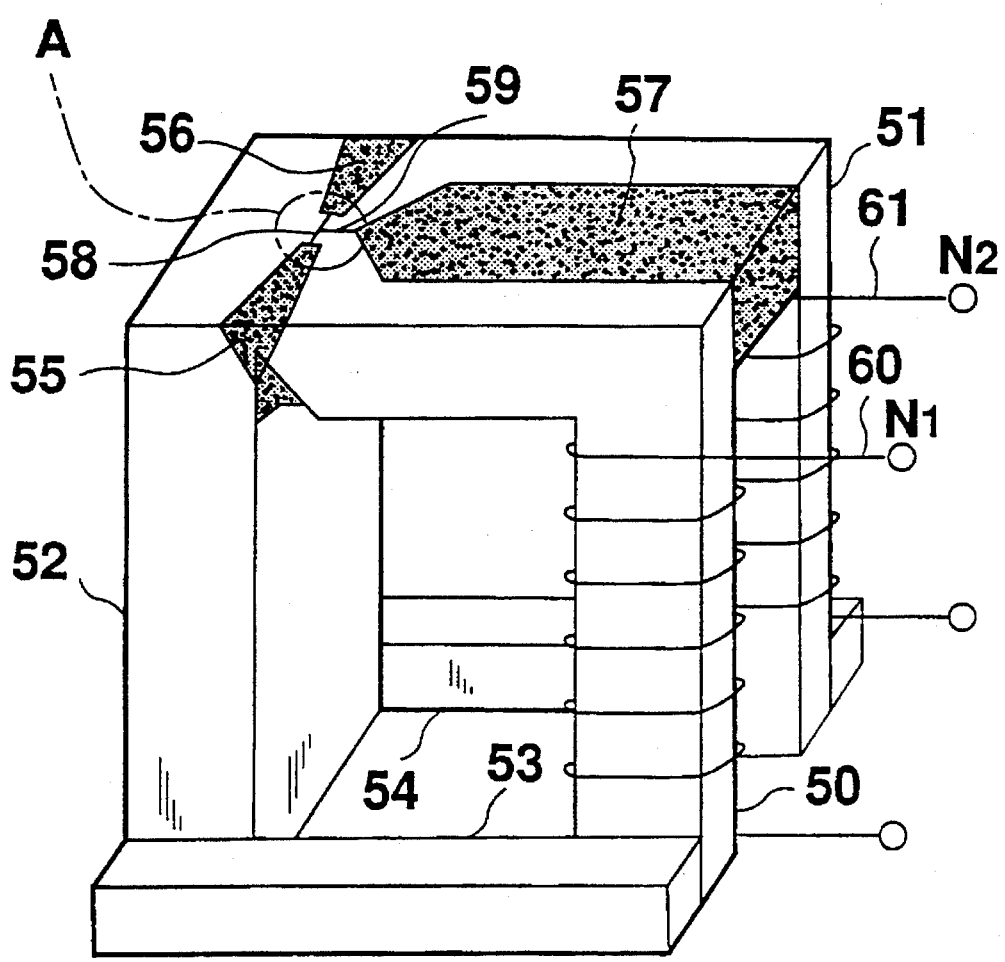
FIG. 21 is a perspective view of a third embodiment of a combined magnetic head according to the present invention.

In FIG. 21, there is shown a combined magnetic head according to the third embodiment of the present invention. The combined magnetic head comprises two C core parts 50 and 51 of a read/write core constituting a twin core composed of a metallic oxide having a high magnetic permeability of a single or poly crystal such as a Mn—Zn ferrite, a Ni—Zn ferrite or the like or a metallic magnetic material having a high magnetic permeability such as the sendust (Fe—Al—Si alloy), an I core part 52 of the read/write core of magnetic integral structure, which is composed of the same material as the C core parts 50 and 51, a pair of back cores 53 and 54 composed of the same material as the core parts 50 to 52 for magnetically shunting the core parts 50 to 52, glasses 55 to 57 such as flint glass having a work temperature of 500° to 1000° C., a read/write gap 58 formed with a thin film of $SiO_2$, $Al_2O_3$, flint glass or the like by sputtering or vapor deposition, an insulation layer 59 composed of the same material as the read/write gap 58 for magnetically separating the C core parts 50 and 51, and a pair of read/write coils 60 and 61 wound around the respective C core parts 50 and 51. A circular part A shown in FIG. 21 is shown in enlarged scale in FIG. 22.

Next, a method of producing the combined magnetic head shown in FIG. 21 will now be described in connection with FIGS. 23 to 35.

Figure 23:
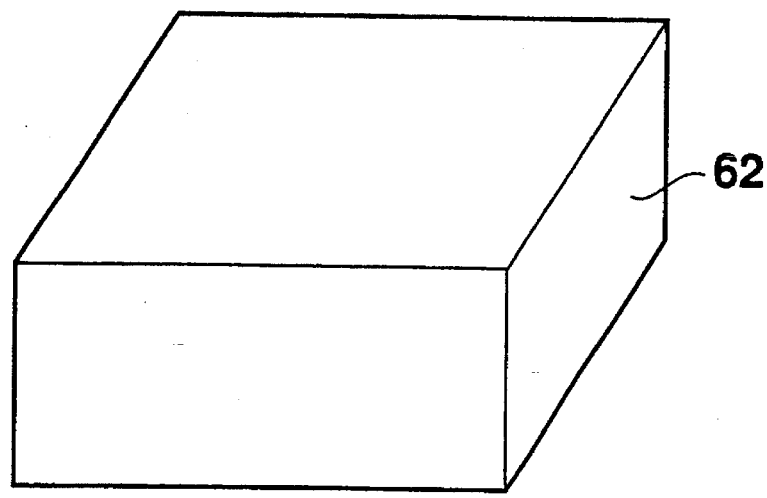
FIGS. 23 to 34 are perspective views showing a producing method of the combined magnetic head shown in FIG. 21.
Figure 24:
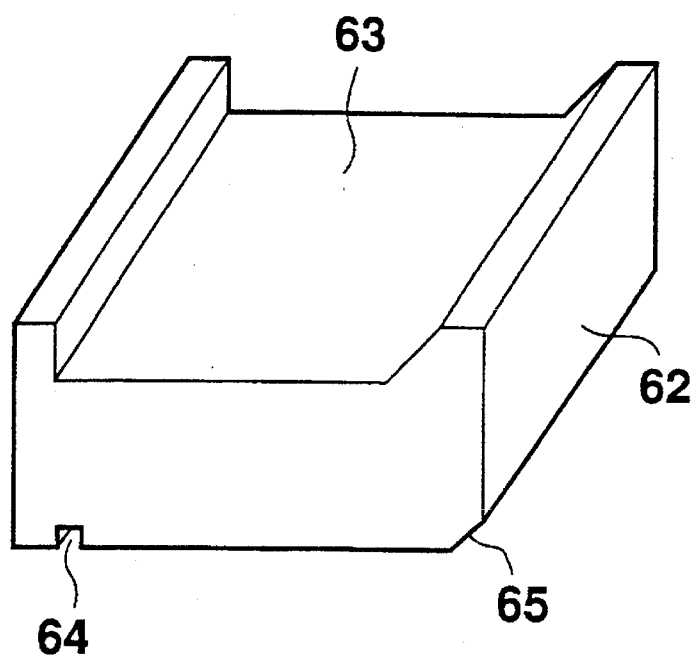

First, as shown in FIG. 23, a single or poly crystalline Mn—Zn ferrite material is finished to the desired dimension by a grinding processing, a lapping processing or the like to obtain a ferrite piece 62. Next, in FIG. 24, a C core separation groove 63 and glass insertion grooves 64 and 65 are formed in the ferrite piece 62.

Figure 25:
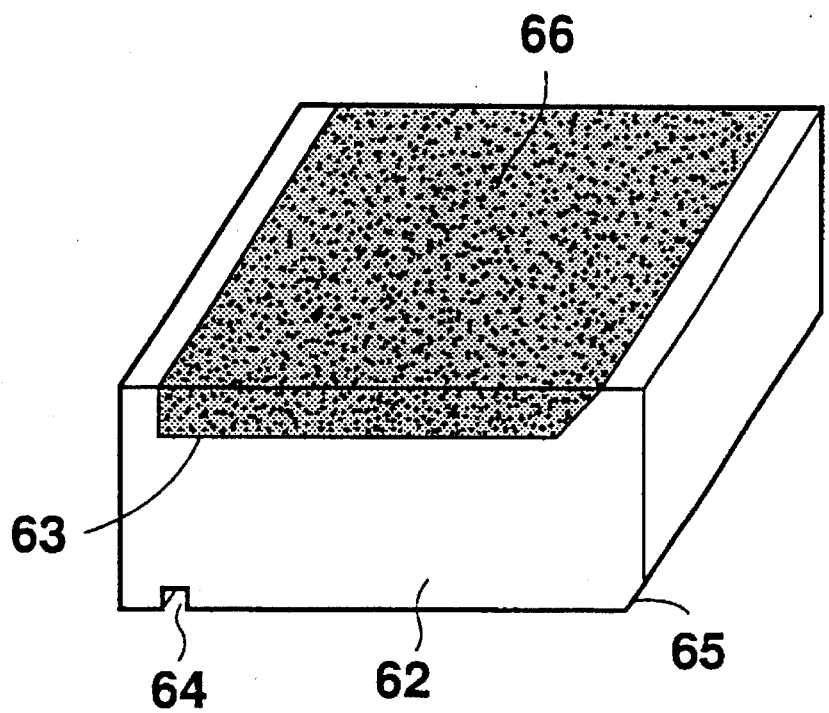
Figure 26:
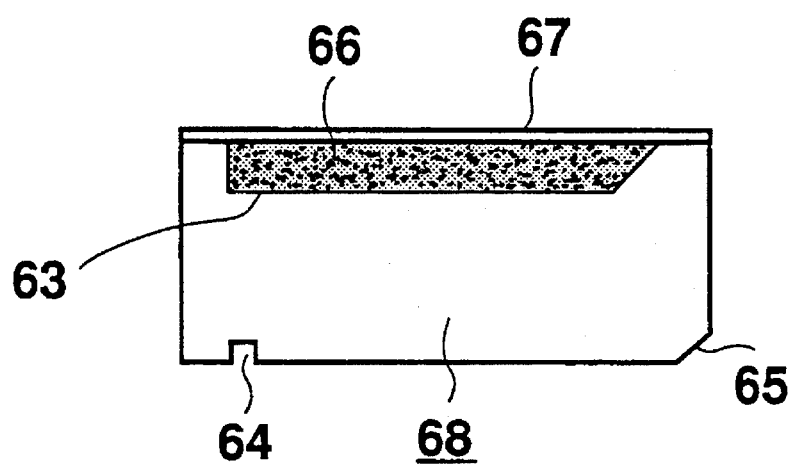
Figure 27:
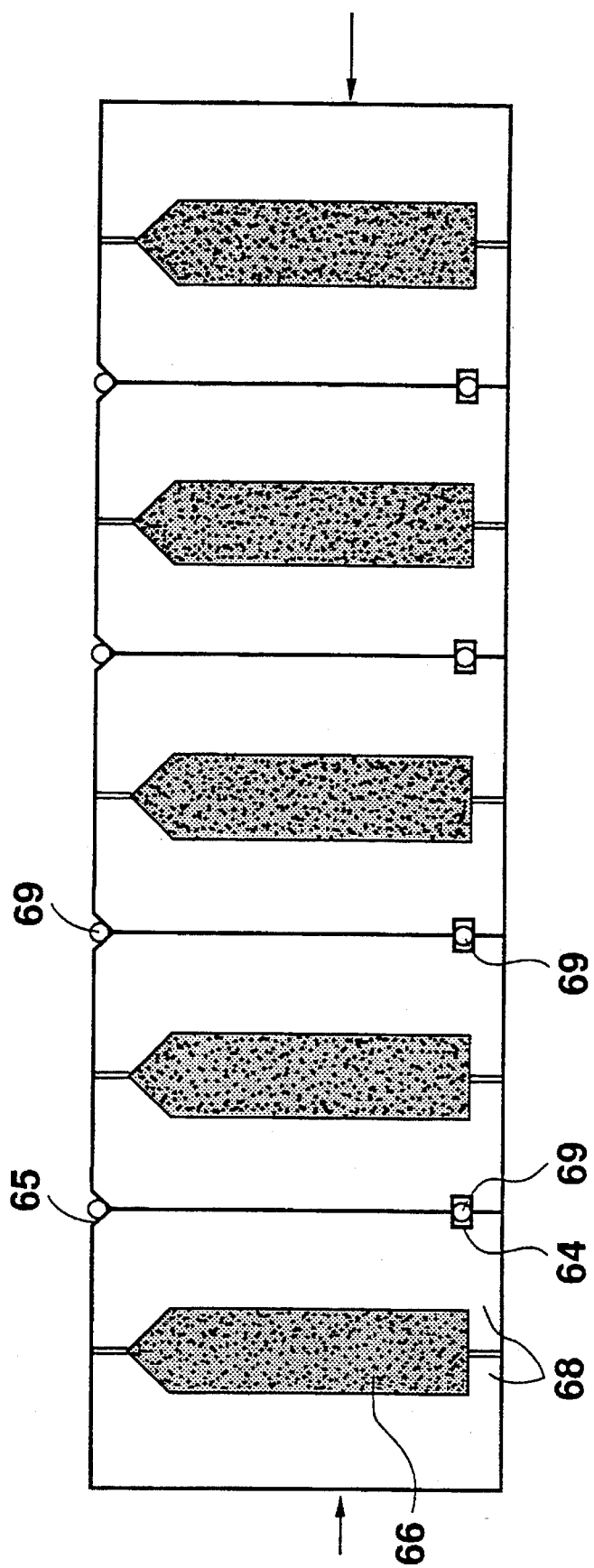

In FIG. 25, a high melting point glass 66 is molded in the C core separation groove 63, and while the excess part of the high melting point glass 66 is removed, the surface of the high melting point glass 66 is polished to be flat. Then, in FIG. 26, a non-magnetic insulation film 67 for preventing the electric cross talk between the C cores is formed over the surface of the high melting point glass 66 and the ferrite piece 62 to obtain a C core block 68. Next, in FIG. 27, a pair of C core blocks 68 are overlapped so as to contact their top surfaces with each other, and a plurality of the obtained C core block pairs are further assembled along a straight line. Then, glass rods 69 having an intermediate melting point for melting the surface of the high melting point glass 66 are inserted into the glass insertion grooves 64 and 65, and while the loads are applied in the directions indicated by the arrows, the temperature is raised to weld and to integrally connect all the C core blocks 68.

Figure 28:
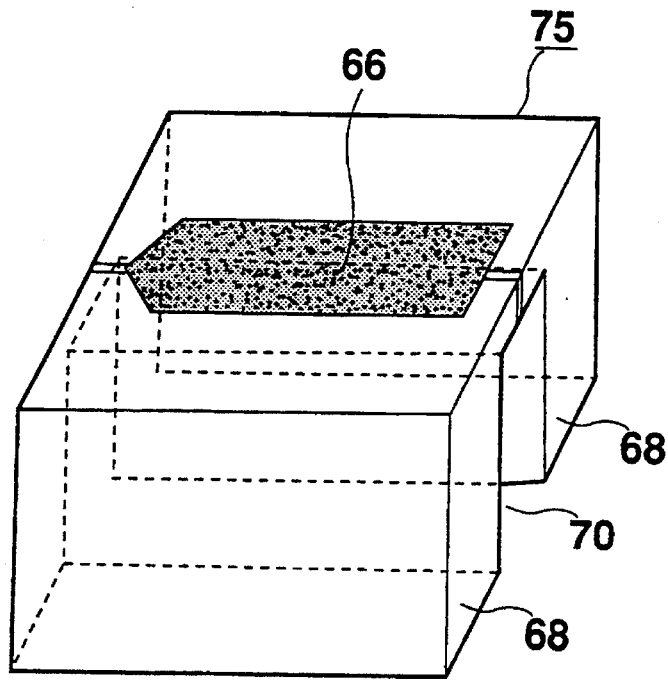
Figure 29:
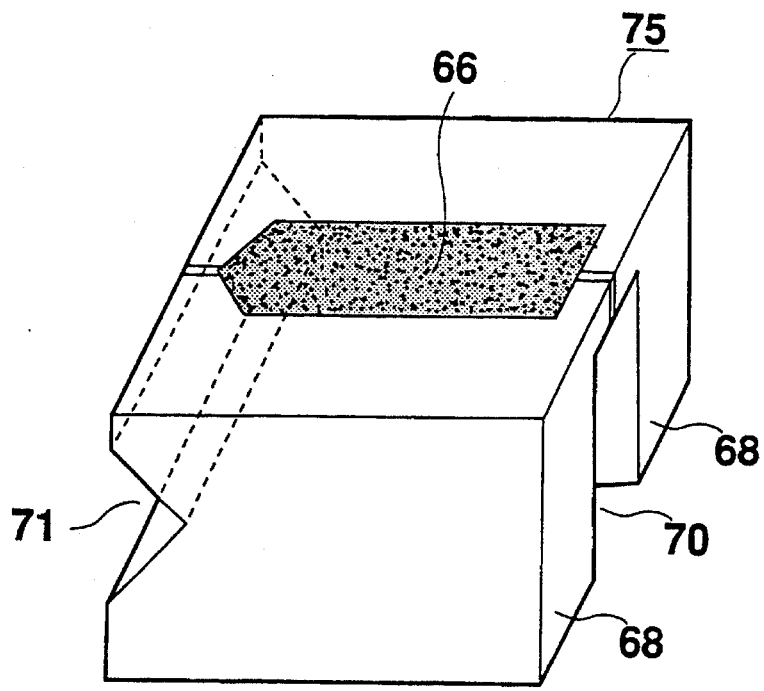
Figure 35:
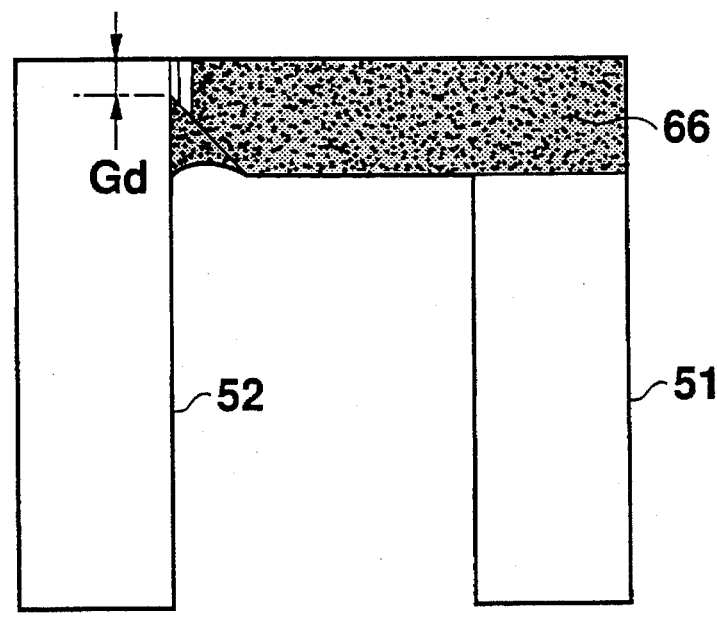
FIG. 35 is a longitudinal cross section, taken along the line X—X in FIG. 34, for explaining a gap depth of a combined magnetic head.

Next, in FIG. 28 (showing only one block for simplifying the drawing from this step), in order to form the C core parts 50 and 51 of the twin structure, a U groove 70 is formed in a C core block pair 75. In FIG. 29, an apex V groove 71 for defining the gap depth Gd of the twin head is formed in one side of the C core block pair 75. FIG. 35 is a longitudinal cross sectional front view, taken along the central line X—X of the track width in FIG. 34, of the twin head, and the gap depth Gd is clearly shown.

Figure 30:
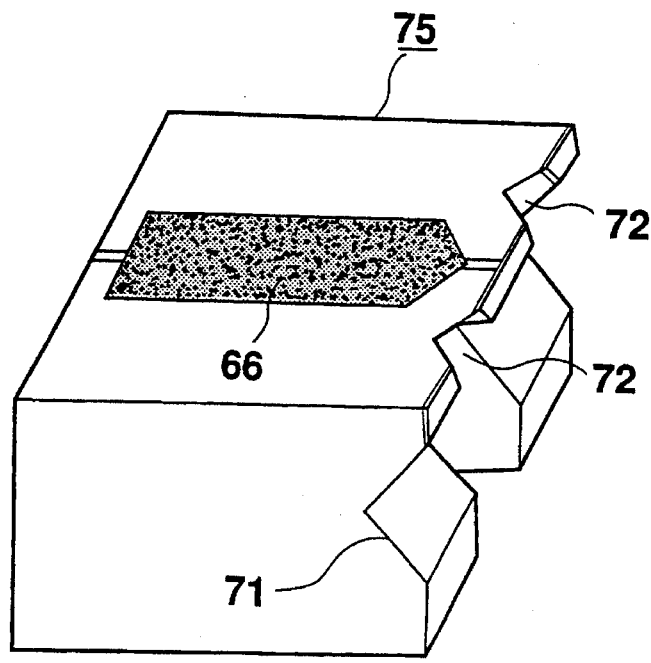
Figure 31:
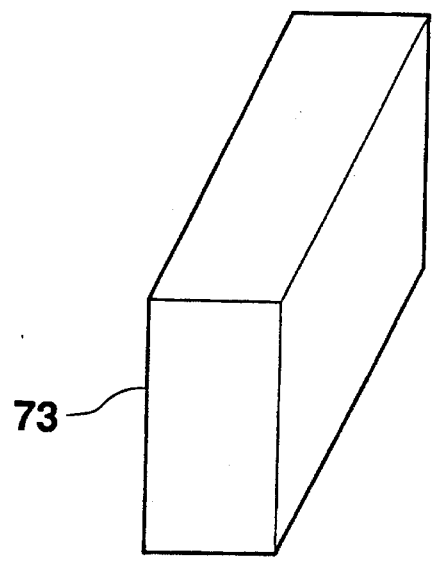
Figure 32:
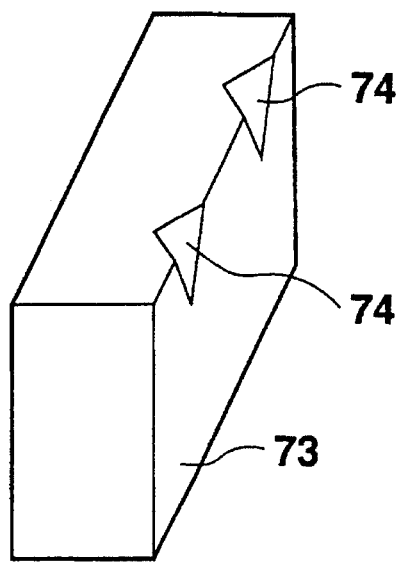

In FIG. 30, grooves 72 for regulating the track widths of the C core parts 50 and 51 of the twin head are formed in the C core block pair 75, and a gap material is formed on the gap surface. Then, in FIG. 31, a single or poly crystal Mn—Zn ferrite material is finished to a predetermined dimension by the cutting processing, the lapping processing and the like to obtain a ferrite piece 73 for processing the I core part 52. In FIG. 32, grooves 74 for restricting the track width of the I core part 52 of the twin head are formed in the ferrite piece 73, and the gap material is formed on the gap surface.

Figure 33:
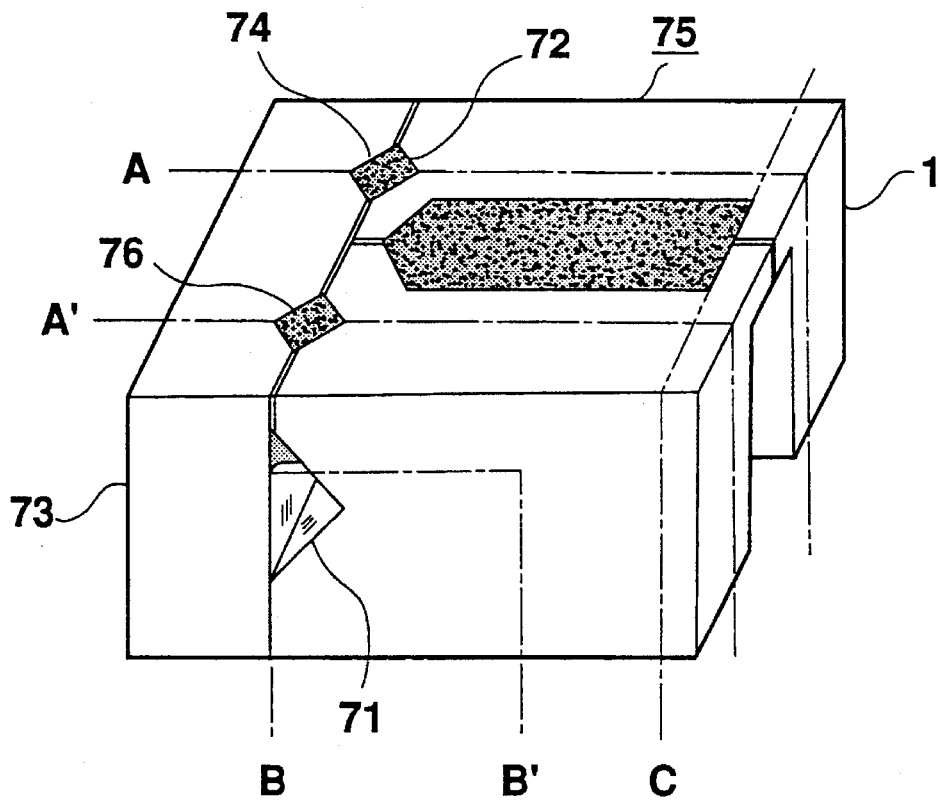
Figure 34:
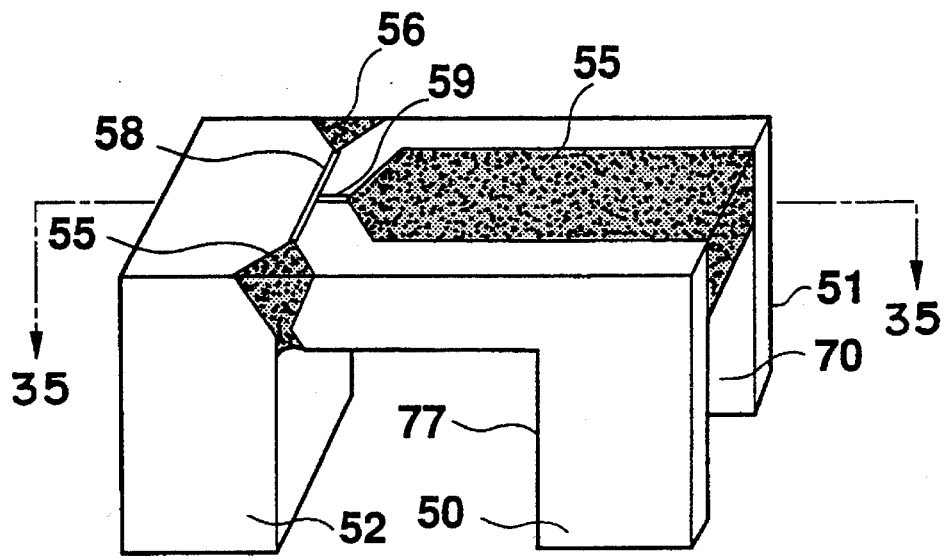

Next, in FIG. 33, the ferrite piece 73 and the C core block pair 75 are combined, and intermediate melting point glass is molded in the track width regulation grooves 72 and 74 to integrate the ferrite piece 73 and the C core block pair 75. Then, the integrated block is cut along one-dotted lines A, A' and C, and a U groove 77 is formed along a one-dotted line B—B' to obtain a twin head chip shown in FIG. 34. To the twin head chips, the read/write coils 60 and 61 are wound around the core parts 50 and 51 and the back cores 53 and 54 for shunting are attached to obtain the combined magnetic head of the twin structure shown in FIG. 21.

Next, the operation of the combined magnetic head produced as described above will now be described.

First, when the combined magnetic head is suitably used for a large capacity floppy disk drive (FDD) using a tracking servo adopting a new data positioning system and a fixed magnetic disk drive (HDD), as disclosed in Japanese Patent Laid-Open No. Sho 50-15520, the operation is as follows. That is, when the data information is recorded or reproduced onto or out of the data tracks of a magnetic recording medium of a floppy disk drive, two read/write coils 60 and 61 of the combined magnetic head of the twin structure are connected in series so as to be used as a single magnetic head. Hence, in this case, the recording track width becomes the sum of the track widths of both the magnetic heads.

On the other hand, in the head positioning operation by the tracking servo technique, both the magnetic heads are used as independent reproducing heads, and reproducing signals picked up from the data tracks by both the heads are compared with each other in a comparison circuit to carry out the head positioning operation. At this time, in order to carry out the head positioning with high accuracy, it is desirable that both the magnetic heads have the same recording/reproducing performance. For example, in order to realize a ⅒ off-track performance of the recording track width of one magnetic head, the sensitivity ratio between both the heads is required to be less than 0.9. For this, it is necessary to restrict the differences of the magnetic gap length, the gap depth and the whole dimensions between both the heads to less than several %. In the third embodiment, as apparent from the above description of the producing method, this condition can be readily satisfied.

Figure 44A:
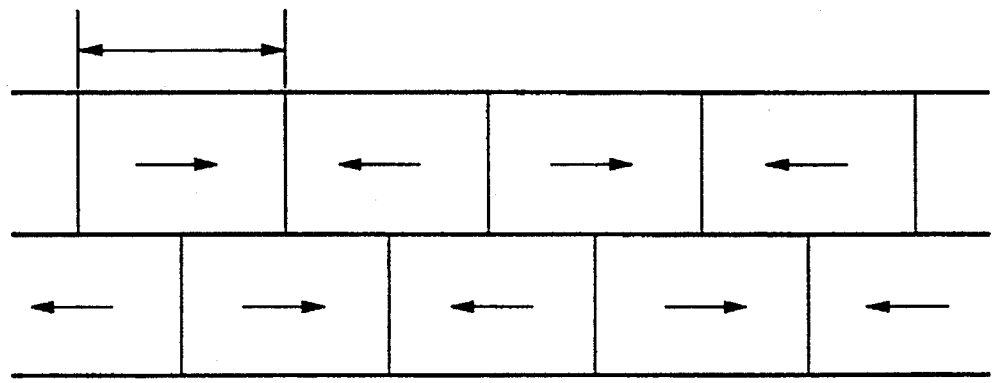
FIG. 44A is a schematic view of a record magnetization pattern of a twin core head at a two division recording time and FIG. 44B is a schematic view of a reproduction output waveform according to the present invention.
Figure 44B:
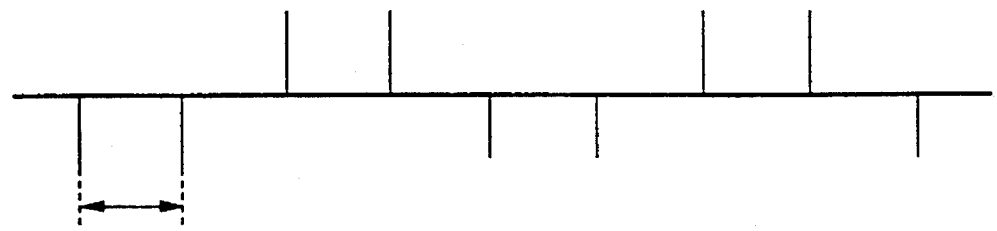
Figure 45:
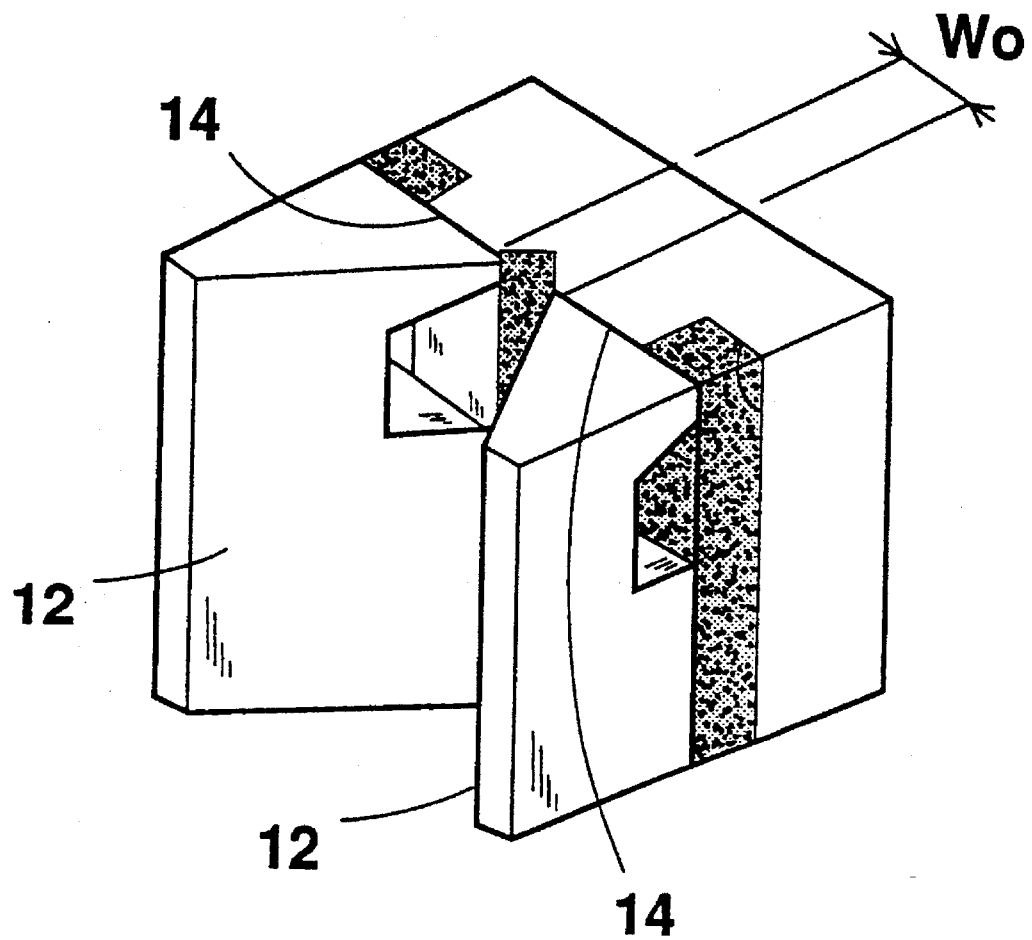
FIG. 45 is a perspective view of a conventional twin core head.
Figure 46:
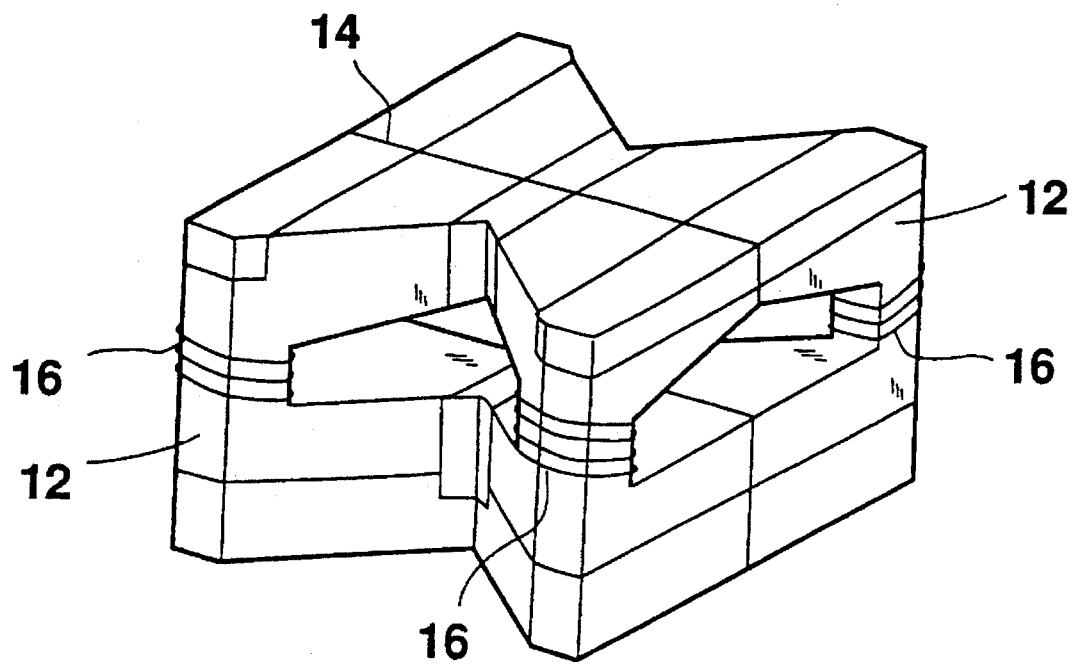
FIG. 46 is a perspective view of another conventional twin core head.
Figure 47:
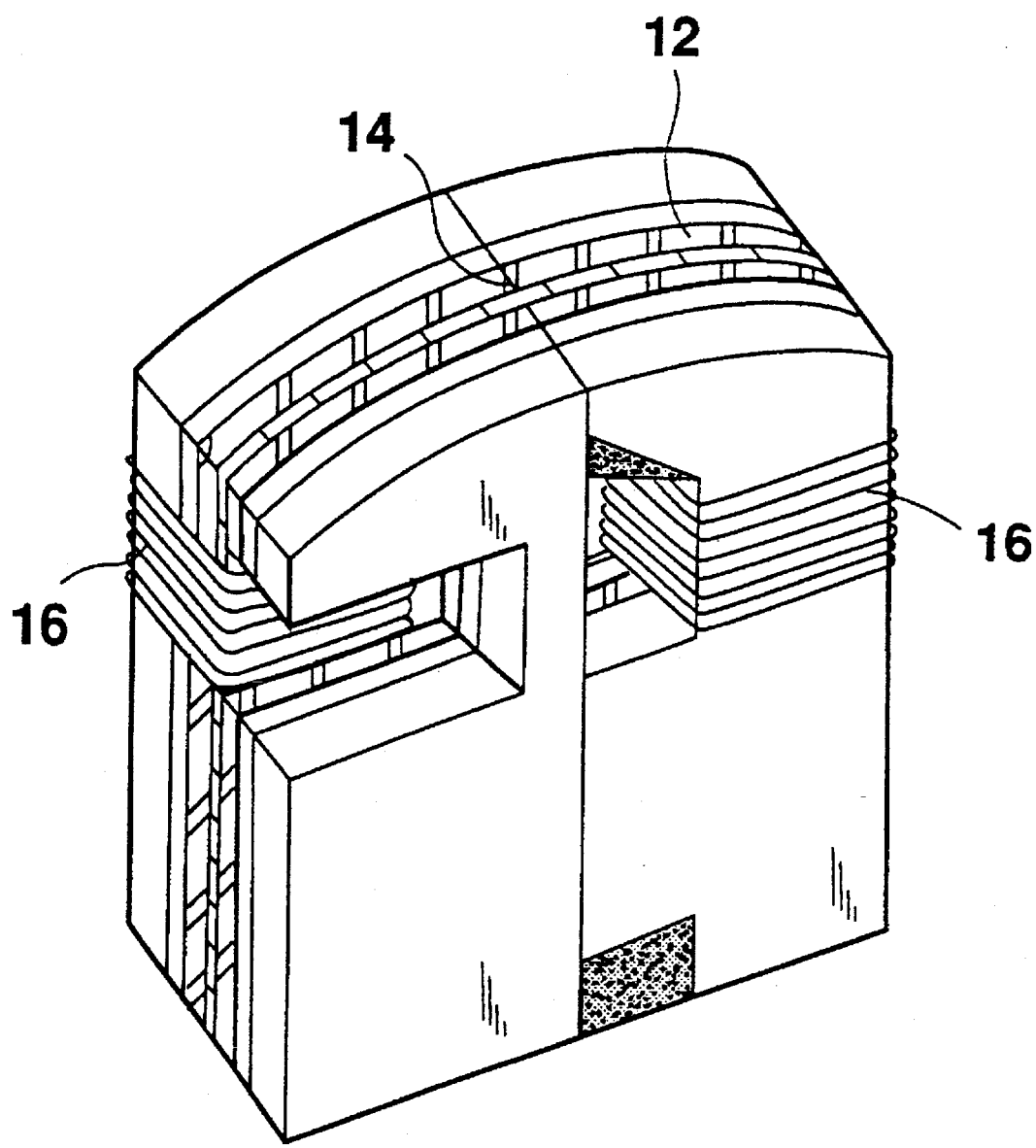
FIG. 47 is a perspective view of a further conventional twin core head.
Figure 48:
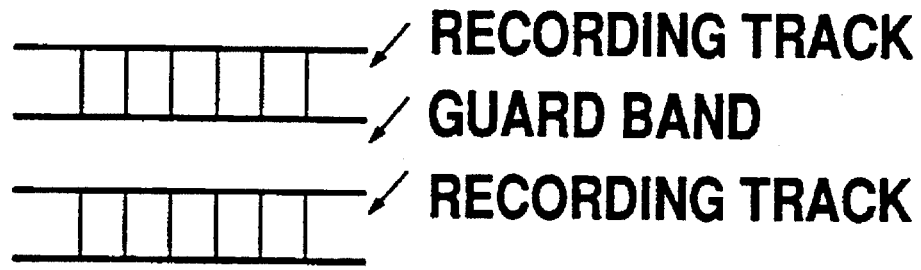
FIG. 48 is a schematic view showing a record magnetization pattern of a conventional twin core head.
Figure 49:
FIG. 49 is a schematic view showing a record magnetization pattern of a twin core;head according to the present invention.
Figure 50:
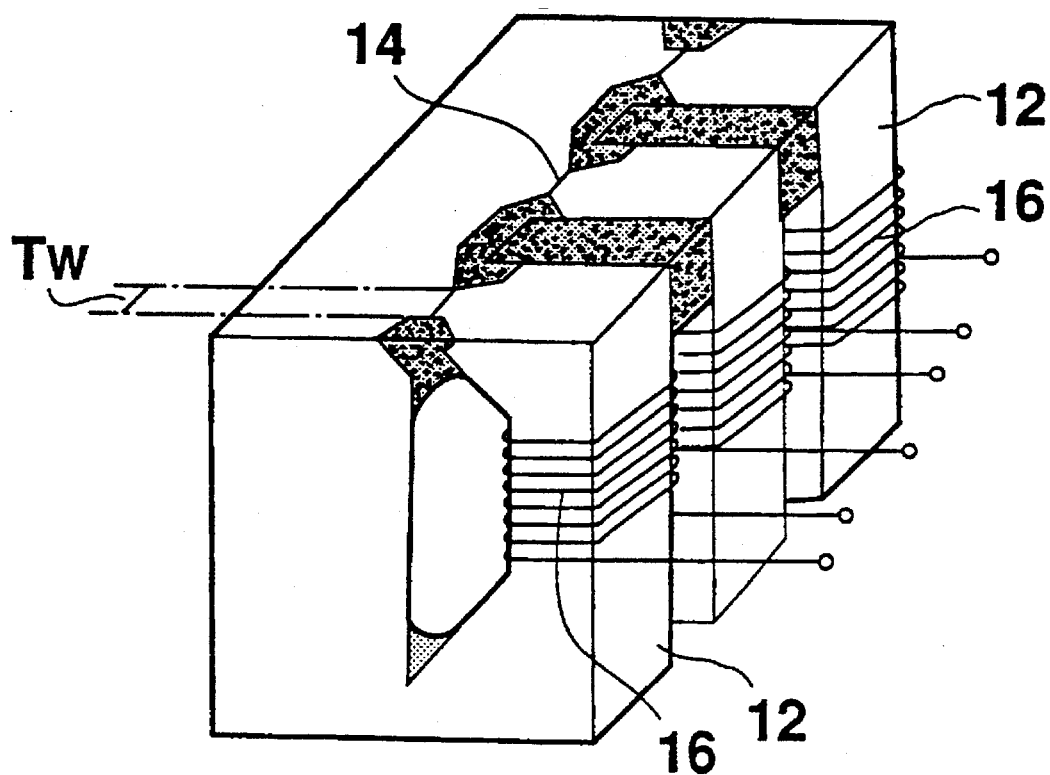
FIG. 50 is a perspective view of a conventional triple core head.

FIG. 44A shows a record magnetization pattern of the twin core head at the two division recording time and FIG. 44B shows a reproduction output waveform. The magnetization pattern shown in FIG. 44A is recorded by shifting the ½ bit length and independently using the two heads. A distance between transition regions is called a bit length. The shortest record bit length depends on the gap length of the head and it is necessary to shorten the gap length of the head for a short bit recording. The waveform shown in FIG. 44B is the reproduction output waveform when the two heads are operated as the single head. By adopting this recording system in the twin head, the effective record bit length can be shortened to one half compared with the conventional recording system by the single head having the same gap length, and thus the data transfer rate can be double while the gap length is not changed in the same manner as the conventional low density recording medium As described above, by using the tracking servo system suitable for making a large capacity, as compared with the conventional sector servo system for providing a particular servo data area in a part of the data track area of the conventional recording track, as disclosed in the above-described "All About Floppy Disk Drive", the data recording amount is improved and the peripheral circuits can be simplified to realize a cost reduction of a magnetic recording/reproducing apparatus.

Then, the fourth embodiment according to the present invention will now be described.

Figure 17:
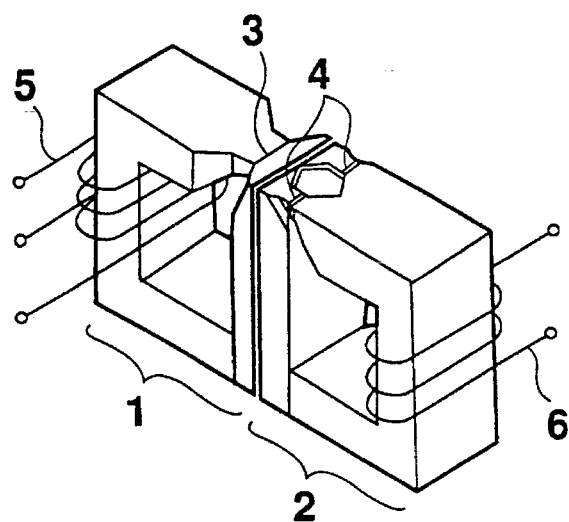
FIG. 17 is a perspective view of a conventional combined magnetic head of a tunnel erase system mounted onto a floppy disk drive.
Figure 18:
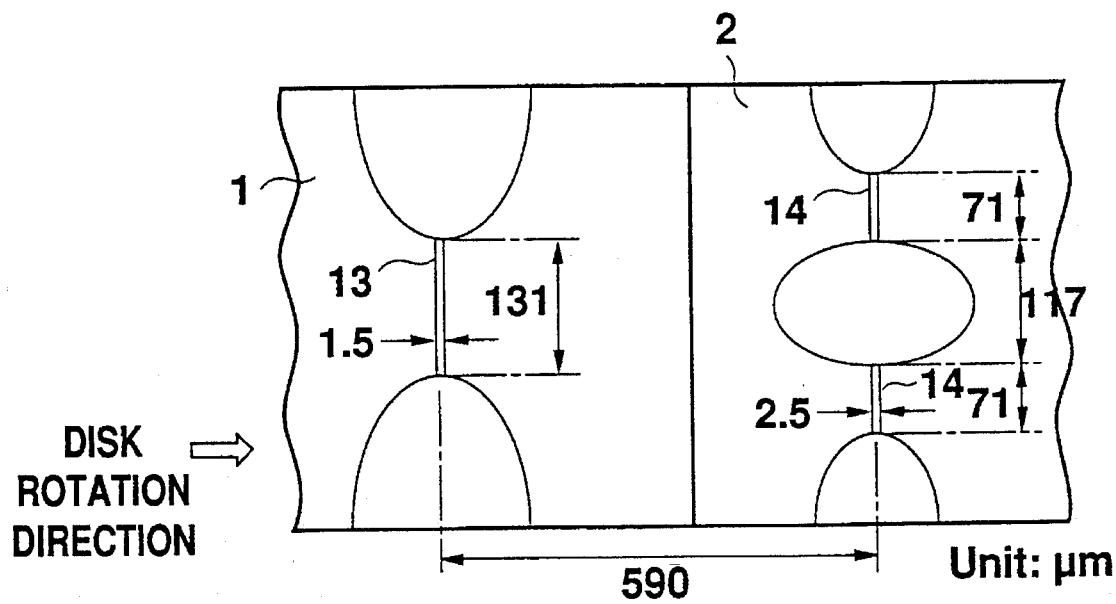
FIG. 18 is an enlarged fragmentary top view of a disk contact surface of the combined magnetic head shown in FIG. 17.
Figure 36:
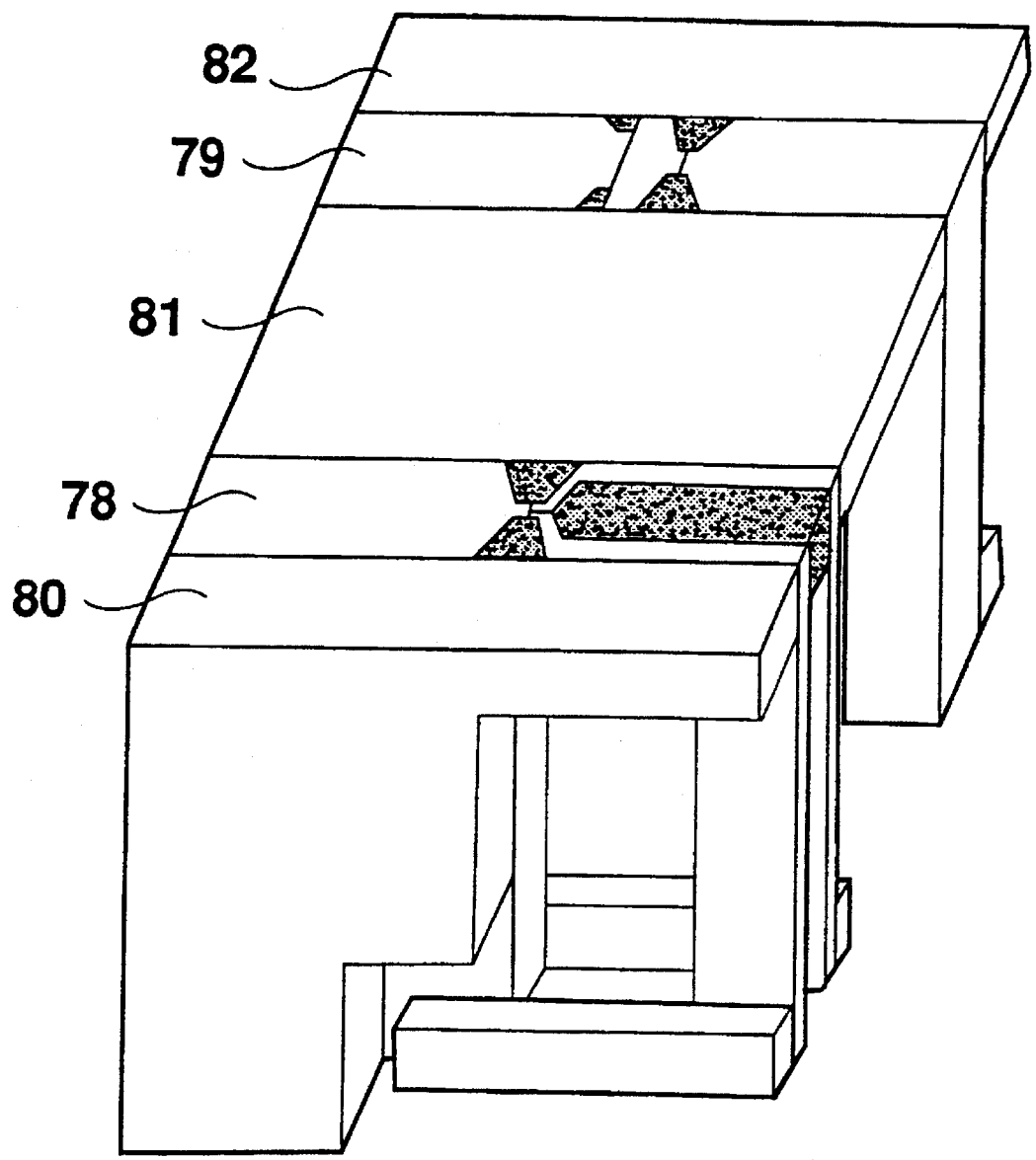
FIG. 36 is a perspective view of a fourth embodiment of a combined magnetic head according to the present invention.

In FIG. 36, there is shown a combined magnetic head of a twin structure with a conventional 2 MB or 1 MB head of a tunnel erase system, arranged in parallel with the combined magnetic head at a predetermined interval therebetween on one head slider in order to include the compatibility with a conventional head (1 MB, 2 MB and 4 MB FDDs) of the open loop system and to realize a large capacity FDD. In this embodiment, of course, a preceding erase head (not shown) which is arranged in parallel and is used as a low density head in the 4 MB FDD is also included. In FIG. 36, there are shown a combined magnetic head 78 of a twin structure of a high recording density, as shown in FIG. 21 and a combined magnetic head 79 of a conventional low density tunnel erase type, as shown in FIG. 17 and 18. In this case, numerals 80 to 82 designate slider materials composed of a high hardness ceramic such as calcium titanate, barium titanate or the like. In FIG. 36, head coils are omitted for brevity.

In the conventional FDD of the open loop system, in order to ensure the compatibility with the different types of different capacities, a system having the same track density and a different line record density is adopted, and in order to realize the high track density FDD, the structure shown in FIG. 36 is used from a view point of the compatibility guarantee. In this case, the low density recording is carried out by using the combined magnetic head 79 of the tunnel erase system or the preceding erase system, and the high density recording is performed by using the combined magnetic head 78 of the twin structure.

Then, the fifth embodiment according to the present invention will now be described.

Figure 37:
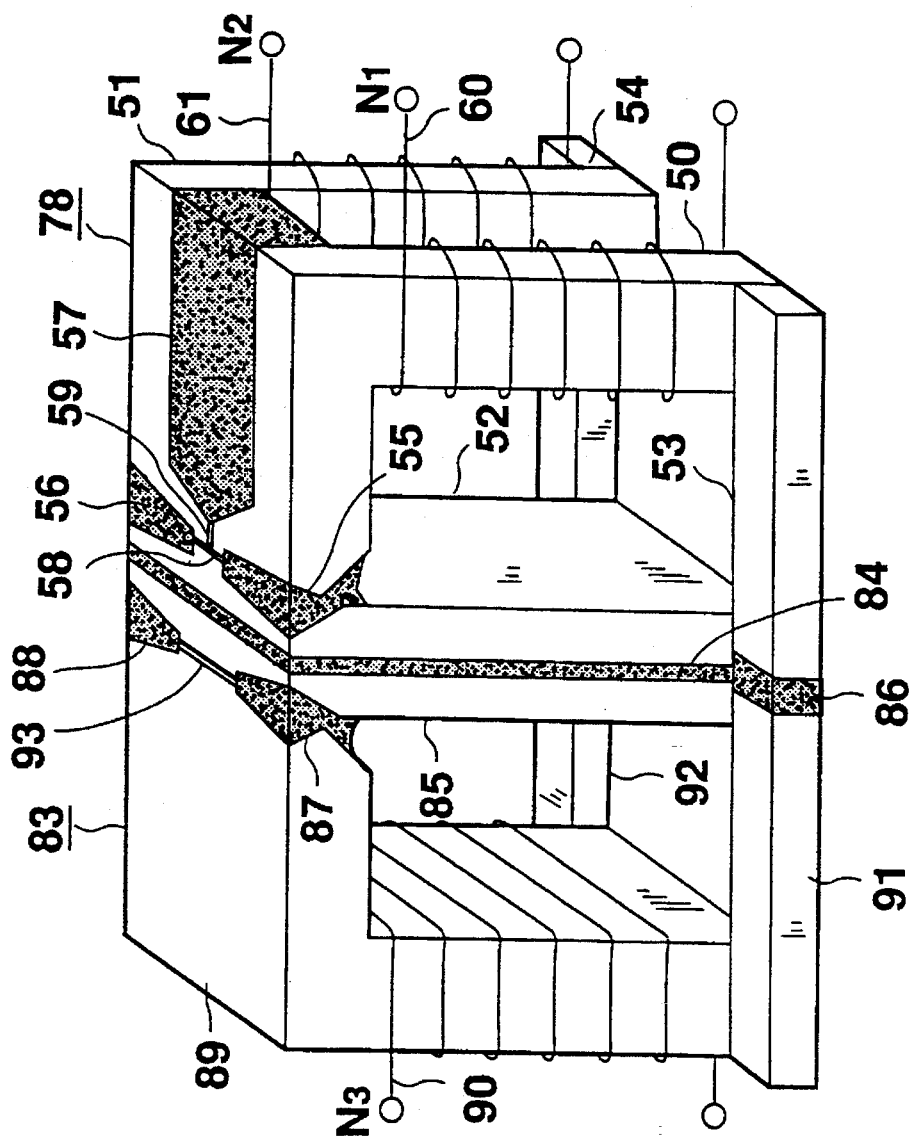
FIG. 37 is a perspective View of a fifth embodiment of a combined magnetic head according to the present invention.

FIG. 37 shows the fifth embodiment of a combined magnetic head according to the present invention. In this embodiment, in front of a combined magnetic head of a twin construction shown in FIG. 21, a preceding erase head 83 having a double track width of the sum of the two track widths of the twin head is integrally provided via a magnetic insulation layer (central spacer) 84 composed of a glass, a ceramic or the like. When the magnetic insulation layer 84 is the glass, the combined magnetic head 78 and the preceding erase head 83 are coupled with each other by glass welding, and, when the magnetic insulation layer 84 is ceramic or the like, the combined magnetic head 78 and the preceding erase head 83 are connected by an organic adhesive. The preceding erase head 83 includes an I core part 85 composed of the same material as the core parts 50 to 52, a magnetic insulation material 86 composed of glass or the like for preventing the magnetic cross talk between the preceding erase head 83 and the read/write head, glasses 87 and 88 composed of the same material as the glasses 55 and 56, a C core part 89 composed of the same material as the core parts 50 to 52, an erase coil 90 wound around the C core pare 89, a pair of back cores 91 and 92 composed of the same material as the back cores 53 and 54, and an erase gap 93.

In this embodiment, at the recording time, the data are separately recorded by the two magnetic heads, and at reproducing time, the two magnetic heads are operated as a single head. By adopting this recording system, though the line density of the magnetic recording depends on the magnetic property (mainly coercive force) of the magnetic medium and the gap length of the head, the large capacity FDD or HDD capable of recording the high line density (double) at the same gap length of the conventional magnetic head can be implemented by the magnetic head of the twin structure of the in-line gap. Further, since the erase head 83 is provided in front of the twin head, by adapting the sum of the two track widths of the two heads to the track width of the lower device, an inexpensive FDD having a lower compatibility function of a further large capacity open loop system can be realized.

Next, the sixth embodiment according to the present invention will now be described.

Figure 38:
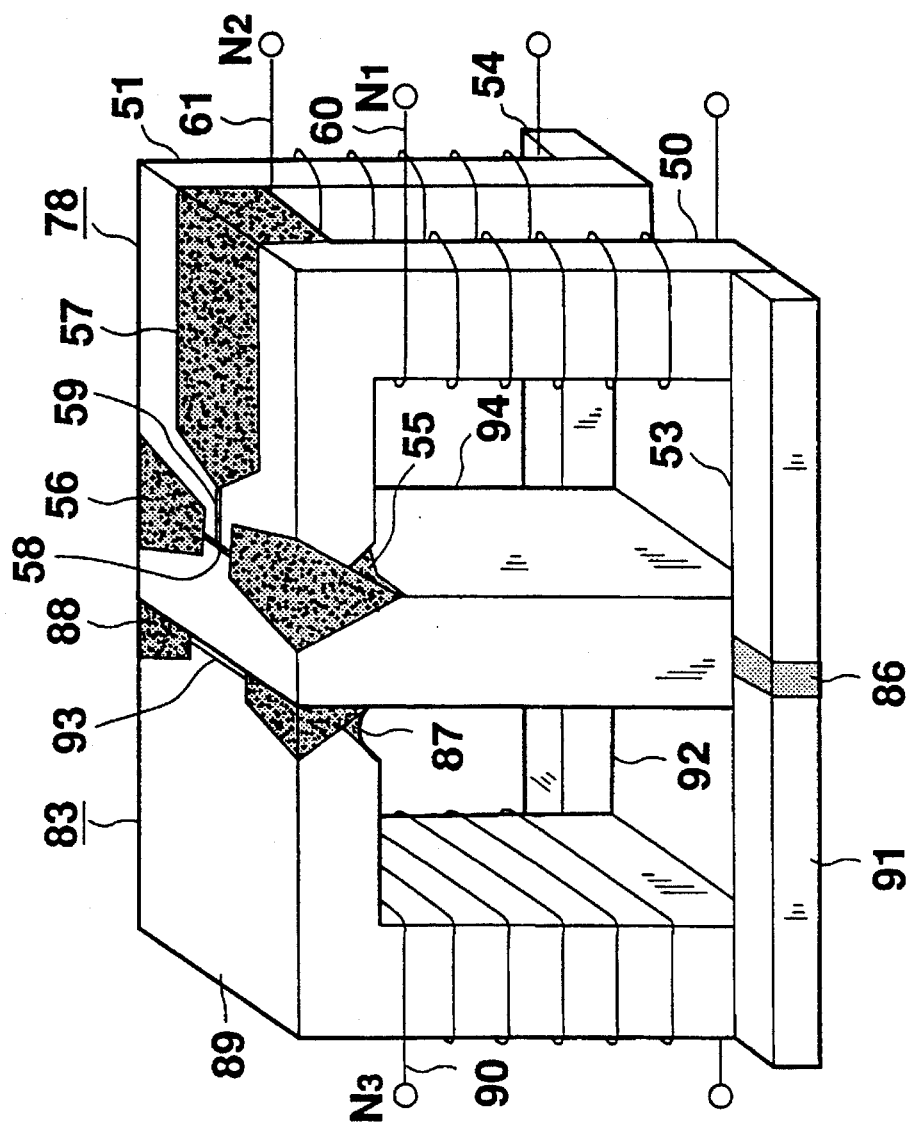
FIG. 38 is a perspective view of a sixth embodiment of a combined magnetic head according to the present invention.

FIG. 38 shows the sixth embodiment of a combined magnetic head according to the present invention. In this embodiment, a central core 94 serves as both an I core part of a read/write head 78 and an I core part of an erase head 83, and the other parts are the same as those of the combined magnetic head shown in FIG. 37. Thus, the same effects as those of the combined magnetic head shown in FIG. 37 can be obtained. In this embodiment, since there is no insulation layer between the central cores, the magnetic resistance of the central core is small, and thus the reproduction efficiency of the read/write head is high. In the head of this structure, concerning the erase cross talk due to the circulation of the flux picked up at the erase gap to the read/write core, by making the magnetic resistance of the erase core and the magnetic resistance of the central core to be almost equal, the control of the cross talk can be possible.

Then, the seventh embodiment according to the present invention will now be described.

Figure 39:
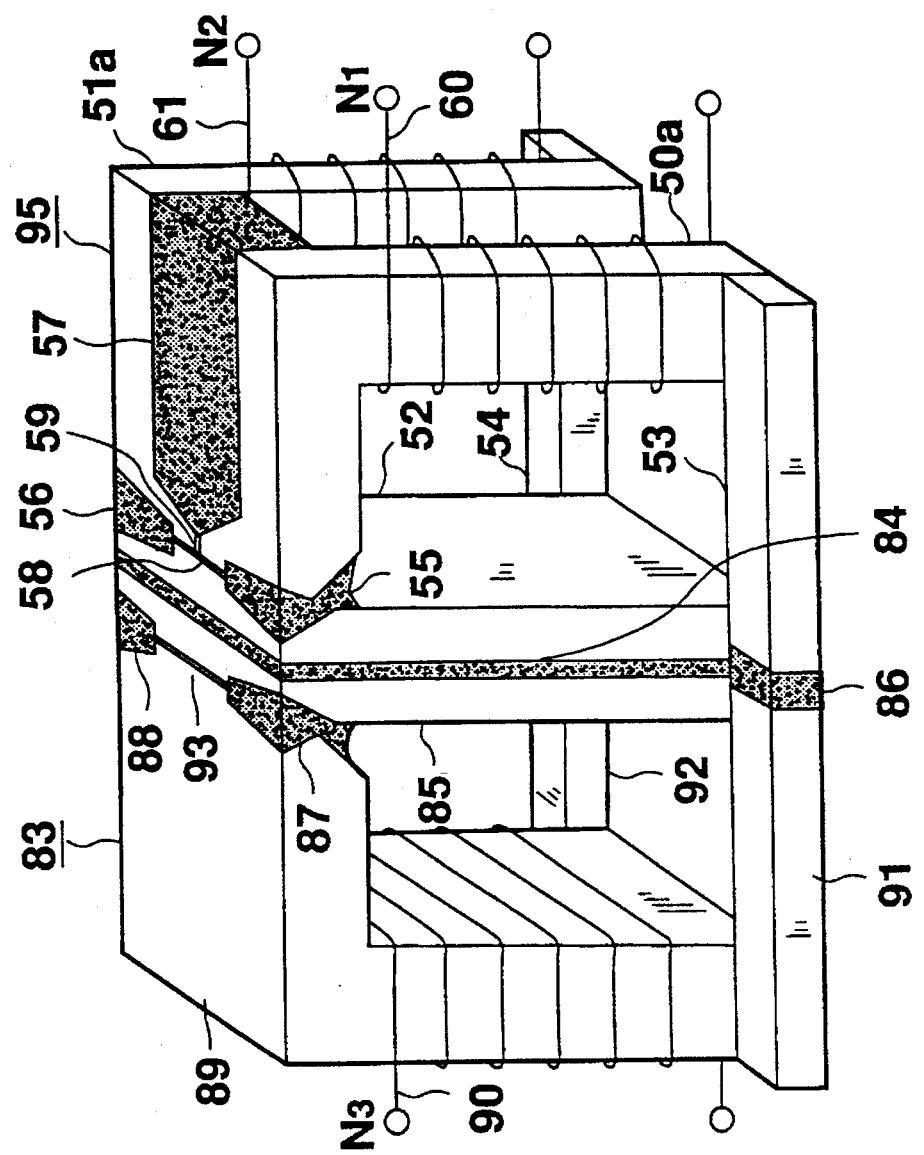
FIG. 39 is a perspective view of a seventh embodiment of a combined magnetic head according to the present invention.

FIG. 39 shows the seventh embodiment of a combined magnetic head according to the present invention. As shown in FIG. 39, in a combined magnetic head 95, a track width of a C core part 50a is different from a track width of a C core part 51a. Further, a line connecting the central point of the tracks of the two heads is perpendicular to the lines of the gaps 56 and 93. The other parts are the same as those of the combined magnetic head shown in FIG. 37.

Next, when the combined magnetic head shown in FIG. 39 is used as the head of a large capacity FDD having a lower compatibility function, as disclosed in Japanese Patent Laid-Open No. Sho 63-103408, the operation of this head will be described. In this case, one head of the twin structure is set to the head for the lower drive with the same track width as that of the conventional 1 MB, 2 MB or 4 MB drive, and the other head of the twin structure is used as the head for the upper drive with the narrow track width of the high density. Further, the erase head 83 having the double track width is arranged in front of the lower magnetic head, and the conventional sector servo system is used as the track positioning operation.

When the combined magnetic head is used as the head of this recording system, in the same manner as the case in which it is used as the head of the aforementioned two division recording system, the control of the cross talk (.the cross talk at the recording time is the ratio of the flux of the gap part of the other head to the flux of the gap part of one head when excited by one head, and the cross talk at the reproducing time is the ratio of the interlinking amount leaked from the flux reproduced at the gap of the other head to the coil of one head to the interlinking amount leaked from the flux reproduced at the gap of one head to the coil of the other head) between both the heads at the recording/reproducing time becomes the subject. When a medium having a large coercive force is used for the magnetic disk, since sufficient recording can not be carried out by a small leakage flux, the reduction of the cross talk of the reproducing system rather than the recording system becomes the large subject.

Figure 22:
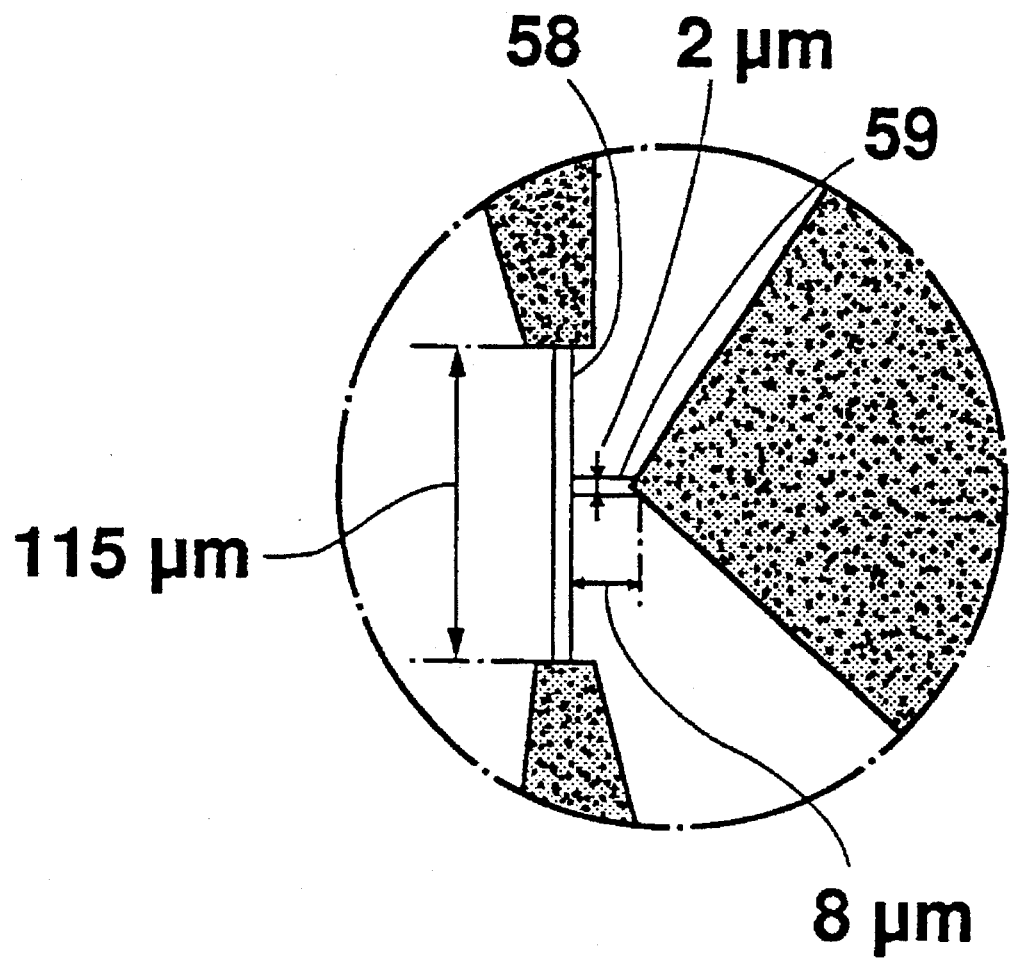
FIG. 22 is an enlarged fragmentary top view of a circular part A shown in FIG. 21.

In the third embodiment, like the first embodiment, for the reduction of the cross talk, the similar optimum head structure is used. In the third embodiment, since the cross talk reduction effect can not be so much expected because of the thin insulation layer, the I core is integrated from the view point of rather the productivity improvement. As to the C cores, the insulation layer between the C core half pair is thinned and the length of the insulation layer part is shortened. More specifically, the insulation layer is formed less than 5 μm by the thin film formation, and the value obtained by dividing the product of the track width (the narrower track width when the track widths of the heads are different) of one side head and the thickness of the non-magnetic insulation layer by the product of the gap length and the length of the non-magnetic insulation layer part is determined and is at least 10. For example, as shown in FIG. 22, when the sum of the track widths of the two heads is 115 μm, the gap length is 0.5 μm, the thickness of the insulation layer 59 is 2 μm, the length of the insulation layer is 8 μm, and the magnetic permeability of the head core material is 5000, as shown by the calculation result of FIG. 43, as hereinafter described in detail, the cross talk can be reduced to −24 dB.

Further, the double azimuth system for the recording/ reproducing of the VCR image using two kinds of heads having the two different track widths independently formed at the recording/reproducing of the long time mode (EP mode) and the short time mode (SP mode) is expensive, and the relative positioning of the two heads is difficult. However, according to the present invention, the magnetic head of the twin structure is inexpensive and the relative positioning of the two heads is not required. When the combined magnetic head is used as the VCR head, the track width of one magnetic head is set to the track width for the long time mode, and the sum of the track widths of the two magnetic heads is set to be the wide track width for the short time mode. At the long time mode recording time, one head is used and the coil of the other head is short-circuited in order to prevent the cross talk. Further, at the short time mode recording time, the two heads are connected in series so as to use as the single head.

Next, the eighth embodiment according to the present invention will now be described.

Figure 40:
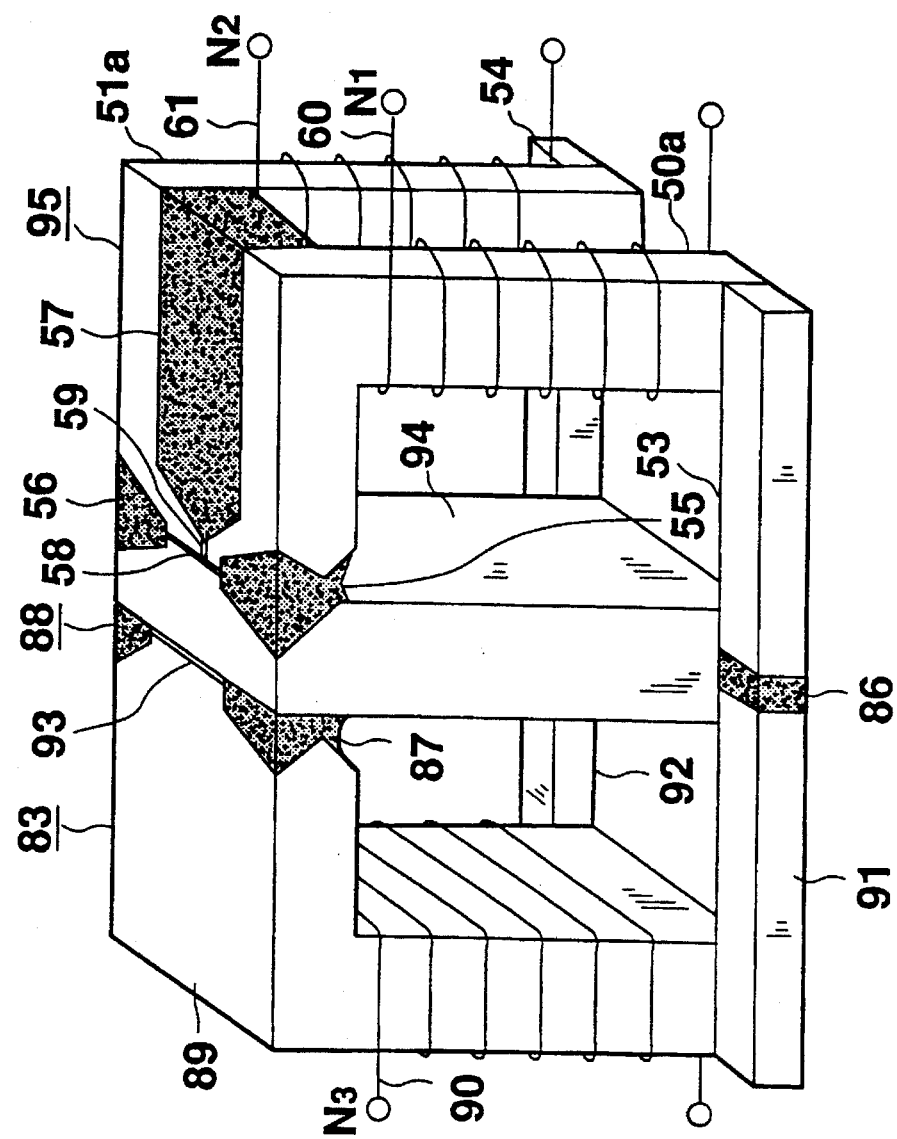
FIG. 40 is a perspective view of an eighth embodiment of a combined magnetic head according to the present invention.

FIG. 40 shows the eighth embodiment of a combined magnetic head according to the present invention. In this embodiment, a central core 94 serves as both the I core part 52 of the combined magnetichead 95 and the I core part 85 of an erase head 83, and the other parts are the same as those of the combined magnetic head shown in FIG. 39. Thus, the same effects as those of the combined magnetic head shown in FIG. 39 can be obtained. In this embodiment, the construction of the head can be simplified. As regards the common central core 94, the same effects as those of the sixth embodiment shown in FIG. 38 can be also obtained.

Next, the eighth embodiment according to the present invention will now be described.

Figure 41:
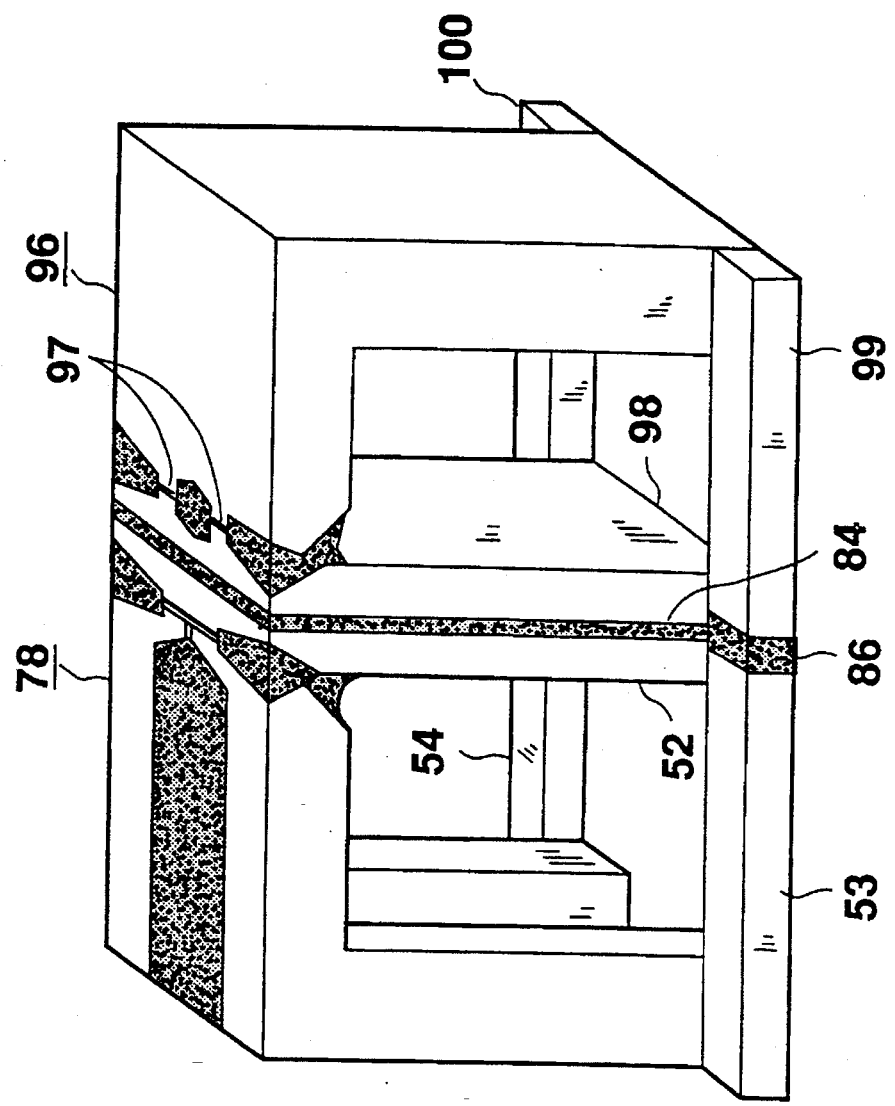
FIG. 41 is a perspective view of a ninth embodiment of a combined magnetic head according to the present invention.

FIG. 41 shows the ninth embodiment of a combined magnetic head according to the present invention. In this embodiment, the combined magnetic head 78 shown in FIG. 21 and a tunnel erase type erase head 96 are integrated by connecting the I core part 52 and an I core part 98 via the magnetic insulation layer 84 and connecting the two back cores 53 and 54 and two back cores 99 and 100 via the magnetic insulation material 86. In this case, the same effects as those of the above-described embodiments can be obtained.

In the twin head using the metallic oxide such as the Mn—Zn ferrite, the Ni—Zn ferrite or the like, a thin film of a metallic magnetic material such as the Co—Nb—Zr amorphous alloy, the sendust (Fe—Si—Al alloy) or the like with a higher saturation flux density than that of the ferrite is formed on the gap surface of the I core part before the gap material formation to obtain a twin structure head of a so-called MIG (metal in gap) type having a superior recording performance against a high coercive force medium. This MIG type twin head can be also included in the present invention. In this case, however, a formation of a magnetic film on the C core parts before the gap material formation is not preferable because the two C core parts are magnetically short-circuited via the magnetic films.

Next, the tenth embodiment according to the present invention will now be described.

Figure 52:
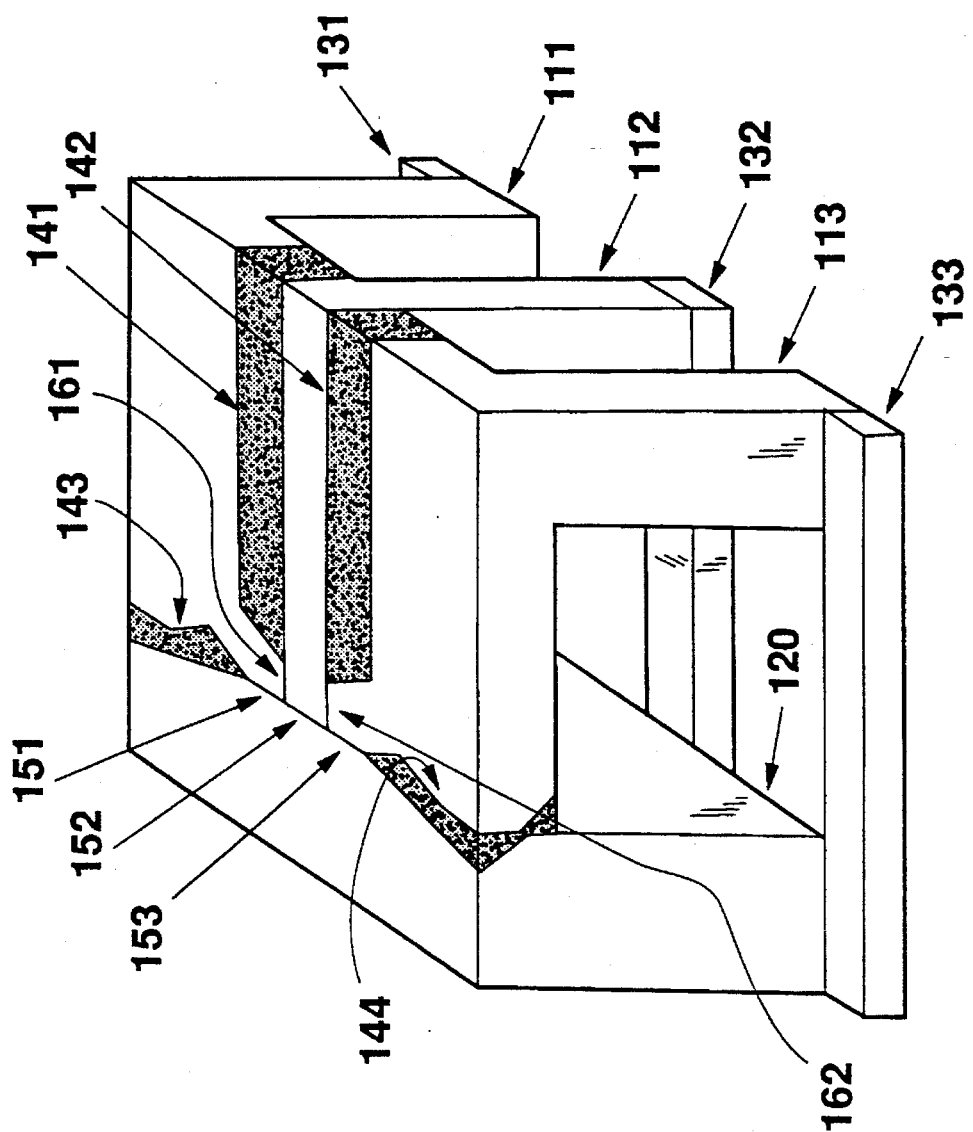
FIG. 52 is a perspective view of a tenth embodiment of a combined magnetic head of an in-line gap triple structure according to the present invention.

FIG. 52 shows the tenth embodiment of a combined magnetic head of a triple structure according to the present invention. The triple structure head is comprised of three C core parts 111, 112 and 113 of read/write cores constituting the triple core composed of the metallic magnetic material represented by the single or poly crystalline metallic oxide having a high magnetic permeability such as Mn—Zn ferrite, Ni—Zn ferrite or the like or the sendust (Fe—Al—Si alloy), an I core part 120 of the read/write cores of the magnetic integral structure, composed of the same material as the C core parts 111, 112 and 113, three back cores 131, 132 and 133 for carrying out a magnetic shunting of the C core parts 111, 112 and 113 and the I core part 120, composed of the same material as the read/write cores, glasses 141, 142, 143 and 144 molded at a work temperature of 500° to 1000° C., three read/write gaps 151, 152 and 153 of a non-magnetic thin film such as $SiO_2$, $Al_2O_3$ or the like, formed by sputtering, vapor deposition or the like, and insulation layers 161 and 162 composed of the same material as the read/write gaps 151, 152 and 153 for magnetically separating the C core parts of the triple core. In FIG. 52, three read/write coils wound around the C core parts are omitted for brevity.

The combined magnetic head can be suitably used for the high density large capacity: floppy disk drive (FDD) using the tracking servo adopting the new data positioning system and the fixed magnetic disk drive (HDD), as disclosed in Japanese Patent Laid-Open No. Sho 50-15520. That is, when the data information is recorded or reproduced onto or out of the magnetic recording medium, three magnetic heads of the triple structure are independently used and the data information is separately recorded on three parallel data tracks.

On the other hand, the head positioning operation by using the tracking servo is carried out by the two magnetic heads located in both the sides. At this time, only the data information is recorded on the central track and the information of the signal comparison for the tracking servo is recorded on the parts of the two sides data tracks.

Figure 66:
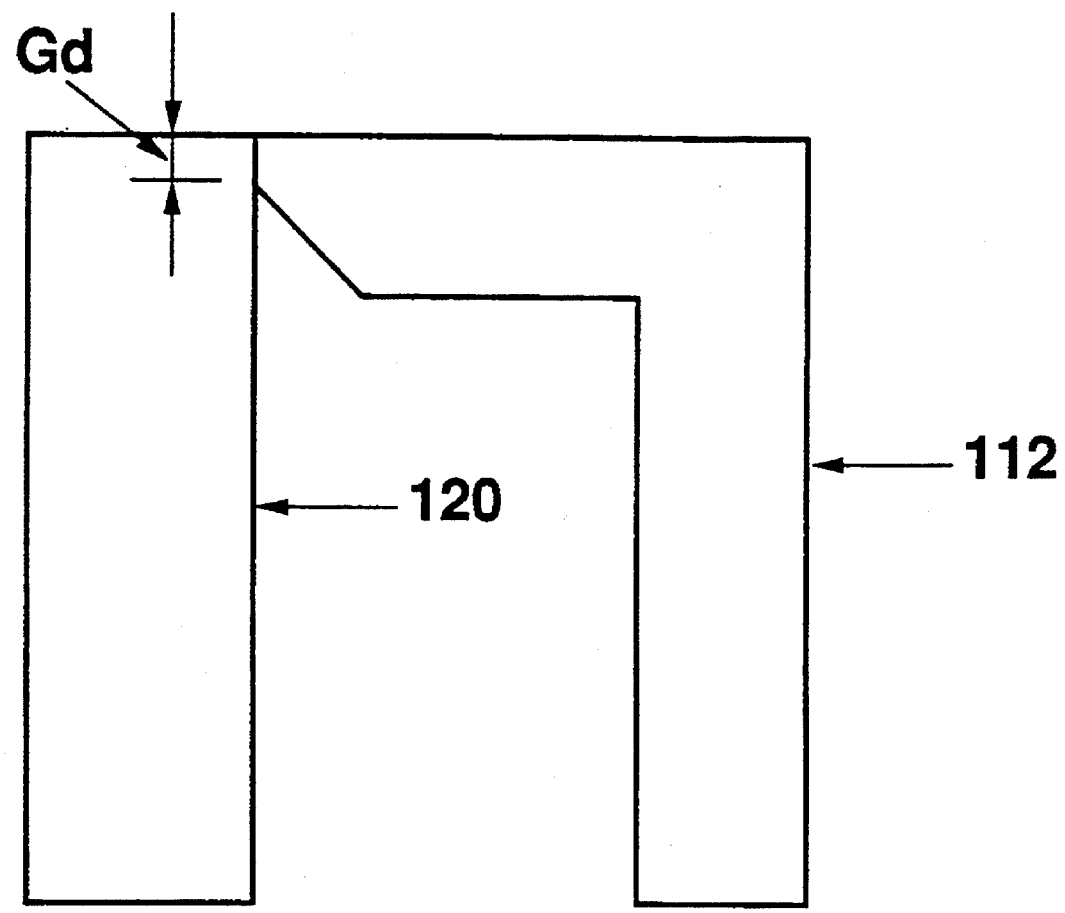
FIG. 66 is a front view showing a gap depth of the combined magnetic head shown in FIG. 52.

In this case, in order to perform the head positioning operation with high accuracy, the two side heads must have the equal recording/reproducing performance. In order to realize the 1/10 off-track performance of the track width of one head, the sensitivity ratio between the two side heads must be at least 0.9. For this, it is necessary to restrict the differences of the gap length (gap width) G1 (see FIG. 67), the gap depth Gd (see FIG. 66) and the track width Tw (see FIG. 67) between the two side heads to less than several %.

Figure 43:
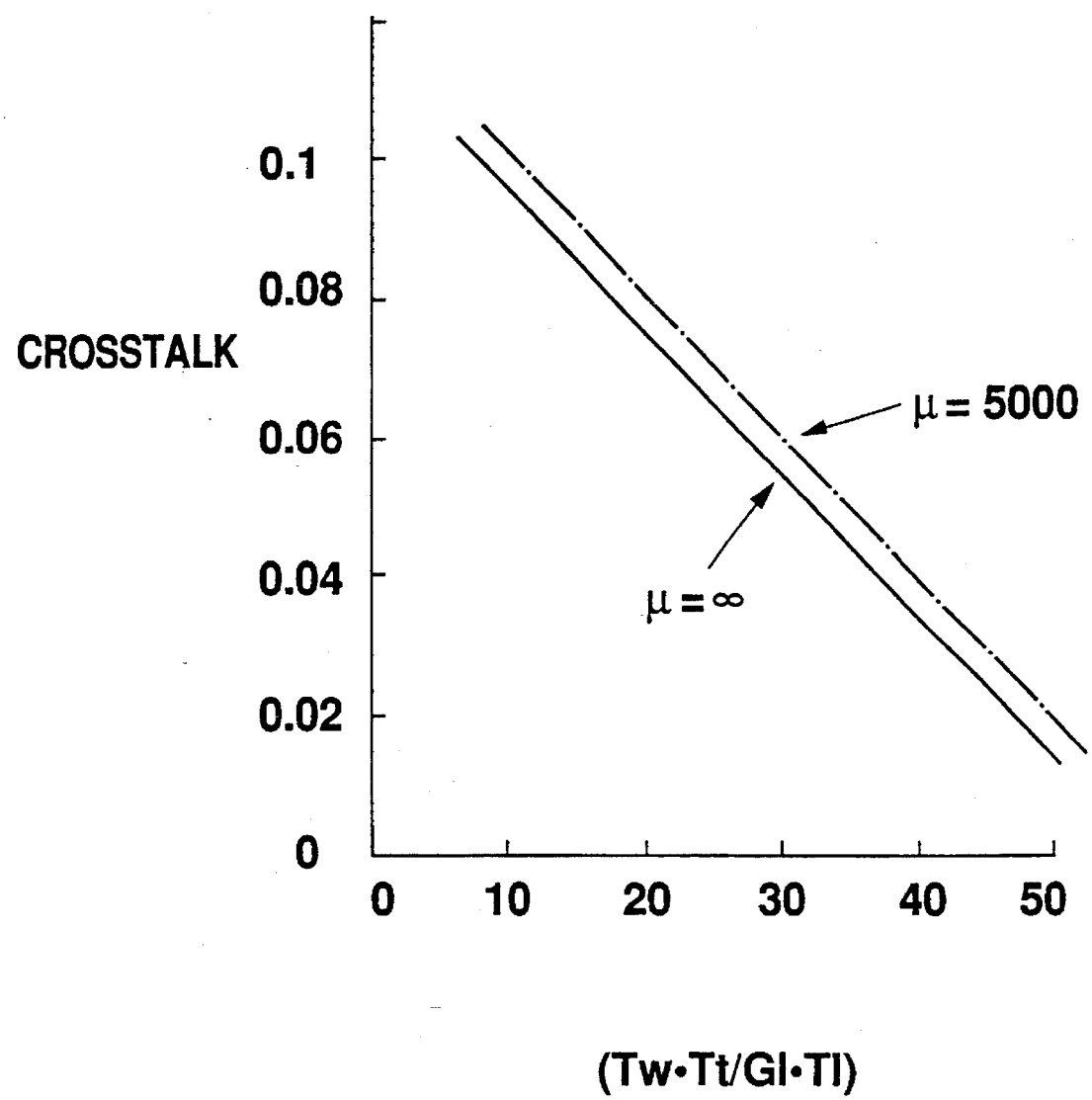
FIG. 43 is a graphical representation showing relationship between crosstalk and a core dimension according to the present invention.
Figure 51A:
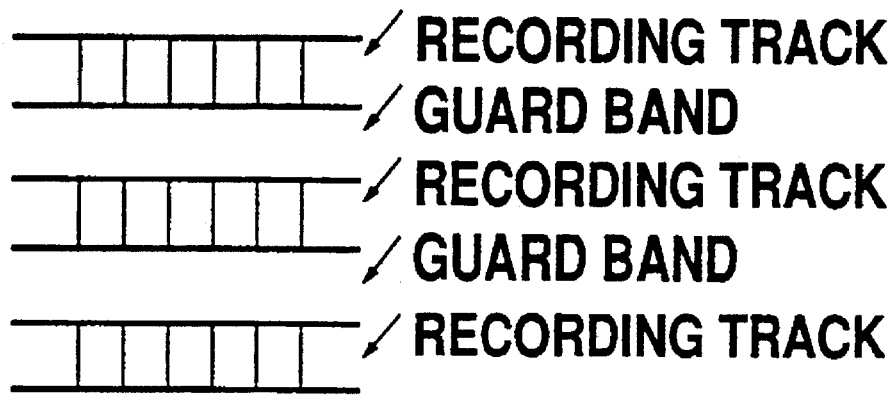
FIG. 51A is a schematic view showing a record magnetization pattern of a conventional triple core head and FIG. 51B is a schematic view showing a record magnetization pattern of a triple core head according to the present invention.
Figure 51B:
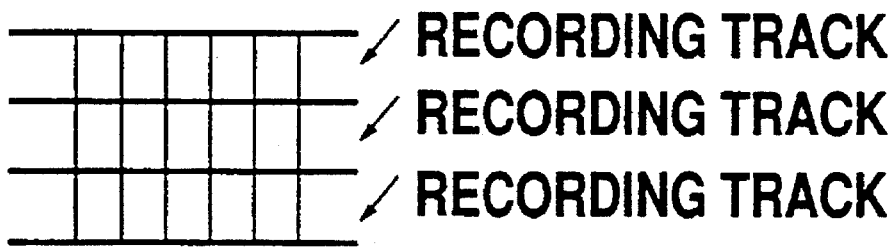
Figure 67:
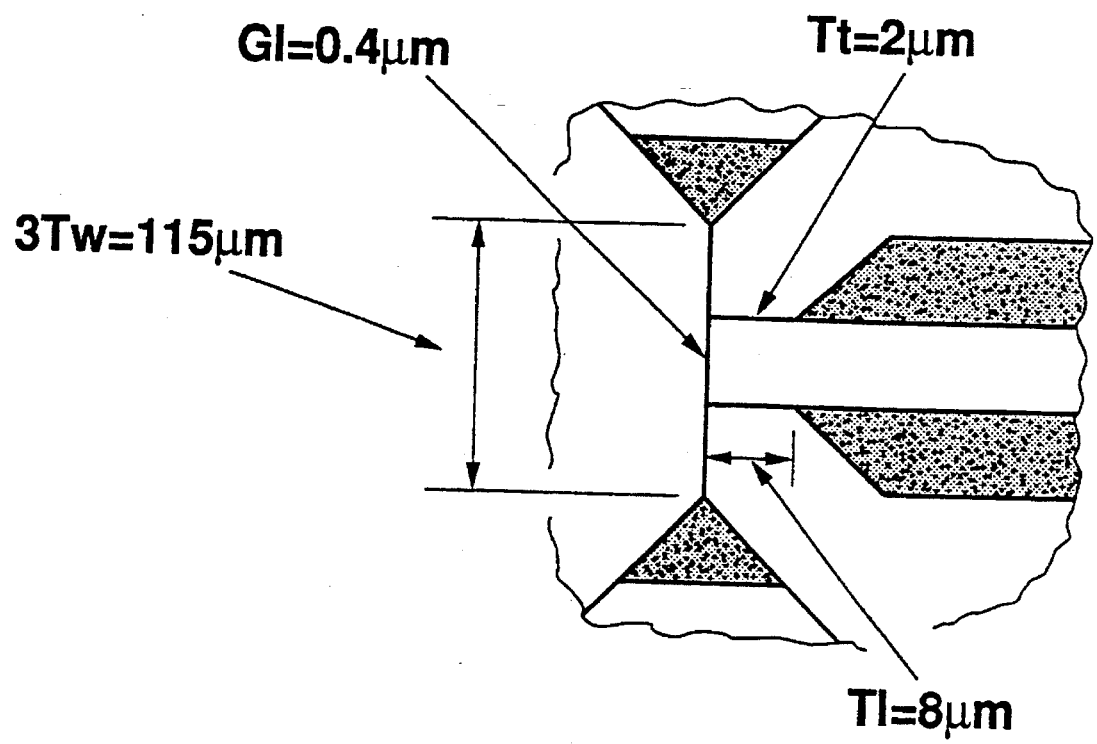
FIG. 67 is an enlarged fragmentary view showing a read/write gap part of the combined magnetic head shown in FIG. 52.

As shown in a record magnetization pattern of the present invention in FIG. 51B, in order to realize the high track density recording, when the data information is recorded on the three parallel tracks by using three magnetic heads arranged in parallel with a quite small interval therebetween, the control of the cross talk due to the leakage flux between the three heads becomes the large subject. In order to solve this subject, since the combined magnetic head of the present invention has not so much advantages from the view point of the cross talk reduction, the I core is formed to the integral structure from the view point of the productivity improvement. In turn, as to the C cores, the insulation layer thickness between the C core half bodies is thinned and the length of the insulation layer part is shortened. More .specifically, the insulation layer is formed to the thin film of less than 5 μm, and the value obtained by dividing the product of the track width of one side head of the adjacent two heads and the thickness Tt of the non-magnetic insulation layer by the product of the gap length and the length (cut depth) T1 of the non-magnetic insulation layer part is determined to at least 10. By employing this construction, as shown in FIG. 43 (the cross talk in the vertical axis is the value obtained by dividing the leakage flux by the main flux and the horizontal axis is the value obtained by dividing the product of the track width and the thickness of the insulation layer by the product of the gap length and the length of the insulation layer), the leakage flux can be reduced at most 10%. For instance, as shown in FIG. 67, when the sum of the track widths of the three heads is 115 µm, the gap length is 0.4 µm, the thickness of the insulation layer is 2 µm, the length of the insulation layer is 8 µm, and the magnetic permeability of the head core material is 5000, as shown by the calculation result in FIG. 43, the cross talk can be reduced to −23 dB.

Next, the producing method of the combined magnetic head of the tenth embodiment shown in FIG. 52 will now be described in connection with FIGS. 53 to 65.

Figure 53:
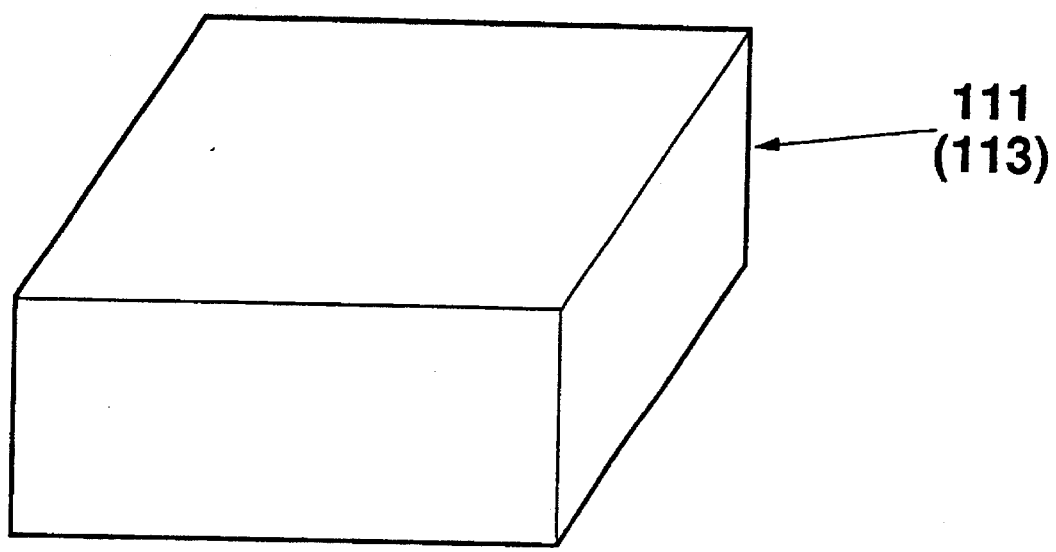
FIGS. 53 to 65 are schematic views showing a producing method of the combined magnetic head shown in FIG. 52.
Figure 54:
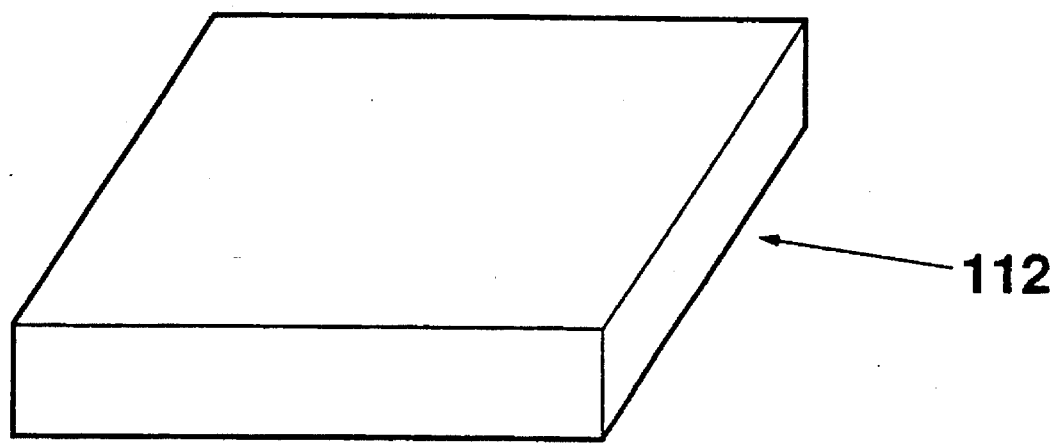

First, in FIGS. 53 and 54, a single or poly crystalline Mn—Zn ferrite material is finished to the desired dimensions by the cutting work, the lapping processing and the like to obtain the ferrite pieces 111, 112 and 113 to be used for the C core processing.

Figure 55:
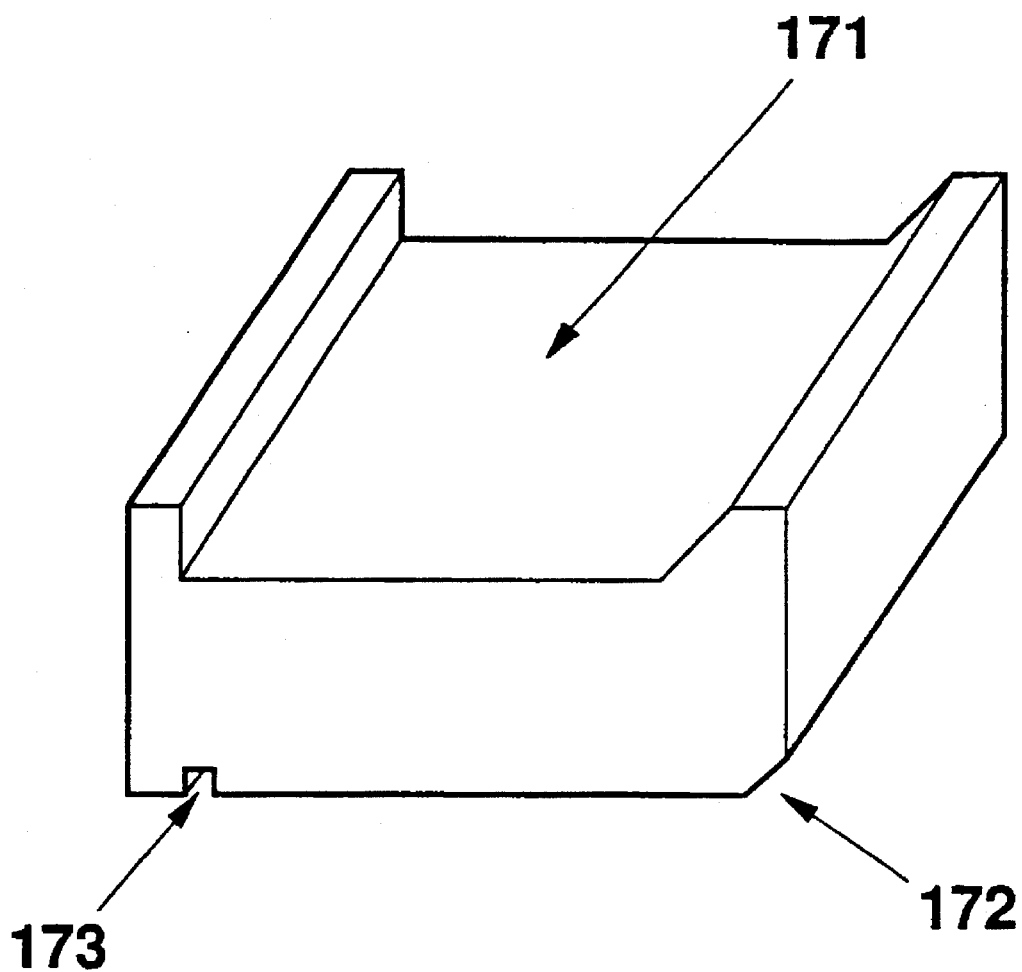

In FIG. 55, a C core separation groove 171 and glass insertion grooves 172 and 173 are formed in the ferrite piece 111.

Figure 56:
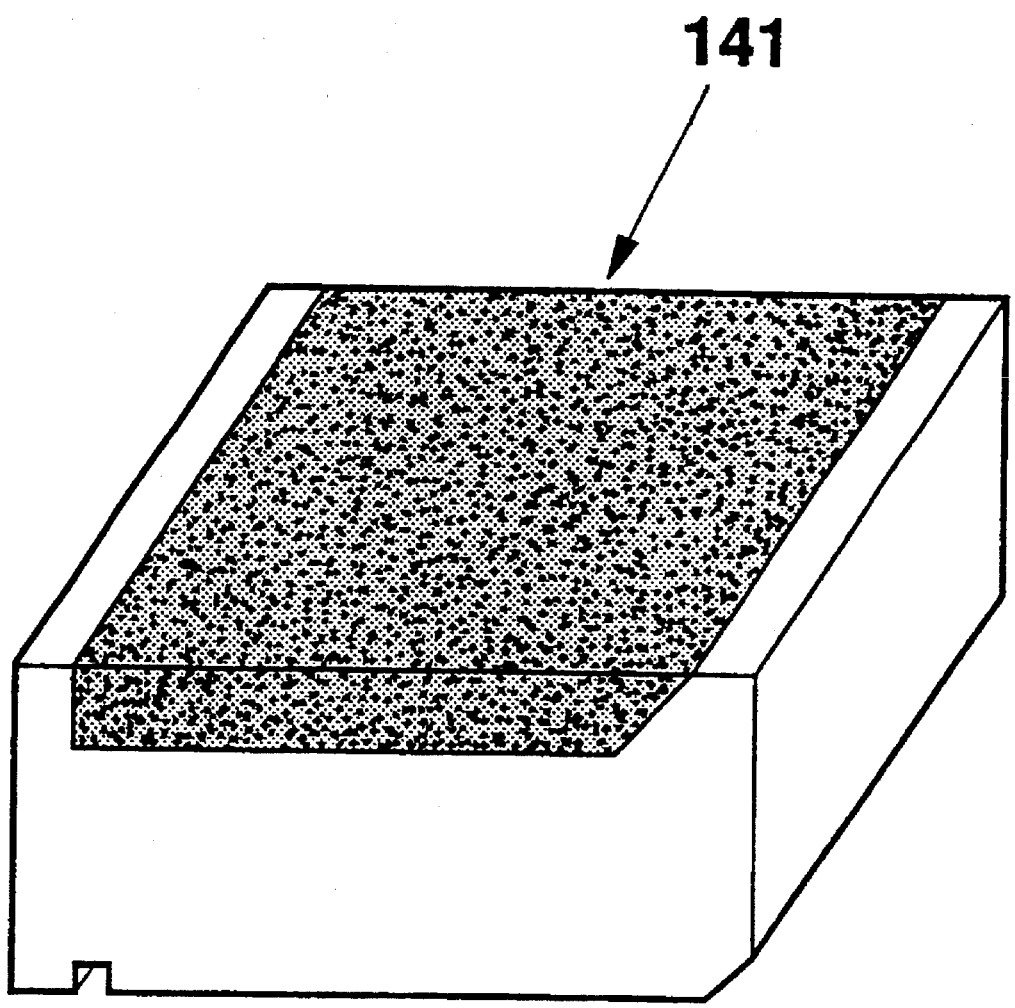

In FIG. 56, the high melting point glass 141 is molded in the C core separation groove 171. Then, the excess glass is removed, and the mold glass surface is polished to be flat.

Figure 57:
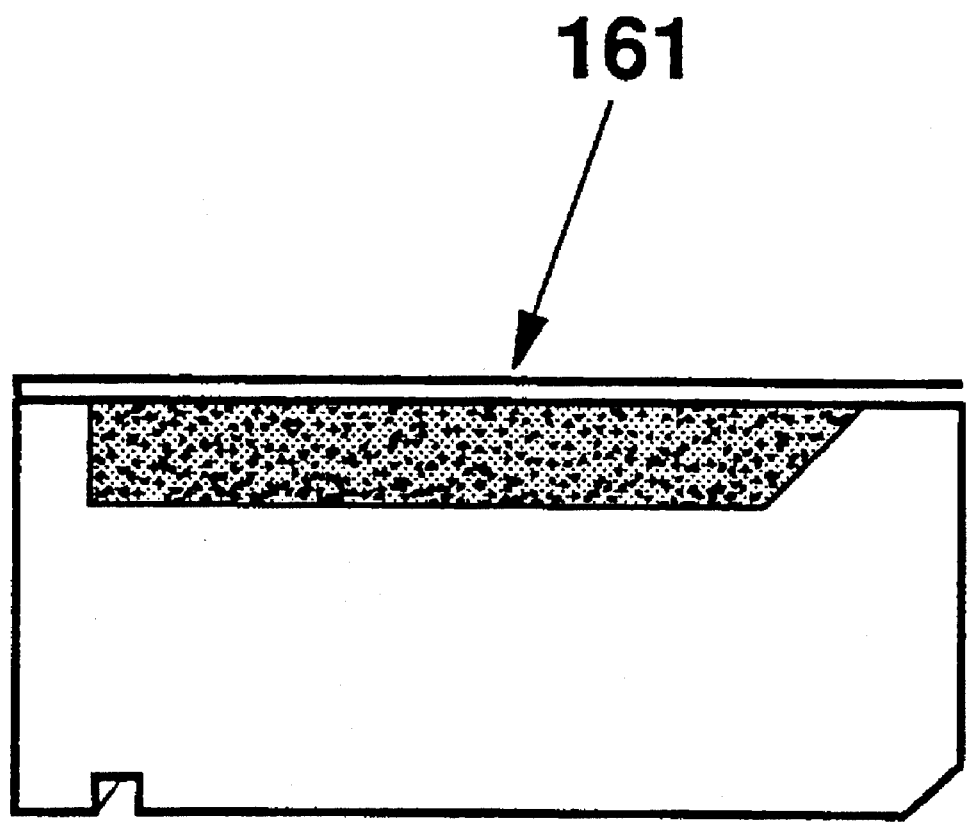

In FIG. 57, the non-magnetic insulation film 161 for preventing the magnetic cross talk between the C cores on the mold glass surface.

Figure 58:
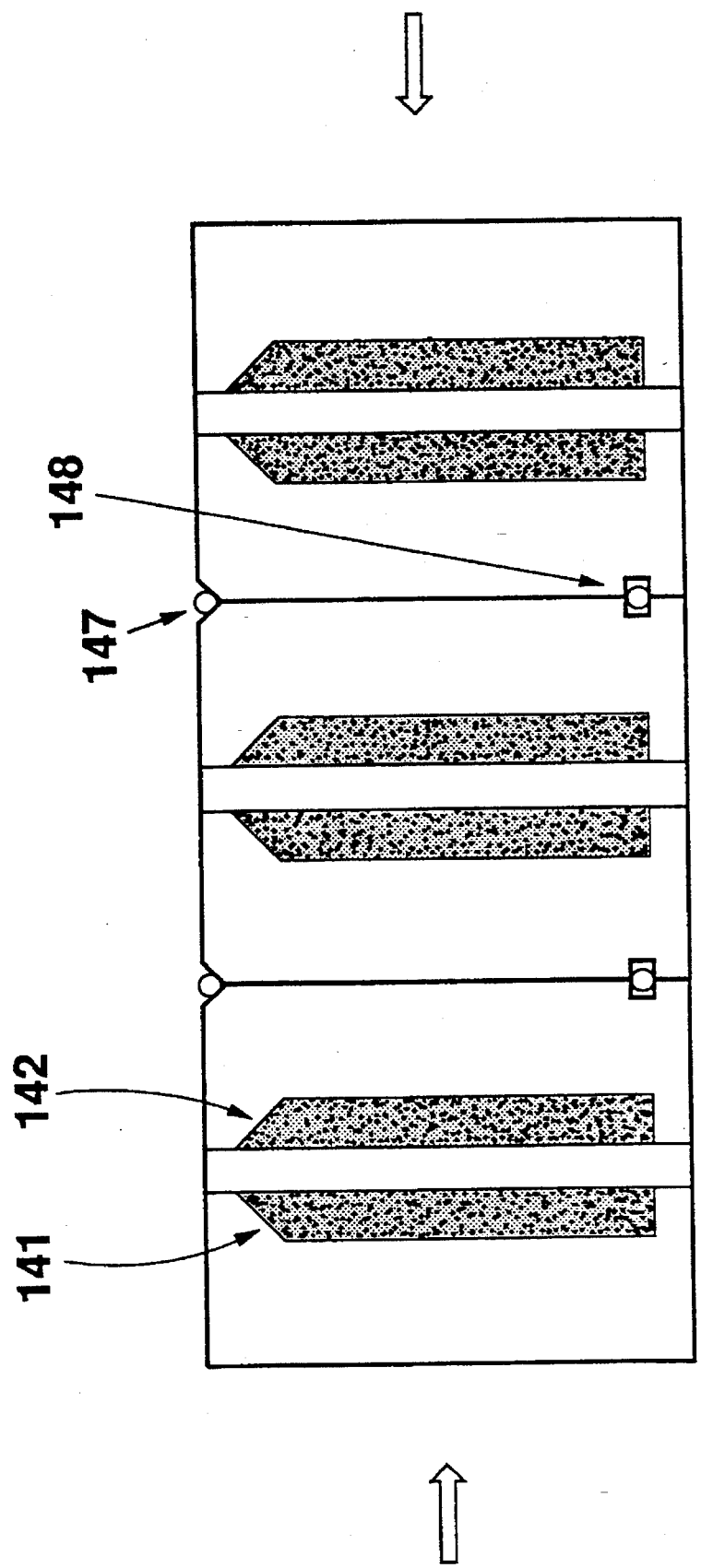

A plurality of C core blocks are then combined as shown in FIG. 58, and glass rods 143 and 144 are inserted into the glass insertion grooves 172 and 173. While the loads are applied in the directions indicated by the arrows, the temperature is raised to weld and integrate all the C cores.

In the following steps, only one block is shown for brevity of the drawing.

Figure 59:
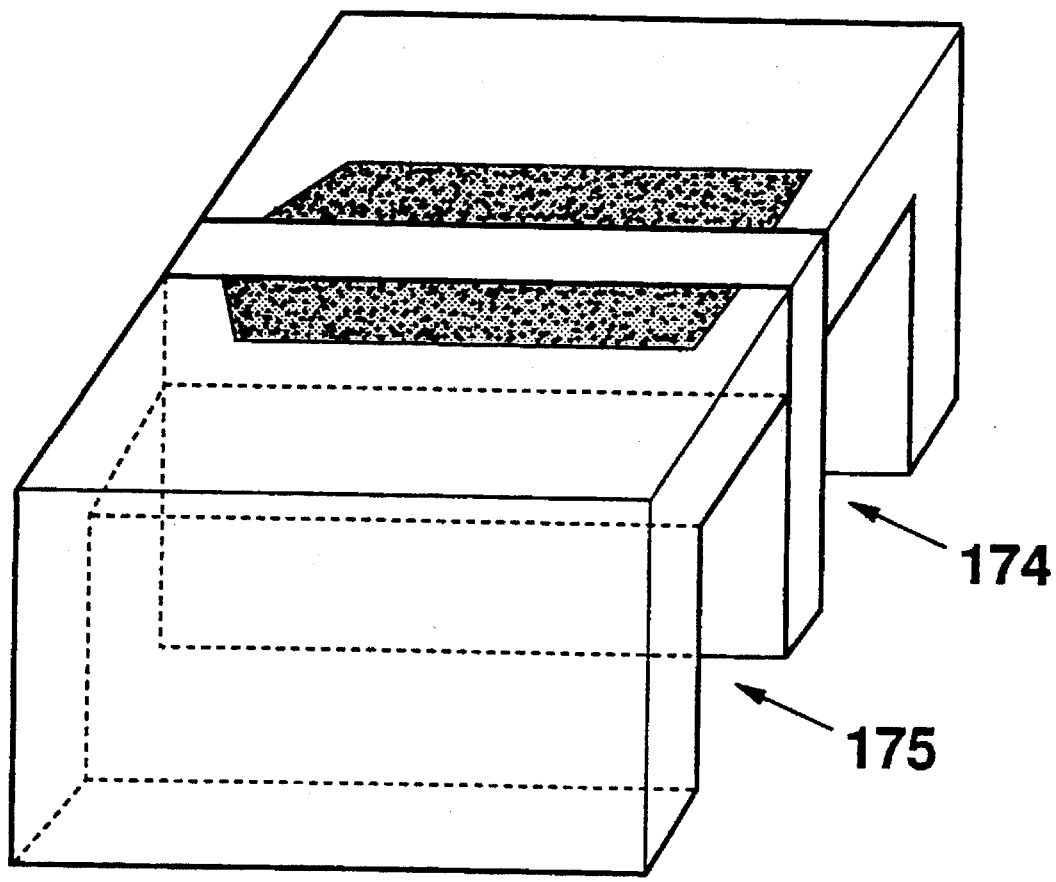

In FIG. 59, U grooves 174 and 175 for separating the C cores of the triple core and inserting the read/write coils are formed.

Figure 60:
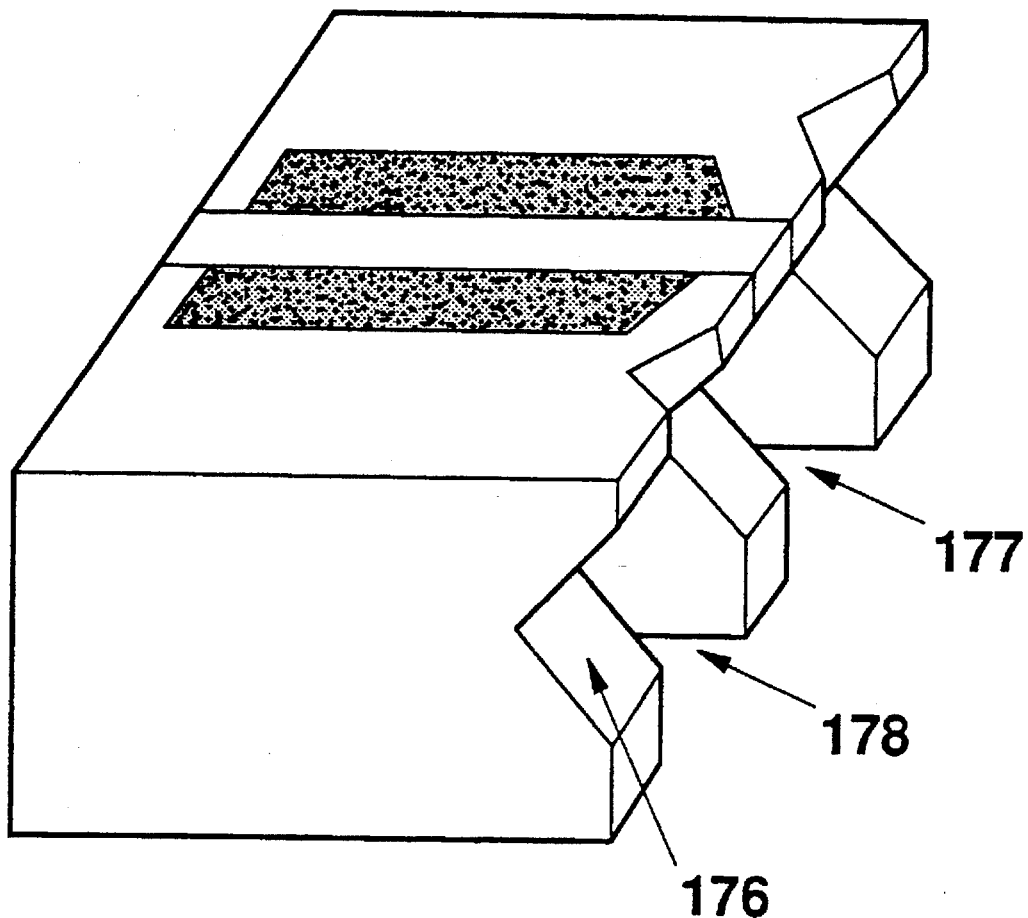

In FIG. 60, apex groove is 176 for restricting the gap depth Gd (shown in FIG. 66) of the triple core head and track width regulation grooves 177 and 178 are formed.

Then, the gap material is formed on the operational gap surfaces (not shown).

Figure 61:
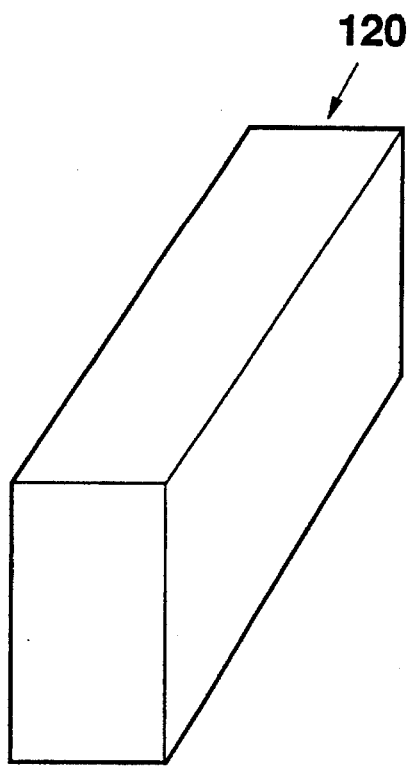

On the other hand, in FIG. 61, a single or poly crystalline Mn—Zn ferrite material is finished to the desired dimensions by the cutting work, the lapping processing and the like to obtain the ferrite piece 120 to be used for the I core processing.

Figure 62:
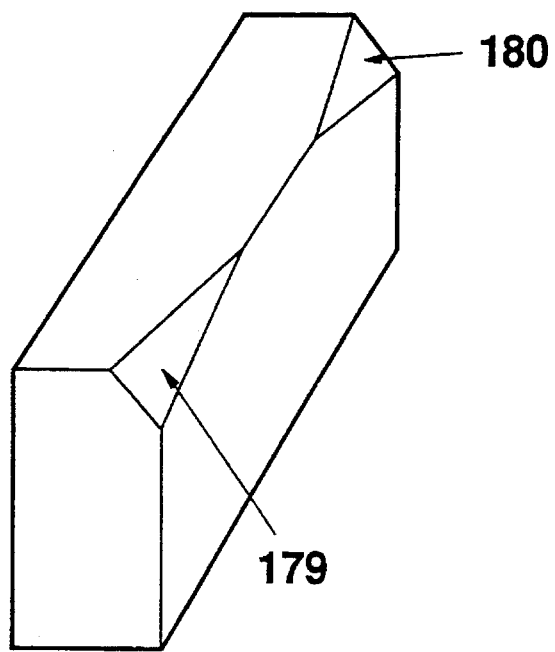

In FIG. 62, glass mold grooves 179 and 180 are formed in the ferrite piece 120 for I core by a cutting operation. After finishing this processing, the gap material is formed on the operational gap surfaces (not shown).

Figure 63:
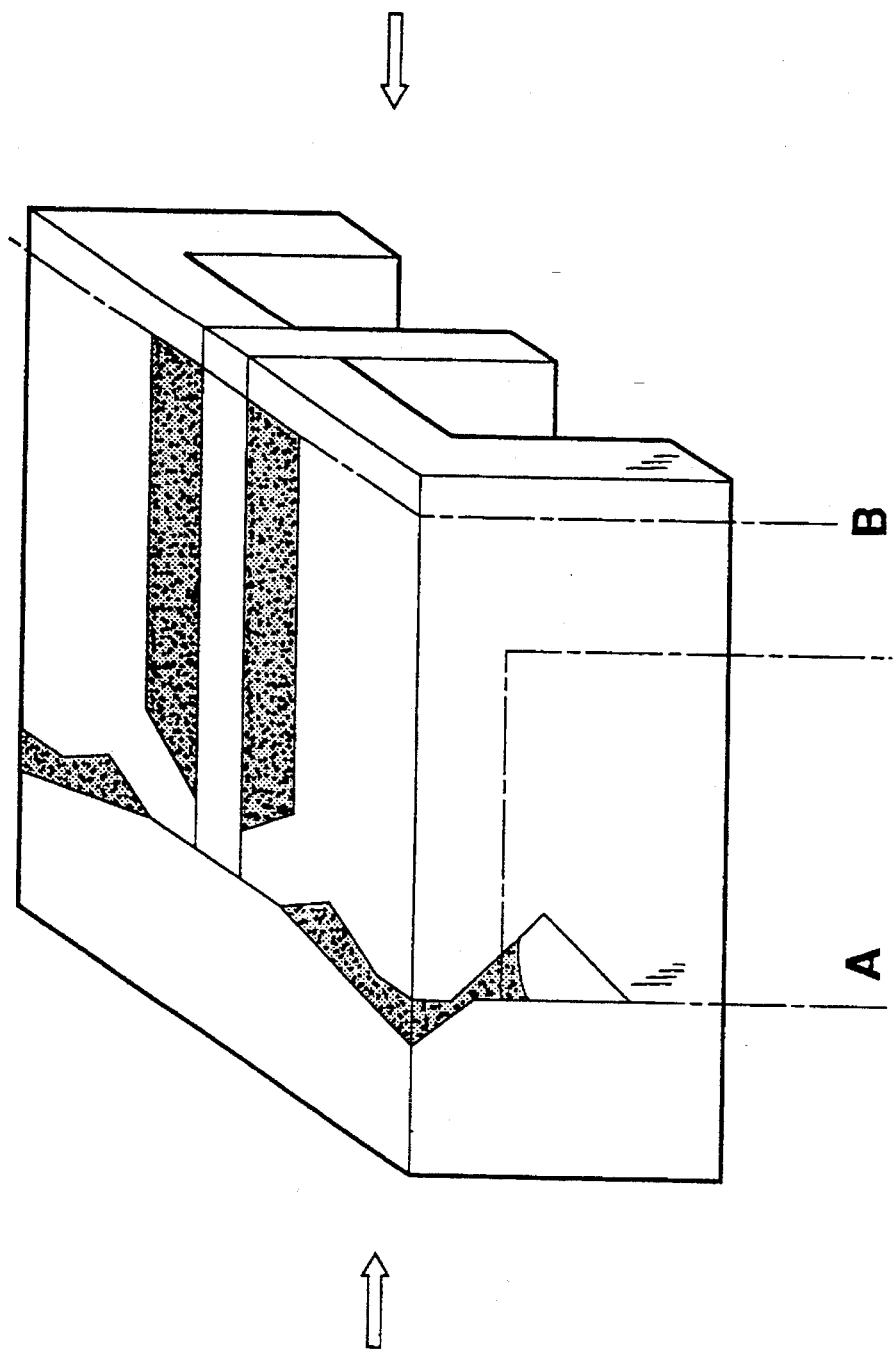

In FIG. 63, the cores obtained in the steps shown in FIGS. 60 and 62 are assembled as shown in FIG. 63, and the glass rods are inserted in the glass mold grooves 179 and 180. Then, while the loads are applied in the directions indicated by the arrows, the temperature is raised to weld and integrate both the cores.

Figure 64:
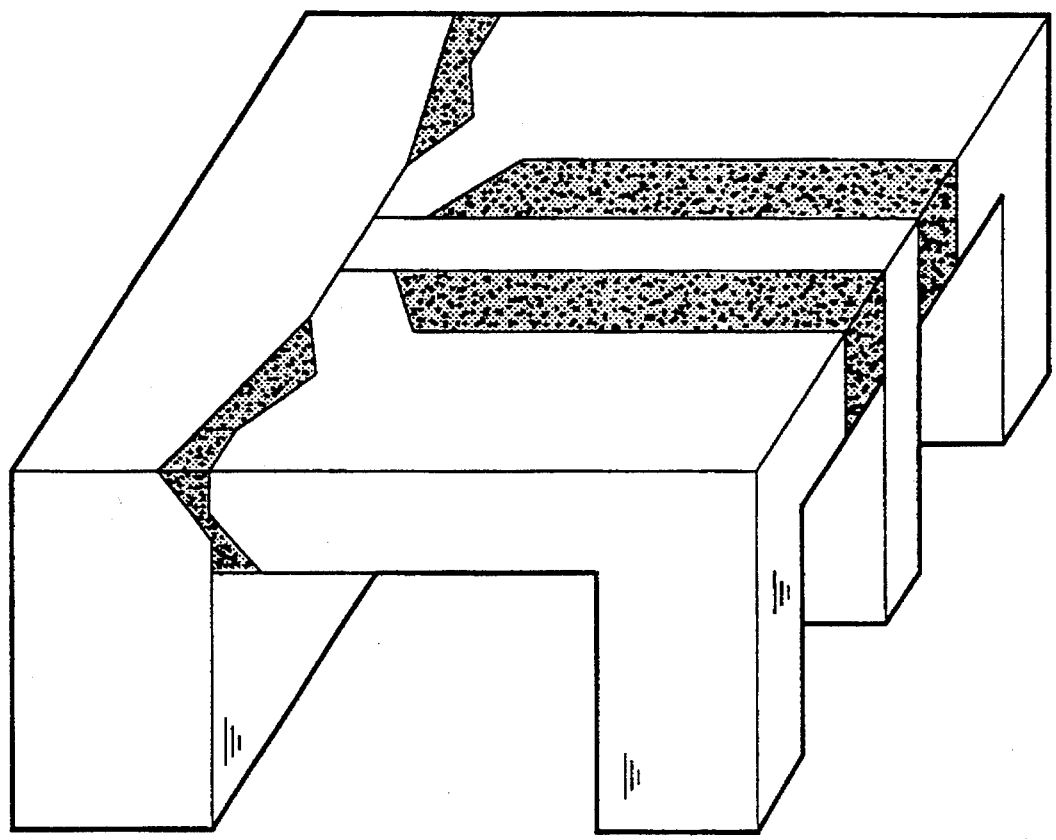

In FIG. 64, a groove cutting and a cutting of the obtained block are carried out along one-dotted lines A and B to obtain a triple core structure.

Figure 65:
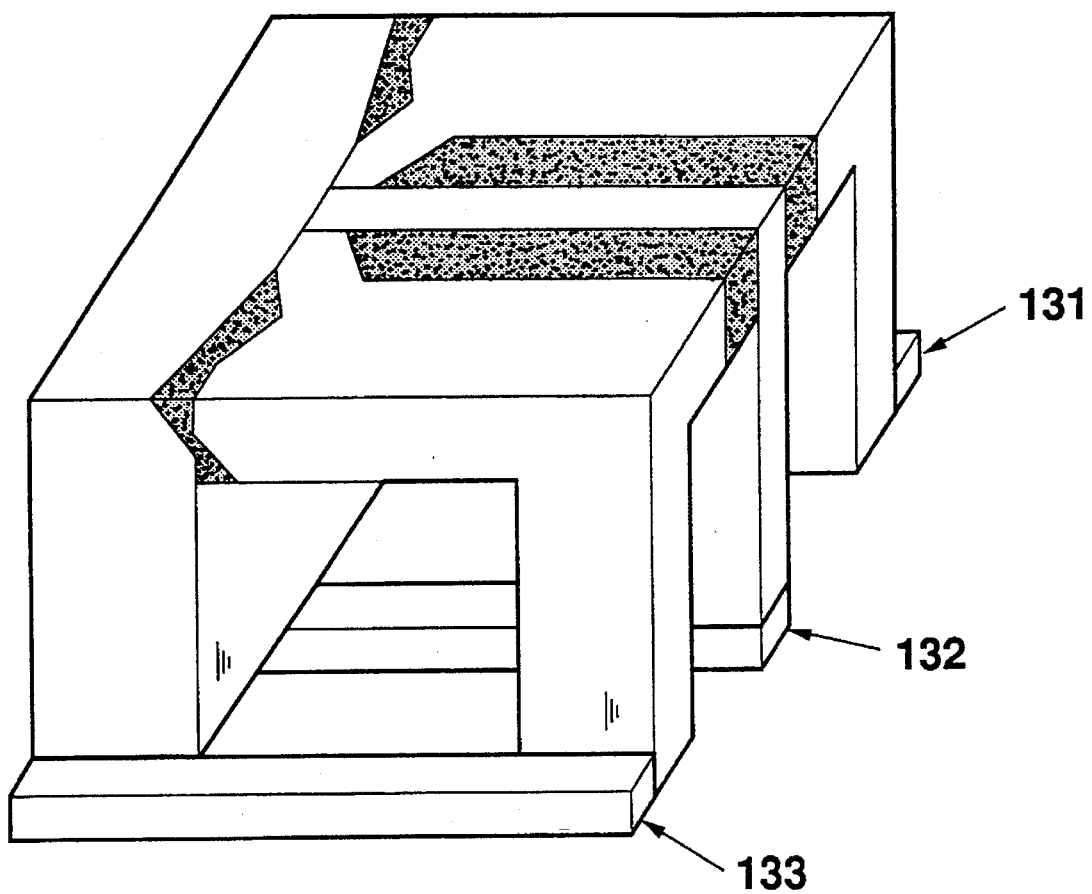

In FIG. 65, the back cores 131, 132 and 133 for shunting are attached to the triple core structure.

Then, the coils are wound around the C core parts 111, 112 and 113 to obtain the combined magnetic head.

Next, the eleventh embodiment according to the present invention will now be described.

Figure 68:
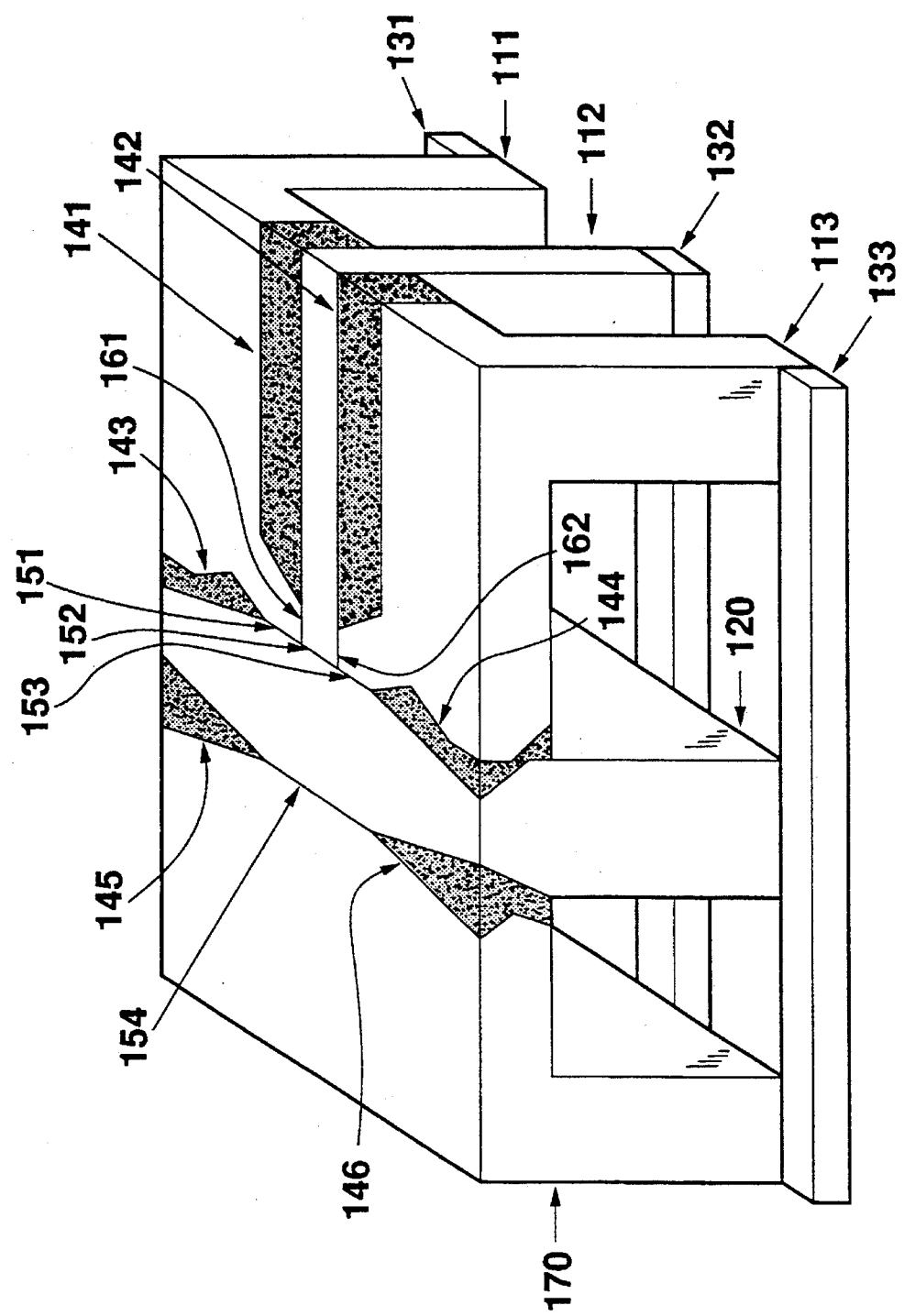
FIG. 68 is a perspective view of an eleventh embodiment of a combined magnetic head of a triple structure with an erase head according to the present invention.

FIG. 68 shows the eleventh embodiment of a combined magnetic head according to the present invention. In this embodiment, an erase head is integrated with the combined magnetic head of the tenth embodiment shown in FIG. 52. In this case, a C core part of the erase head is attached to the front side of the read/write head. That is, the combined magnetic head of the triple structure provided with the erase head in the input side of the medium is also included in the present invention. In this combined magnetic head, the I core acts as both the I cores of the read/write core and an E core. In FIG. 68, the erase head part includes the C core 170 of the E core, composed of the same material as the C core parts 111, 112 and 113 and the I core part 120, mold glasses 145 and 146 composed of the same material as the glasses 141, 142, 143 and 144, and an erase gap 154 composed of the same material as the read/write gaps 151, 152 and 153.

In this embodiment, by using this head, the large capacity FDD having the compatibility with the various current (1 MB, 2 MB and 4 MB) floppy disk drives of the open loop system can be implemented. When using as the lower drive, since the recording track widths of the lower drives are the same, the sum of the equal track widths of the three heads is adapted to the lower drive, and the gap length is adapted to that of the 4 MB drive. Further, the coils of the three heads are connected in series to use the combined magnetic head of the triple structure as the single head (the 4 MB drive having the lower compatibility with the 1 MB and 2 MB drives). In this case, the track width of the erase head is determined to double of the sum of the track widths of the three read/write heads.

Next, the twelfth embodiment according to the present invention will now be described.

Figure 69:
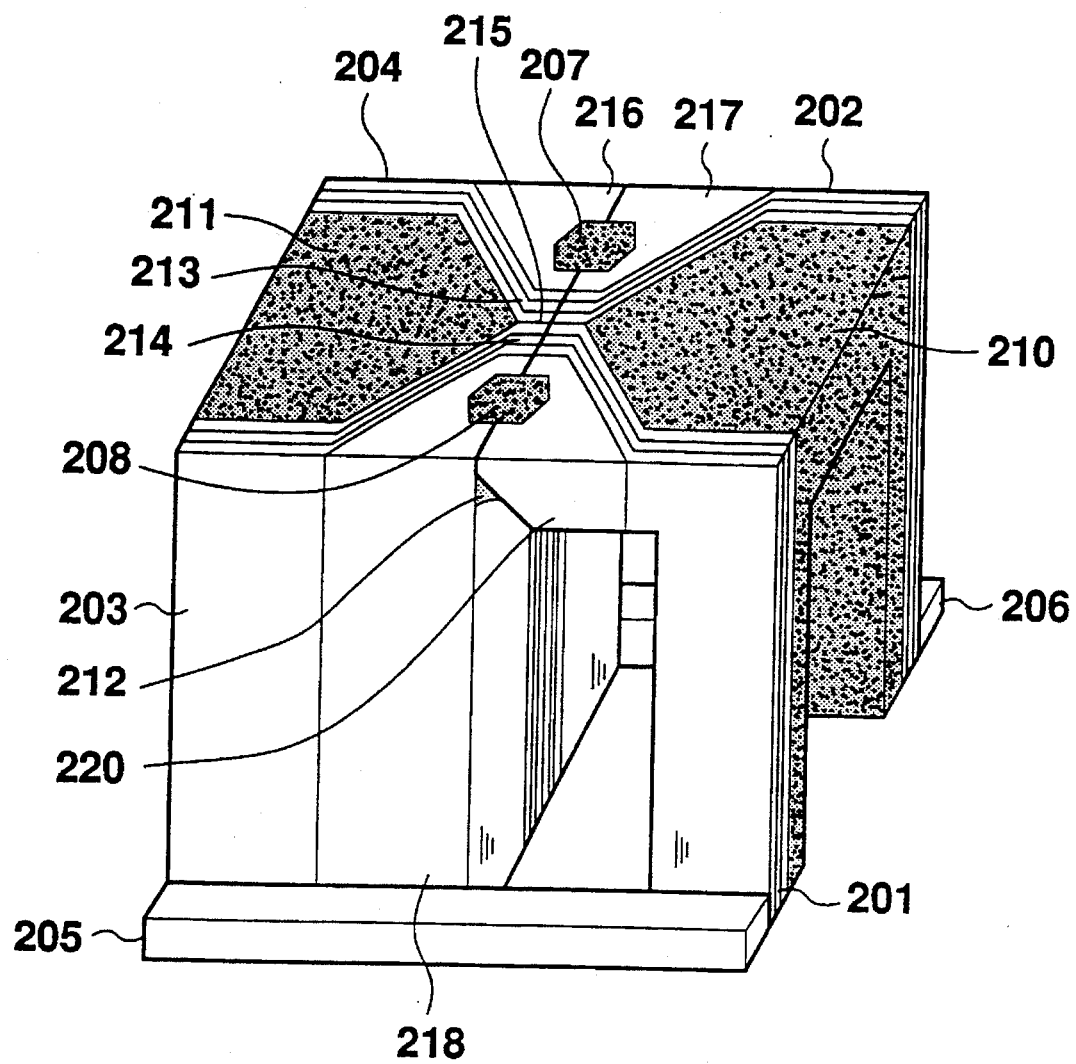
FIG. 69 is a perspective view of a twelfth embodiment of a combined magnetic head according to the present invention.

FIG. 69 shows the twelfth embodiment of a combined magnetic head according to the present invention. In this embodiment combined magnetic head includes two metallic multi-layer magnetic films 201 and 202 having a high magnetic permeability, which constitute respective C core leg parts and are represented by sendust (Fe—Al—Si alloy) or Co—Zr—Nb amorphous alloy, two metallic multi-layer magnetic films 203 and 204 constituting I core leg parts composed of the same material as the metallic multi-layer magnetic films 201 and 202, two back bars 205 and 206 composed of high magnetic permeability magnetic material represented by Mn—Zn ferrite for magnetically shunting the C core leg parts and the I core leg parts, glasses 207, 208 and 212 molded in an integration step of the C core leg parts and I core leg parts of the twin core via gap material, glasses 210 and 211 molded in both the cores of the C core leg parts and the I core leg parts, read/write gaps 213 and 214 of a twin core head, composed of non-magnetic insulation film such as $SiO_2$, $Al_2O_3$ or the like, an insulation spacer 215 of $SiO_2$, or the like for magnetically separating the heads of the twin core head, and ceramic plates 216, 217, 218 and 220 represented by calcium titanate or the like, having a metallic multi-layer magnetic thin film formed on its surface by the sputtering or the like.

(A) First, when the combined magnetic head according to the present invention is used as a magnetic head Of a new structure suitable for a large capacity FDD using a tracking servo adopting a new data positioning system and a HDD, as disclosed in Japanese Patent Laid-Open No. Sho 50-15520, the operation is as follows.

When the data information is recorded or reproduced onto or out of the magnetic recording medium, two read/write coils of the twin core head are connected in series so as to be used as a single magnetic head.

Therefore, the recorded data becomes the sum of the track widths of both the heads.

On the other hand, when the head positioning is carried out by setting the tracking servo, the two heads are. independently used as the reproducing heads, and the reproducing signals picked up from the data tracks by the two heads are compared with each other. Then, the heads are positioned to certain locations where the signal levels may be the same, and the heads are operated in the proper positions.

At this time, in order to carry out the head positioning with high accuracy, it is desirable that the recording/reproducing performance of both the heads are equal.

For example, in order to realize the 1/10 off-track performance of the recording track width of one magnetic head, the sensitivity ratio between both the heads is required to at most 0.9.

For this, it is necessary to adjust the read/write gap lengths, the track widths and other dimensions of both the heads and to control the differences of them to less than several %. It is readily understood that as apparent from the description of the producing method of this head, as hereinafter described, the conditions can be readily satisfied.

As described above, by using the tracking servo system, as compared with the conventional sector servo system for providing a particular servo data area in a part of the data track area of the conventional recording track, as disclosed in the above-described "All About Floppy Disk Drive", the data recording amount is improved and the peripheral circuits can be simplified to realize a cost reduction of a magnetic recording/reproducing apparatus.

Further, in this embodiment, compared with the ferrite currently widely used as the head material, since the metallic multi-layer magnetic film having quite an excellent high frequency magnetic property (at least 10 MHz) and at least double saturation flux density is employed, the combined magnetic head can be used in further higher high frequencies compared with the current magnetic recording device, and thus further large capacity magnetic recording apparatus can be implemented.

Figure 73:
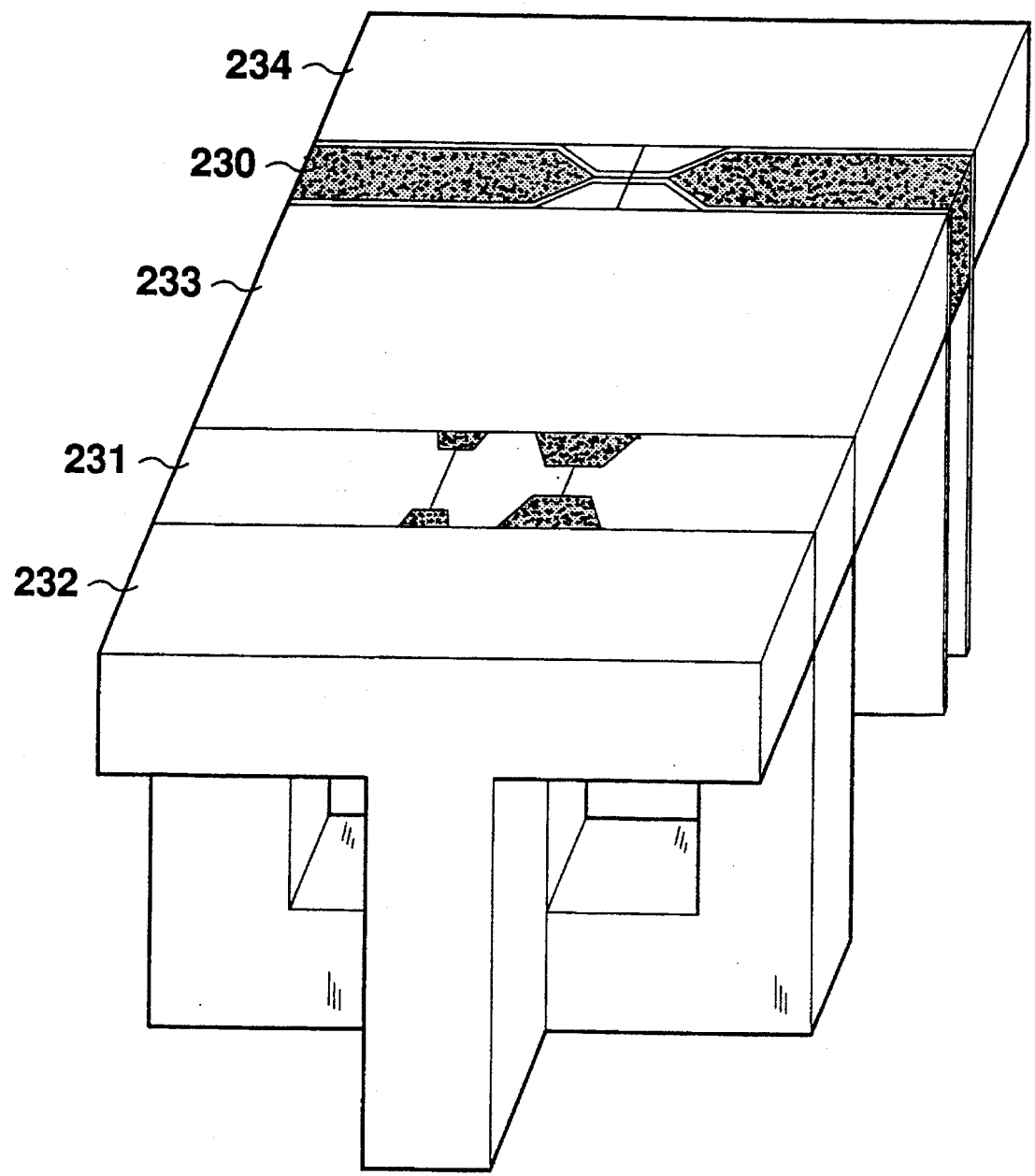
FIG. 73 is a perspective view of a twentieth embodiment of a combined magnetic head according to the present invention.

(B) In order to realize a large capacity FDD having the compatibility with current 3.5 inches drives (1 MB, 2 MB and 4 MB) of the open loop system and employing the magnetic recording system described in (A), the twin core head shown in FIG. 69 and a combined magnetic head of a 4 MB preceding erase system used in the current drive are arranged in parallel on one head slider at a predetermined interval therebetween to obtain a combined magnetic head, as shown in FIG. 73. This combined magnetic head can be included in the present invention.

Further, the combined magnetic head of the tunnel erase system to be used in the 1 MB and 2 MB drives as the low density head, as shown in FIG. 12 is arranged in parallel with the twin core head to obtain a combined magnetic head. This combined magnetic head can be included in the present invention.

In the current drives of the open loop system, in order to ensure the compatibility with the drives of different capacities, a system of the same track density and a different line recording density is used.

From the view point of the compatibility guarantee, in order to realize a FDD of a high line density and a high track density, a combined magnetic head constructed as described above can be provided.

In these magnetic recording systems, apparently, for the low density recording, the head of the tunnel erase system or the preceding erase system is used, and for the high density recording, the head of the twin structure is used.

Figure 71:
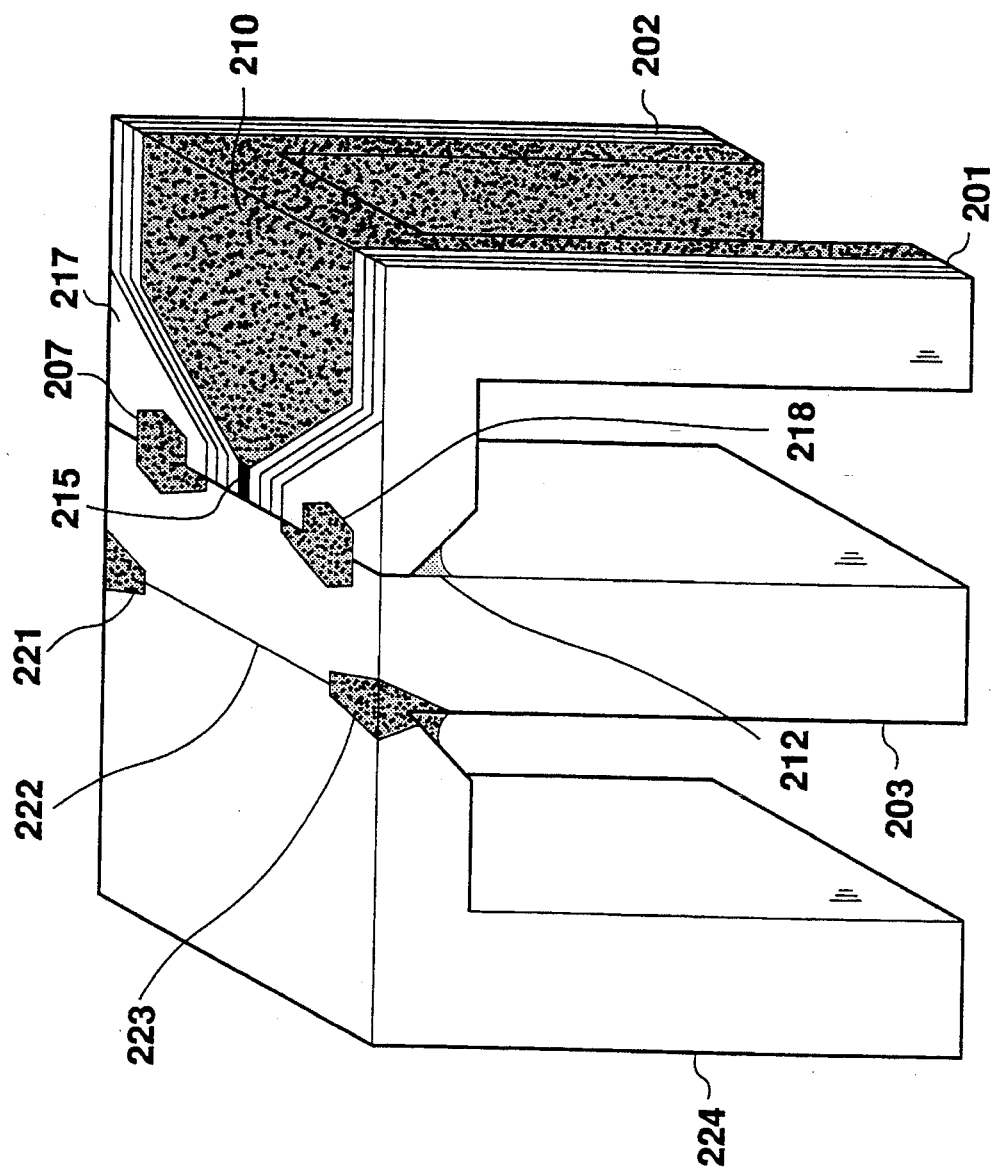
FIG. 71 is a perspective view of an eighteenth embodiment of a combined magnetic head according to the present invention.
Figure 72:
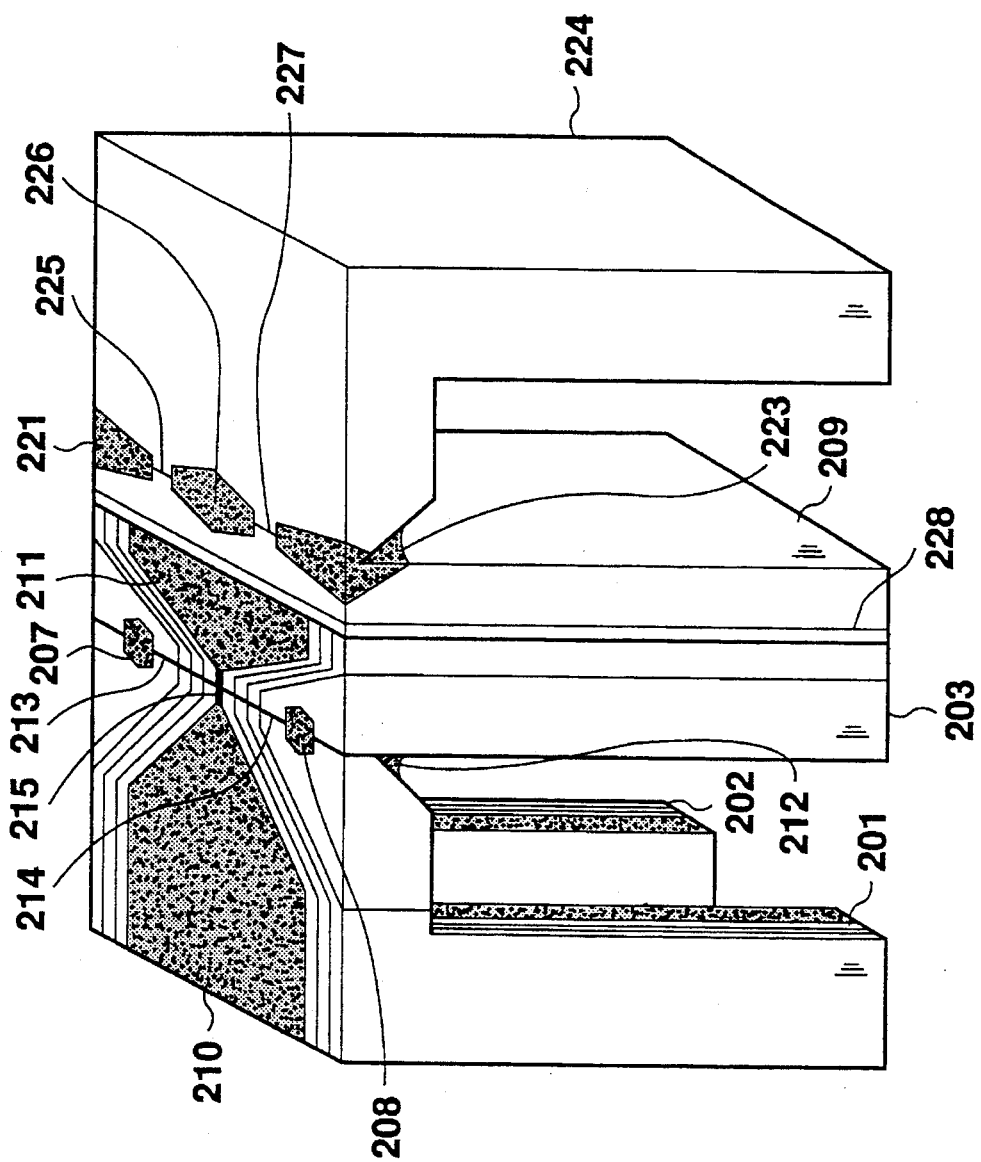
FIG. 72 is a perspective view of a nineteenth embodiment of a combined magnetic head according to the present invention.

(C) A particularly produced read/write head formed with a current preceding erase head or read/write head formed with a tunnel erase head is not;arranged in parallel with a twin core head of the present invention with a predetermined interval between them, but the preceding erase head or the tunnel erase head is integrally arranged in front or rear of the twin core head of the present invention to obtain a combined magnetic head, as shown in FIGS. 71 and 72. By using this combined magnetic head, a large capacity FDD having complete lower compatibility with the current drives can be implemented.

Relating to this point, two kinds of combined magnetic heads having the feature in the dimension setting of the track widths can be considered as follows.

(a) As to the first combined magnetic head of the twin core head, the track width of one head of the twin core head is set to the track width of the current low density drive of 1 MB, 2 MB and/or 4 MB, and the track width of the other head is set to the track width of the high density head.

Concerning a compatible drive with the 1 MB and 2 MB drive, the combined magnetic head shown in FIG. 72 in which the tunnel erase head is integrally arranged in the rear of the lower head is used.

Regarding a compatible drive with the 1 MB, 2 MB and 4 MB drive, the combined magnetic head shown in FIG. 71 in which the erase head is integrally arranged in front of the lower head is used.

Also, as regards the track width and the track relative position of the lower head, it is adapted to the current drive. The combined magnetic head constituted by the other wide track width read/write head of the twin core head and the erase head is used for the current low density recording. The tracking servo at the high density recording time is executed by the current sector servo system.

(b) Regarding the second combined magnetic head of the twin core head, the track width of one head of the twin core head is set to the track width of the high density head, and the sum of the track widths of one head and the other head is set to the track width of the current drive of 1 MB, 2 MB and 4 MB.

At the high density recording time, the combined magnetic head in which the preceding erase head or the tunnel erase head is integrally arranged in front or rear of one head of the twin core head, one head being set to the high density track width, is used, and the two heads of the twin core head are operated as a single read/write head.

The tracking servo at the high density recording time is carried out by the current sector servo system.

By setting the track widths as described above, the combined magnetic head of the double azimuth system used for the VCR including the short, time recording head of the wide track width and the long time recording head of the narrow track width can be replaced by the combined magnetic head of the twin core head of the present invention.

That is, for the short time recording head, the twin head is operated as the single head, and for the long time recording head, the narrower track width head is used.

Concerning the current double azimuth head, it is necessary to separately produce the two heads, and it is difficult to perform the positioning of both the heads. In the twin core head of the present invention, such problems can be solved.

Next, the thirteenth embodiment according to the present invention will now be described.

A producing method of a combined magnetic head shown in FIG. 69 will now be described in connection with FIGS. 74 to 86.

Figure 74:
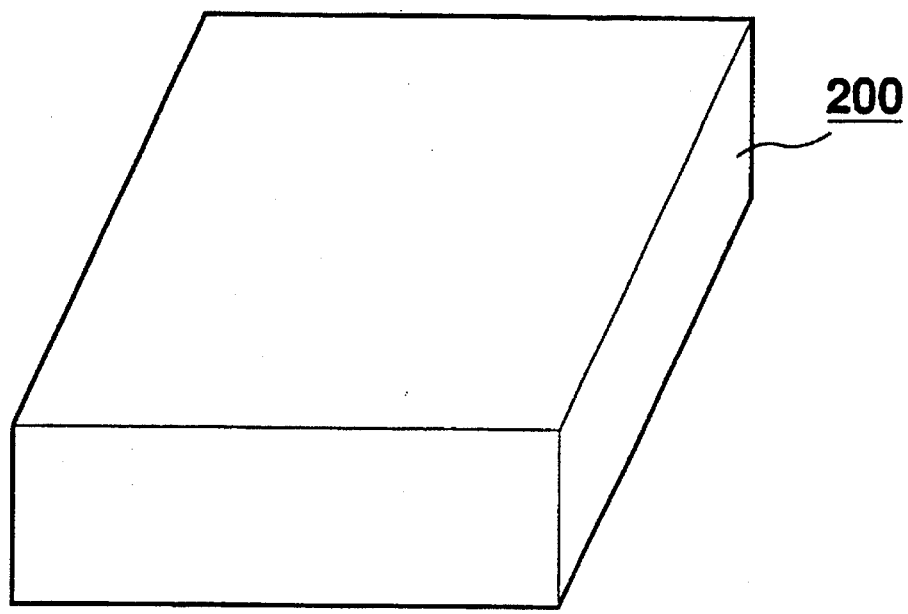
FIGS. 74 to 86 are schematic views showing a first producing method of a combined magnetic head according to a thirteenth embodiment of thee present invention.

First, in FIG. 74, a ceramic material such as a calcium titanate or the like is finished to the desired dimension by a cutting operation, a lapping processing and the like to prepare a ceramic piece plate 200.

Figure 75:
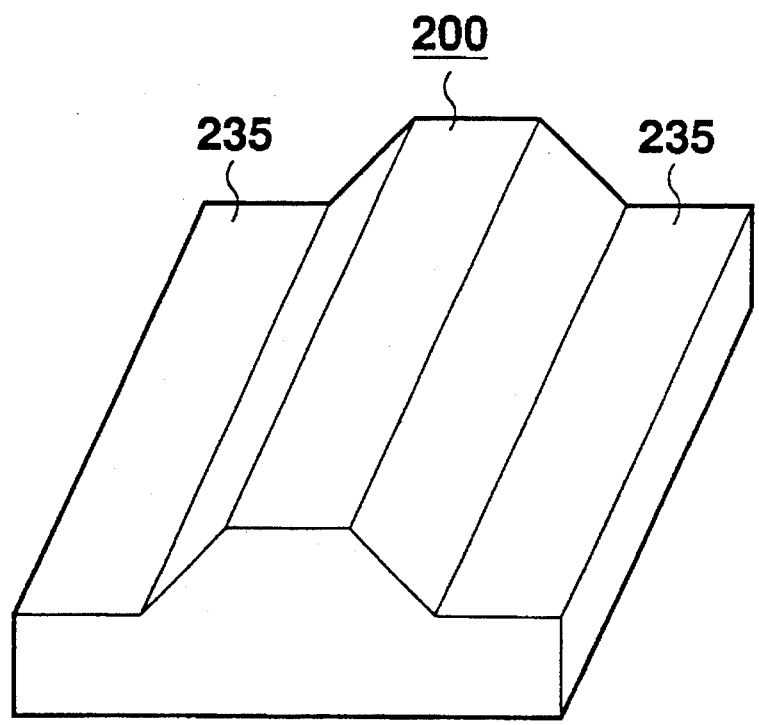

In FIG. 75, separation grooves 235 to be formed between the twin core are formed in the ceramic piece plate 200 by the cutting operation by using the diamond wheel.

Figure 76:
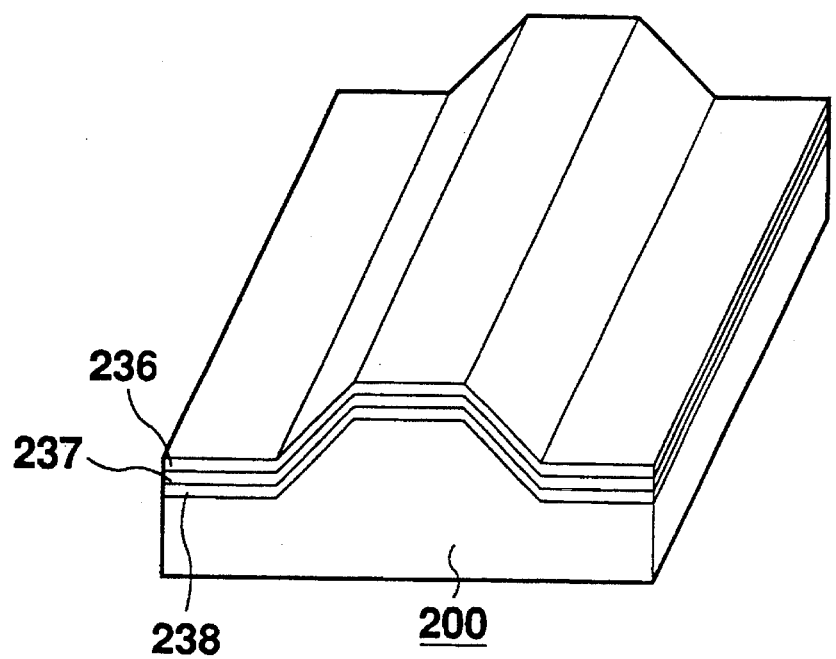

In FIG. 76, by using a thin film formation technique such as sputtering, multi-layer magnetic films 238 and 237 of an amorphous alloy and a sendust of a high saturation flux density and a high magnetic permeability and a nonconductive insulation film 236 of $SiO_2$ or the like are consecutively formed over the surface and the separation grooves 235 of the ceramic piece plate 200.

Figure 77:
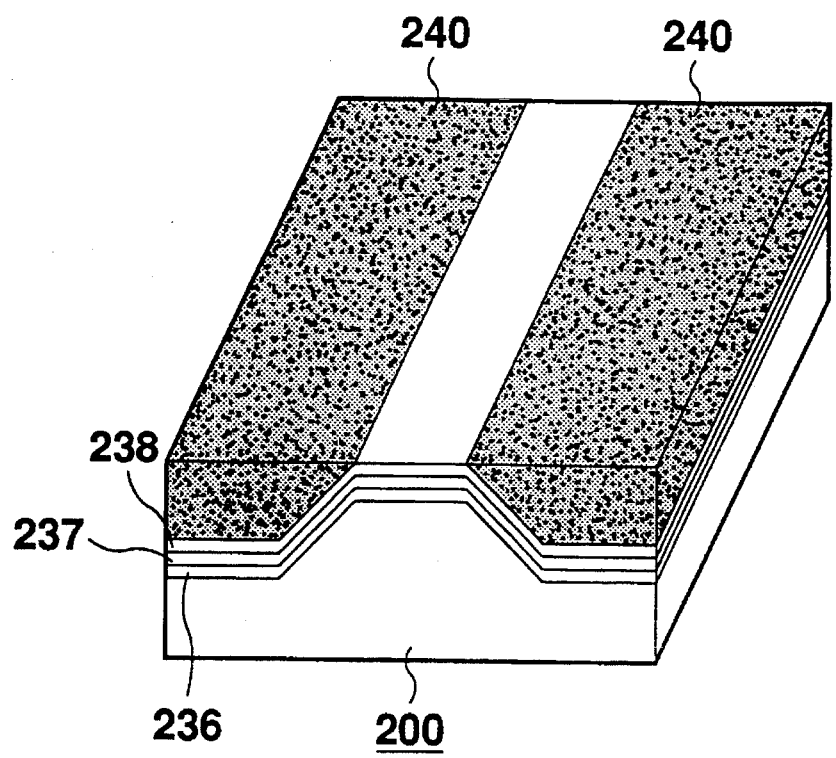

In FIG. 77, a glass 240 is molded in the separation grooves 235 covered by the multi-layer magnetic films 238 and 237 and the non-conductive insulation film 236, and the excess mold glass is removed. That is, as a result, the glass 240 is left on only the separation grooves 235.

Figure 78:
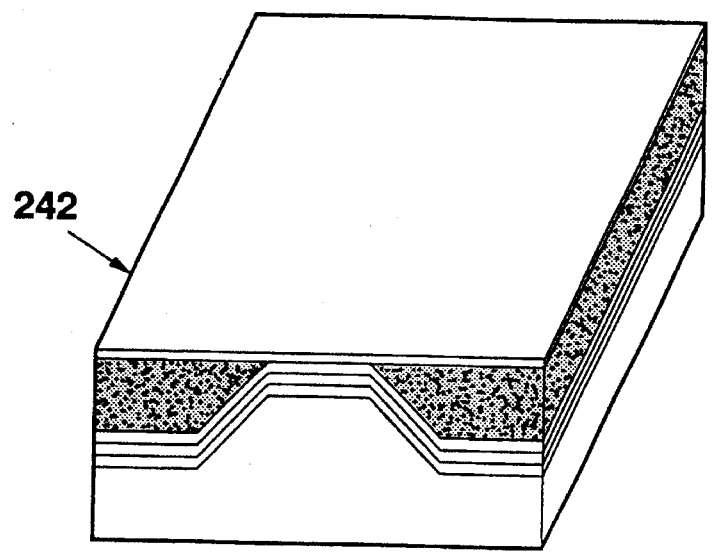

In FIG. 78, in order to magnetically separate the two twin cores, an insulation film 242 such as $SiO_2$ is formed over the surface of the ceramic piece plate.

Figure 79:
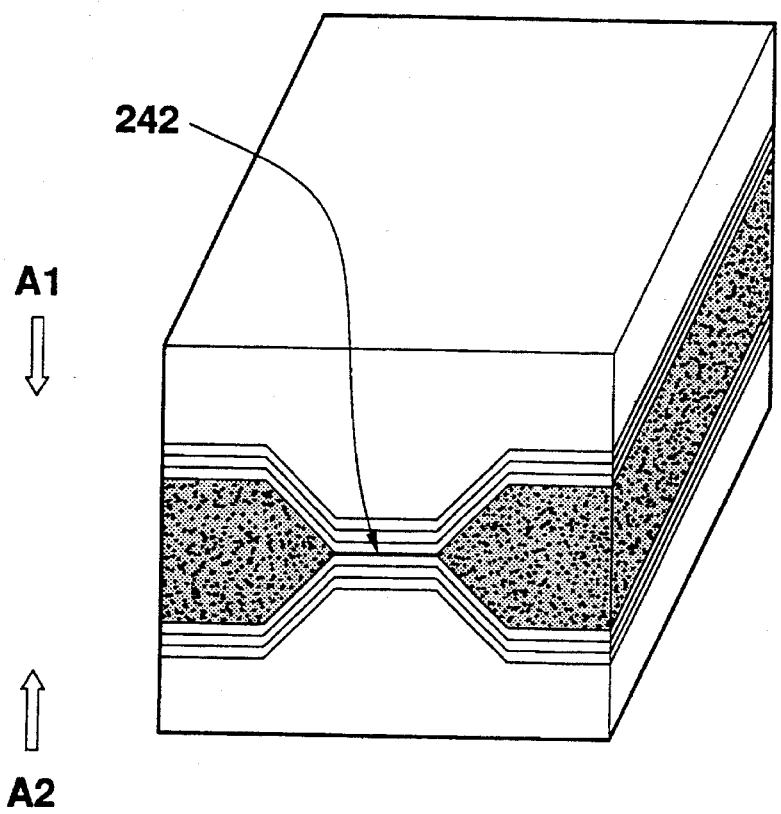

In FIG. 79, two twin cores are combined by contacting the insulation films 242 thereof in contact with one another. Then, while loads are applied to the two twin cores in the directions indicated by arrows A1 and A2, the temperature is raised to fuse and integrate the two twin cores to obtain a twin core block.

Figure 80:
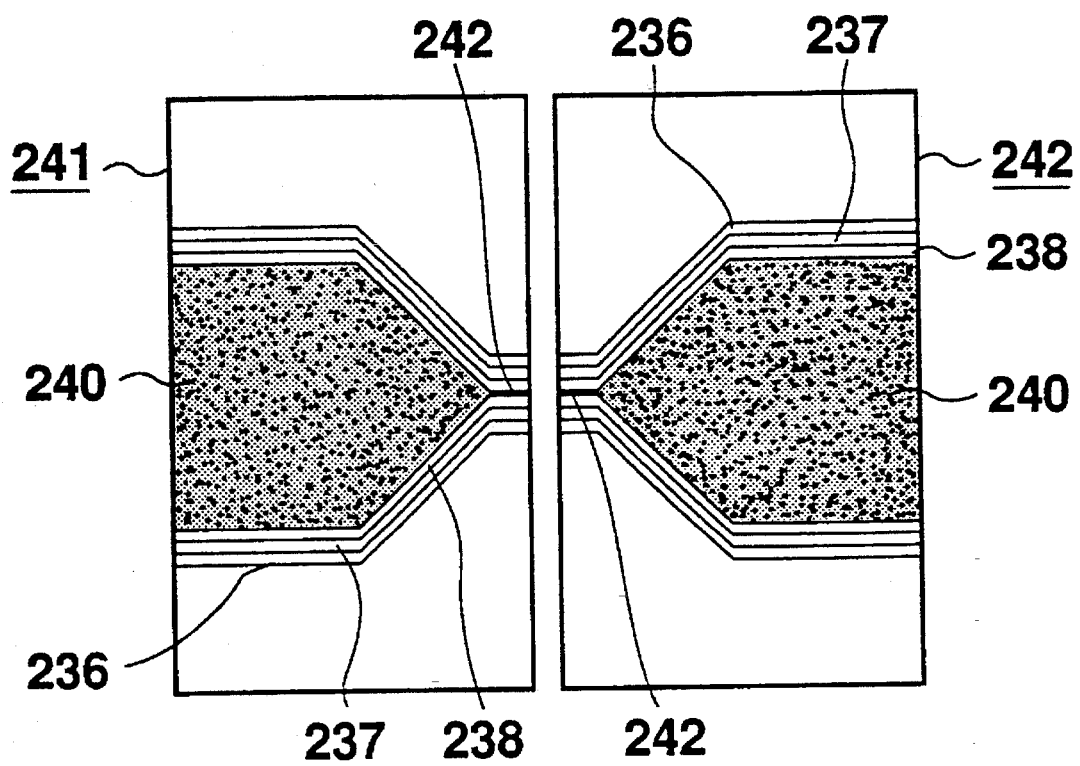

In FIG. 80, the obtained twin core block is cut into two parts, that is a C core;leg part 241 and an I core leg part 242.

Figure 81:
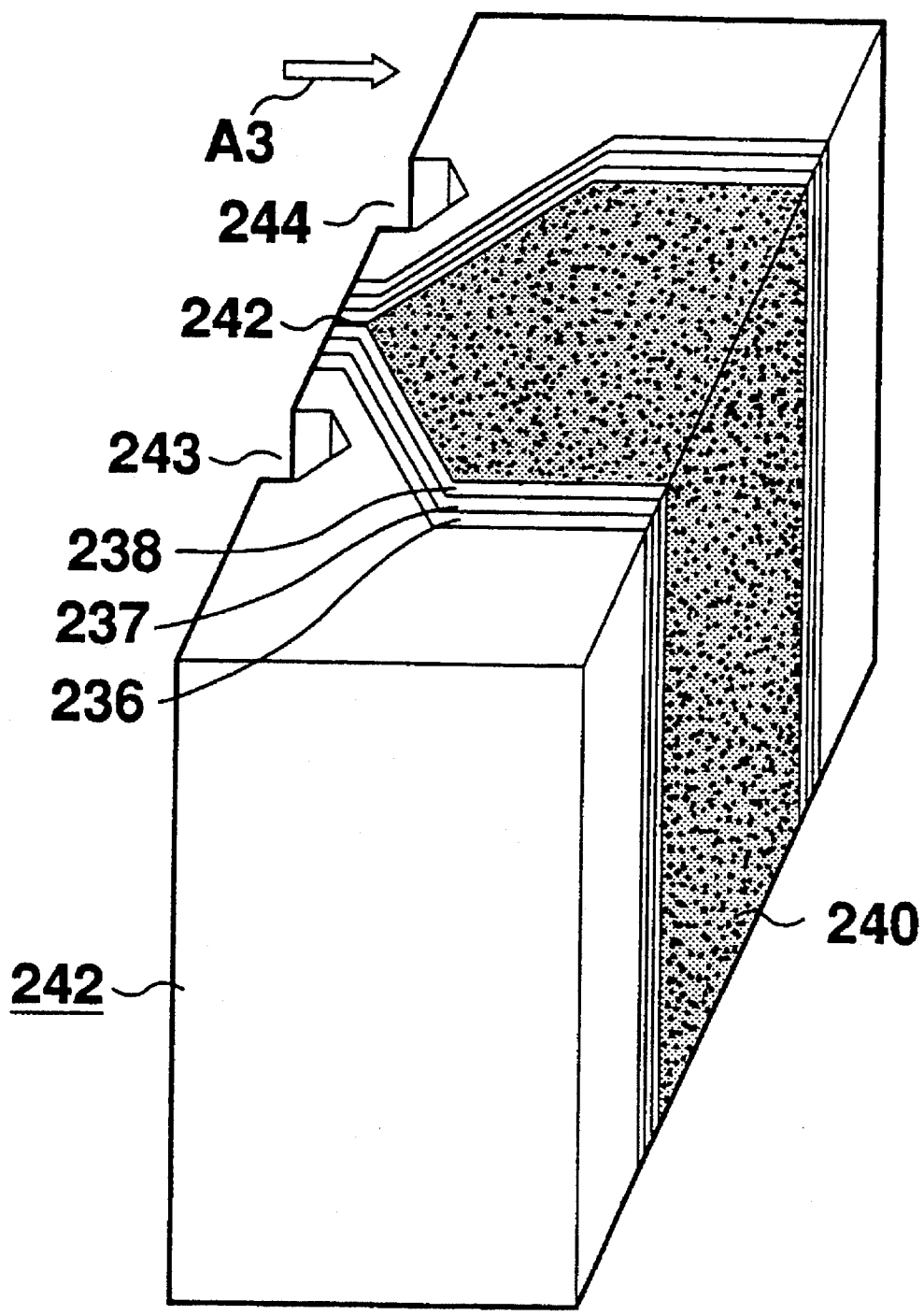

In FIG. 81, glass grooves 243 and 244 for filling up the glass are formed in the blocks of the C core leg part 241 and the I core leg part 242. Then, for the block of the I core leg part 242, a gap material (not shown) such as $SiO_2$ or the like is coated on the surface indicated by an arrow A3.

Figure 82:
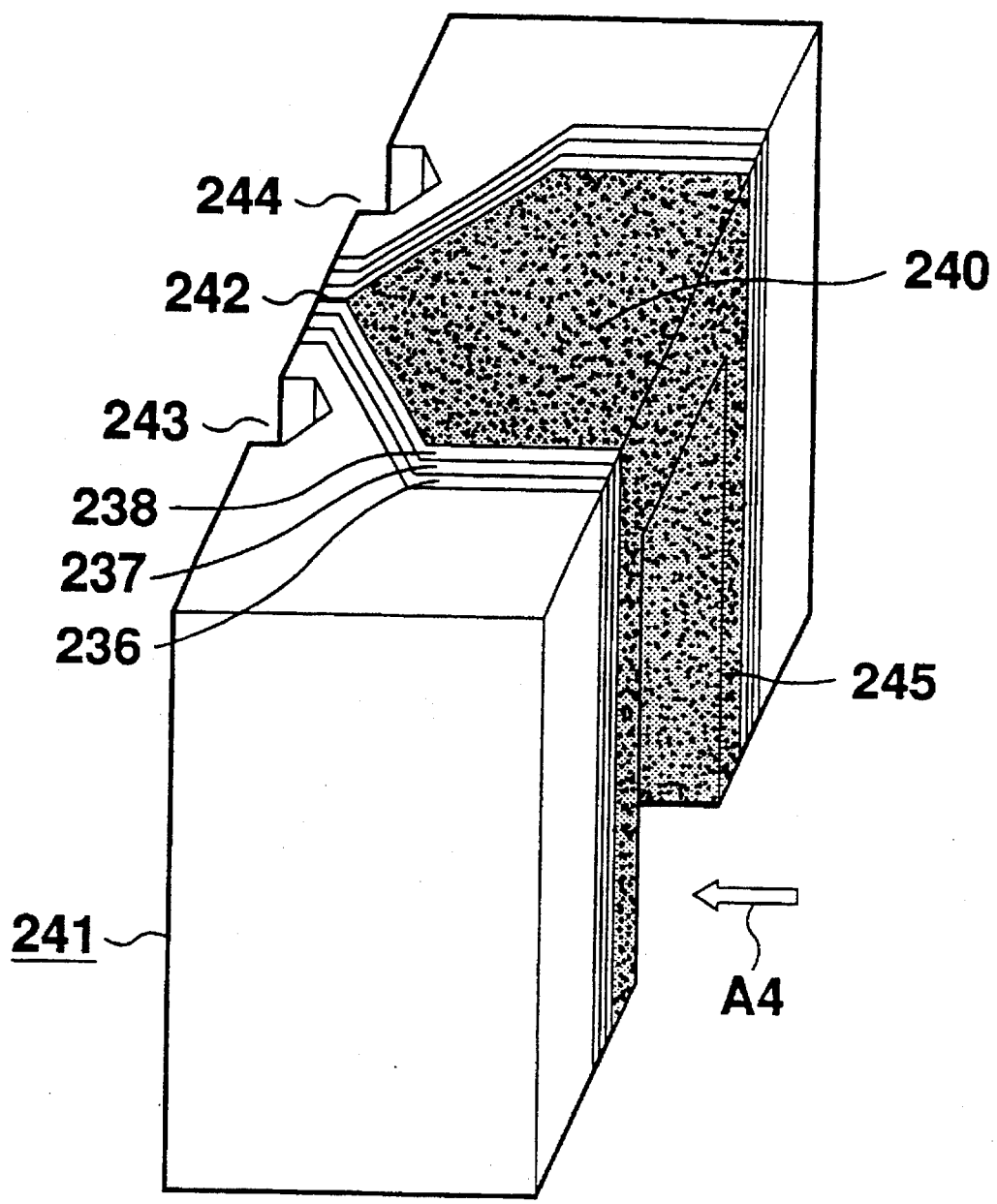

In FIG. 82, an U-shaped groove 245 is formed in the block of the C core leg part 241 in the direction indicated by an arrow A4 by the cutting operation.

Figure 83:
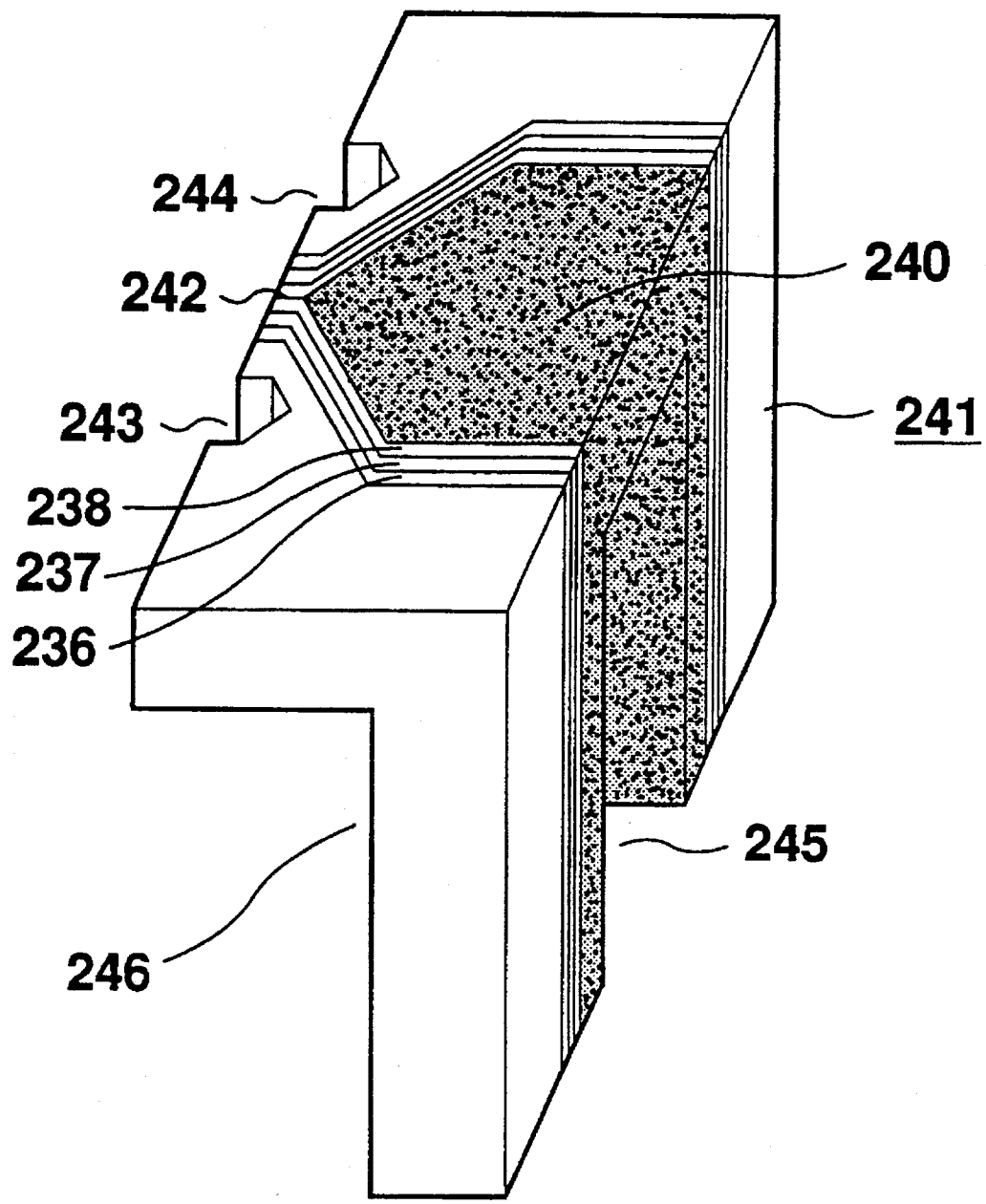

In FIG. 83, an L-shaped groove 246 is formed in the block of the C core leg part 241 by the cutting operation.

Figure 84:
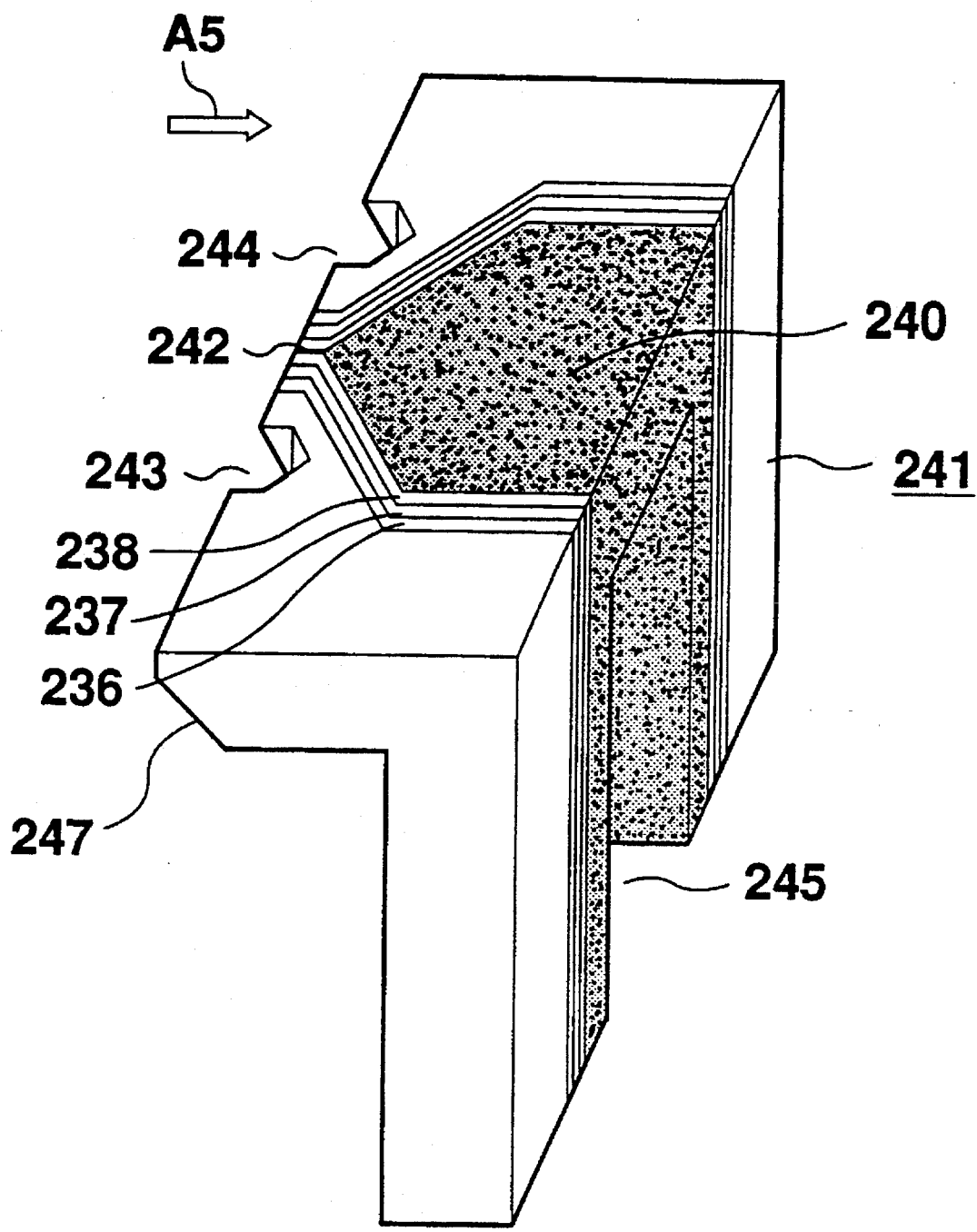

In FIG. 84, a tapered part 247 is formed in the block of the C core leg part 241 ]by a taper cutting processing. Then, the gap material (not shown) such as $SiO_2$ is coated on the surface indicated by an arrow A5. As a result, the gap material is formed on the blocks of the C core leg part 241 and the I core leg part 242;.

Figure 85:
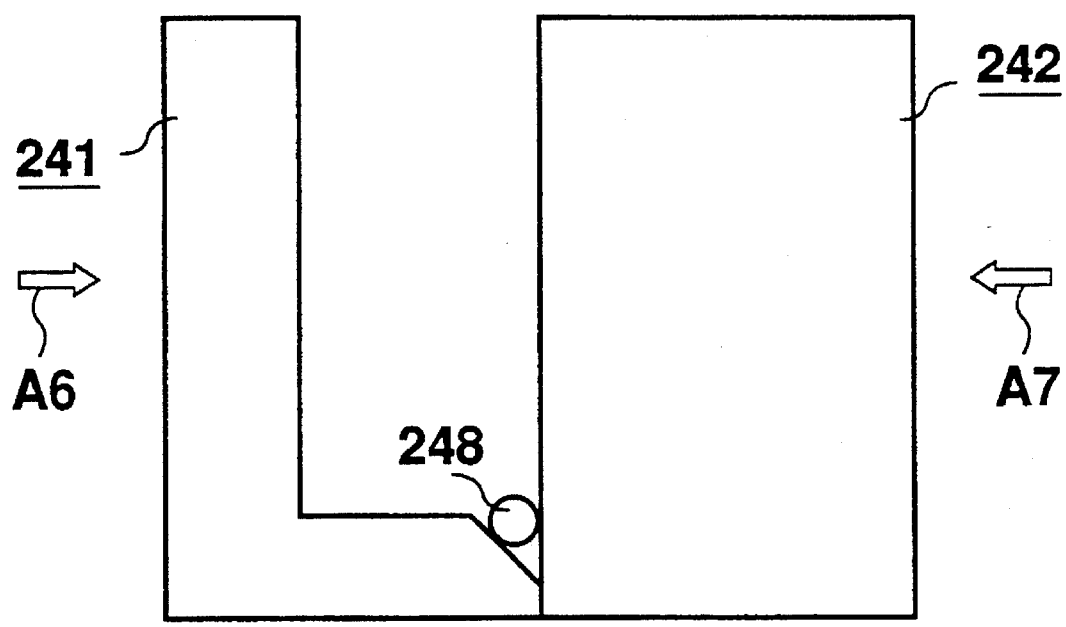

In FIG. 85, the blocks of the C core leg part 241 and the I core leg part 242 are combined so as to place in contact the surfaces on which the gap material is formed, and a glass rod 248 is inserted in the tapered part 247. While the loads are applied in the directions indicated by arrows A6 and A7, the temperature is raised to weld and integrate the blocks of the C core leg part 241 and the I core leg part 242.

Figure 86:
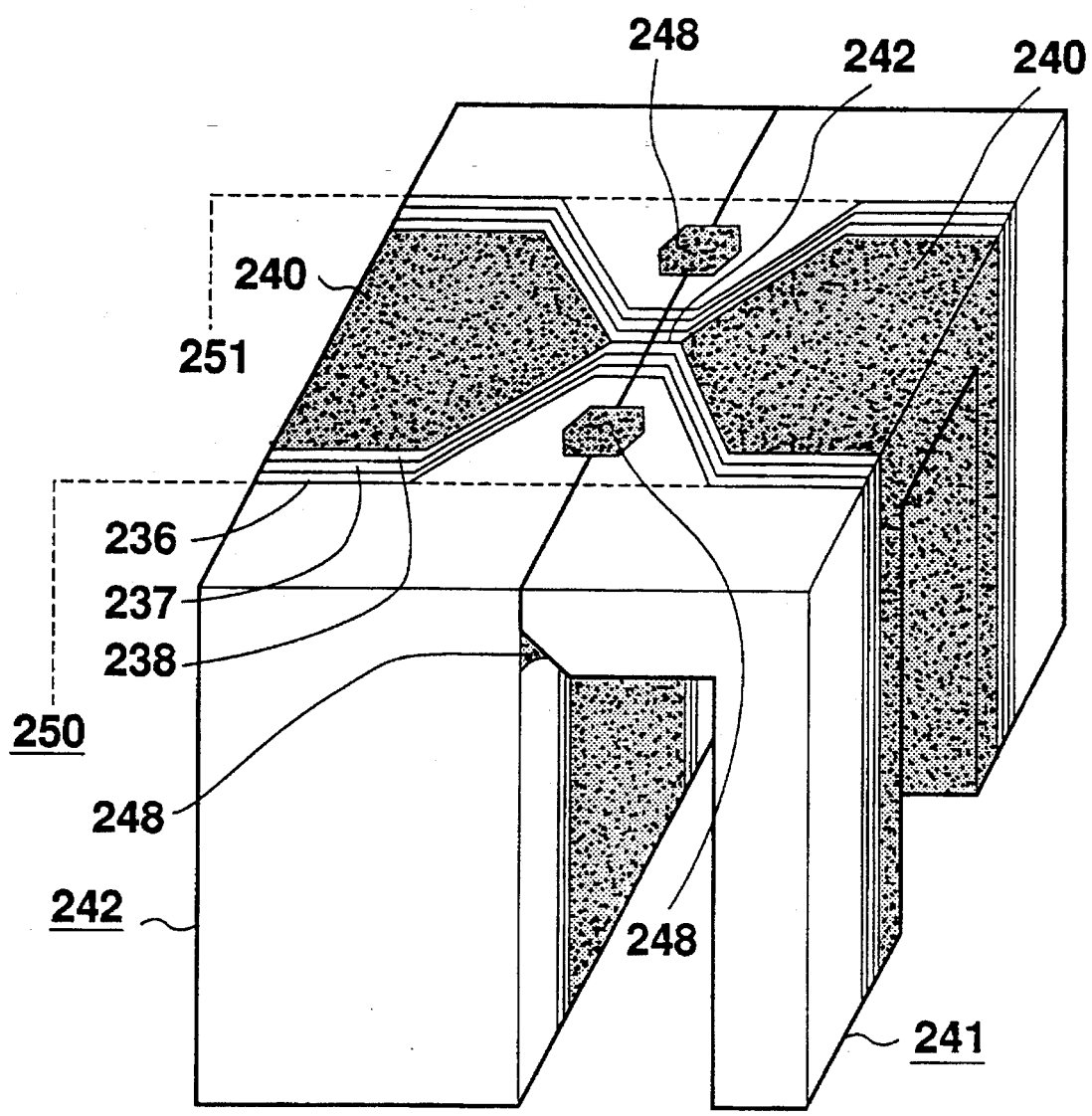
Figure 92:
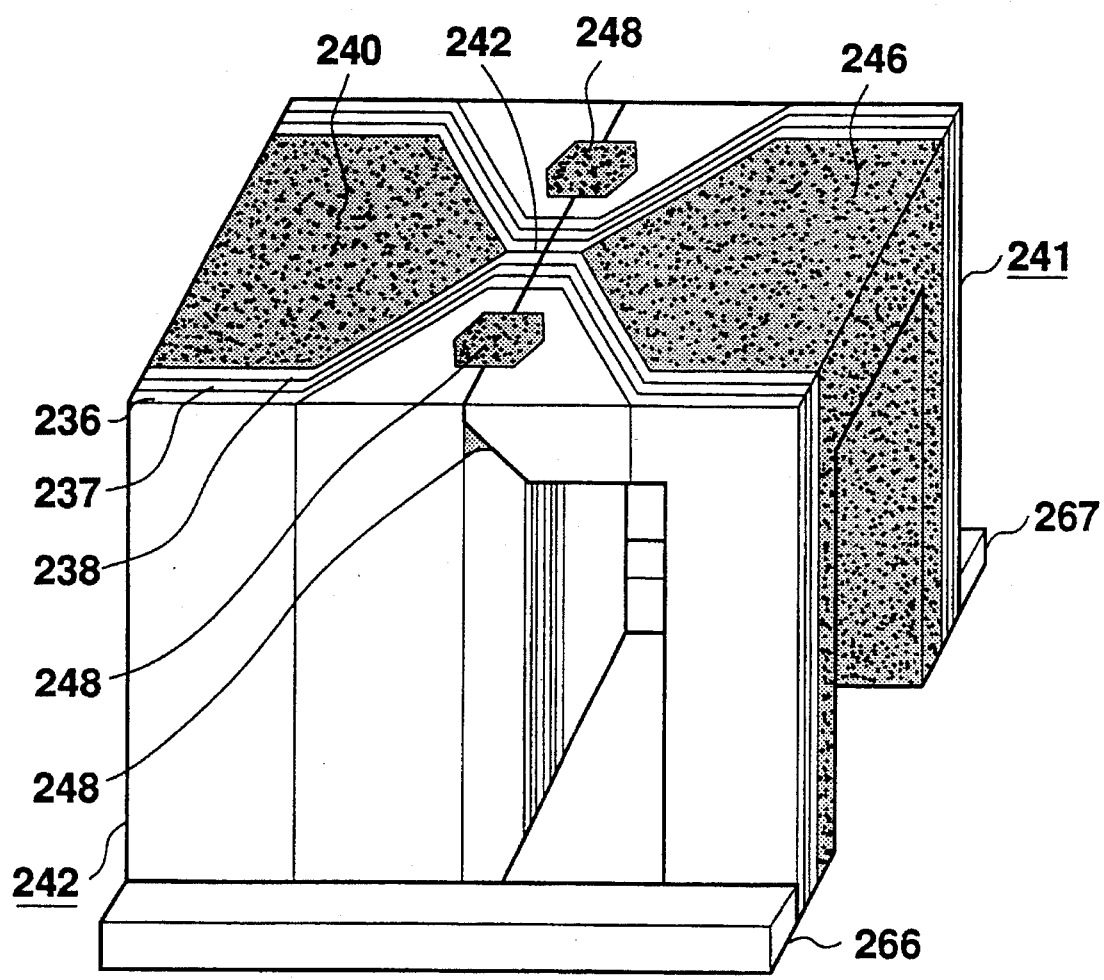
FIG. 92 is a perspective view of a combined magnetic head produced by the first producing method according to the thirteenth embodiment of the present invention, as shown in FIGS. 74 to 86.

In FIG. 86, the integrated twin core block is lapped to the surfaces shown by broken lines 250 and 251. Then, two coils (not shown) are wound around the legs of the C core leg part 241, and two back bars 266 and 267 are attached to the rear core parts to obtain the twin core head shown in FIG. 92.

Next, the fourteenth embodiment according to the present invention will now be described.

Then, another producing method of the combined magnetic head shown in FIG. 70 will now be described in connection with FIG. 87 to 90.

Figure 87:
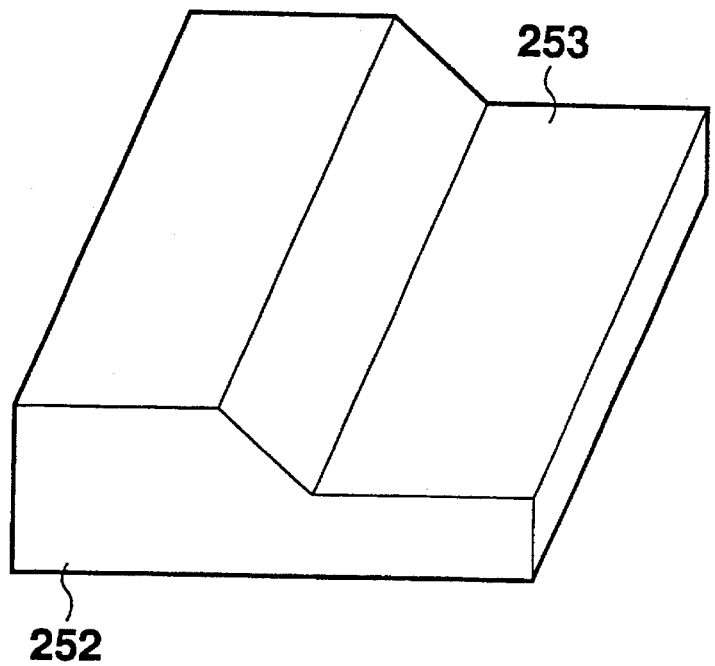
FIGS. 87 to 90 are schematic views showing a second producing method of the combined magnetic head shown in FIG. 70 according to a fourteenth embodiment of the present invention.

First, in FIG. 87, a separation groove 253 for separating the C cores of the twin core is formed in a ceramic plate by a cutting operation.

Figure 88:
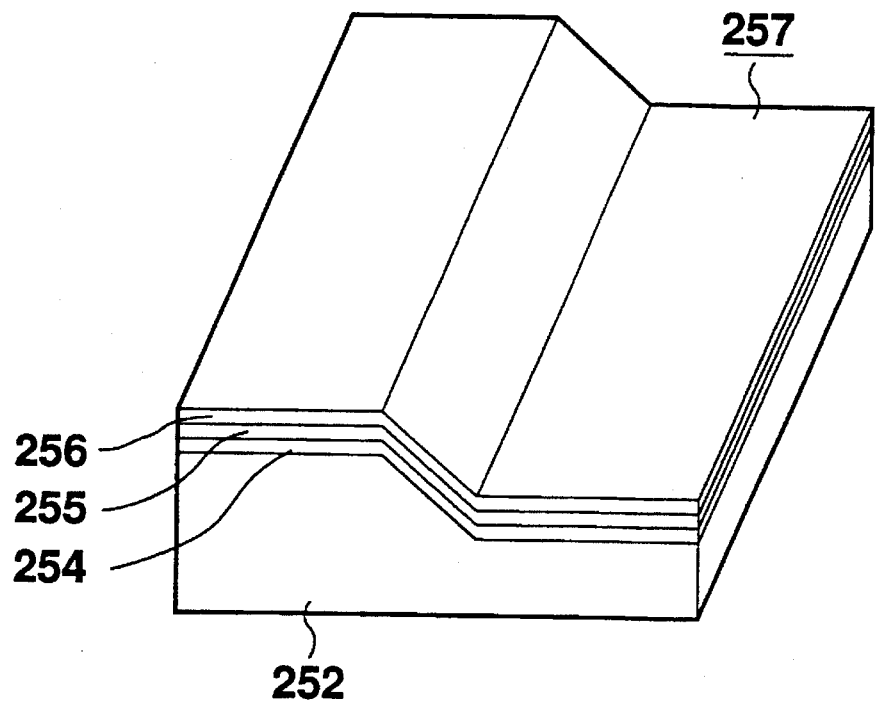

In FIG. 88, metallic multi-layer magnetic films 254 to 256 are successively formed on the stepped surface of the ceramic plate by a thin film formation technique such as sputtering or the like to obtain a twin core block 257.

Figure 89:
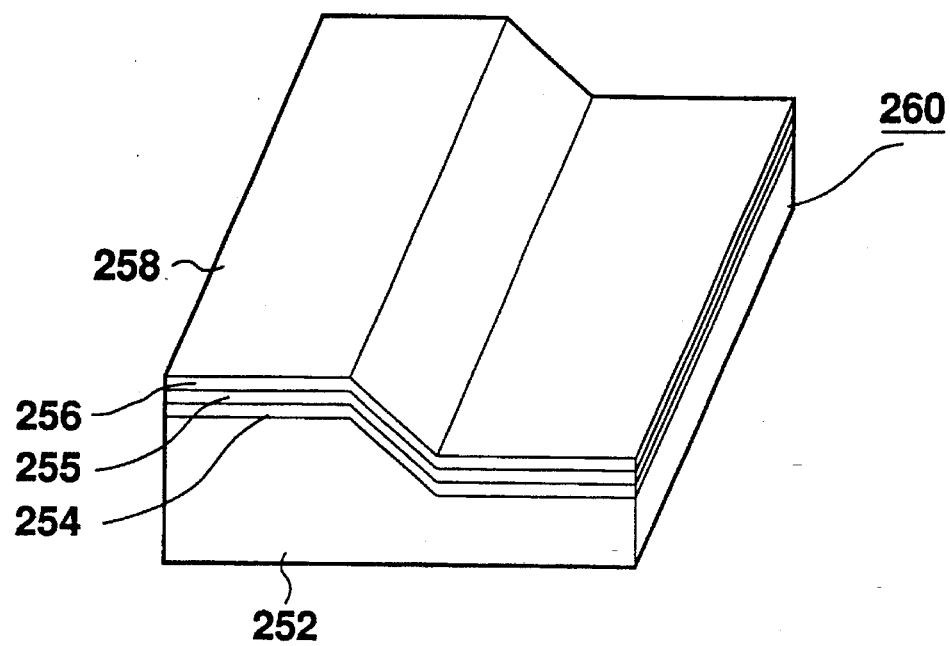
Figure 90:
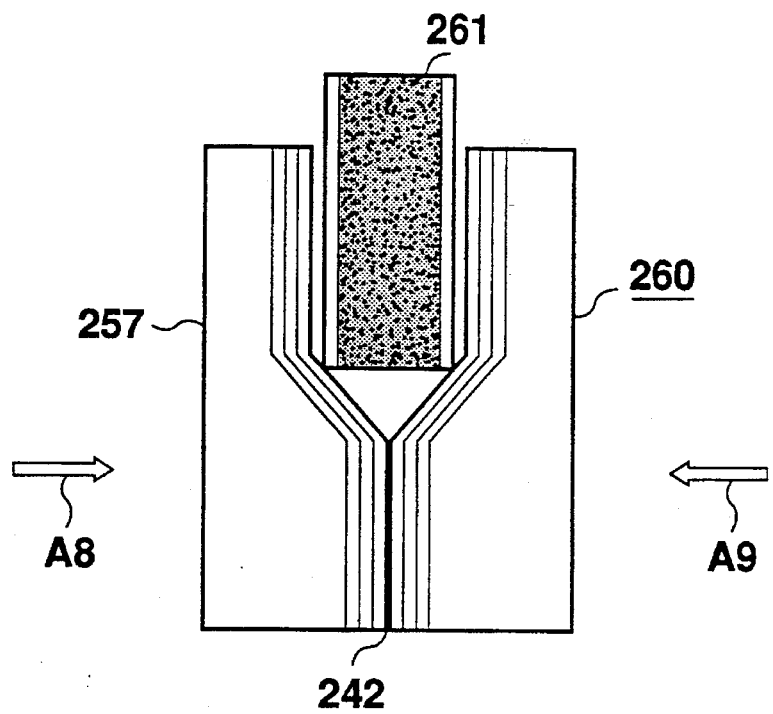

In FIG. 89, a non-magnetic spacer 258 such as $SiO_2$, Al or the like is formed on the stepped surface of the ceramic plate by sputtering, vapor deposition, ion plating or the like to obtain a twin core block 260;

In FIG. 90, the twin core block 257 obtained in the step shown in FIG. 88 and the twin core block 260 obtained in the step shown in FIG. 89 are assembled place in contact the metallic multi-layer magnetic films 254 to 256 of the twin core block 257 with the non-magnetic spacer 258 of the twin core block 260, and an angular glass rod 261 is inserted into the space between the twin core block 257 and the twin core block 260. While the loads are applied in the directions indicated by arrows A8 and A9, the temperature is raised to weld and integrate the twin core block 257 and the twin core block 260.

Then, the obtained twin core block is processed in the same manner as the steps shown in FIGS. 81 to 86 in the thirteenth embodiment described above to obtain the twin core head shown in FIG. 92.

Next, the fifteenth embodiment according to the present invention will now be described.

Figure 91:
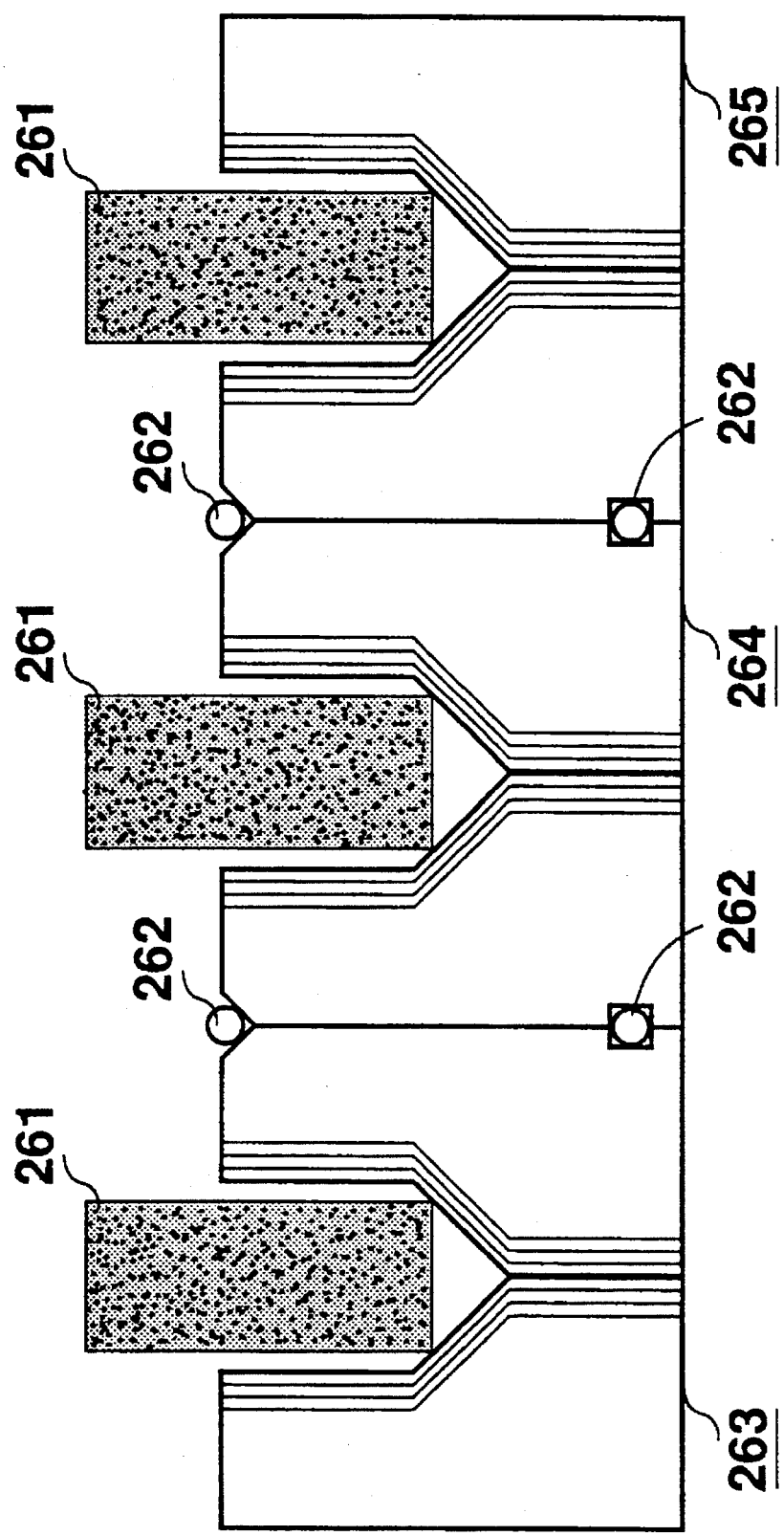
FIG. 91 is a schematic view showing a welding connection process of a plurality of ceramic core blocks by using glass rods in a combined magnetic head producing method according to a fifteenth embodiment of the present invention.

In this embodiment. FIG. 91 shows another producing process of the combined magnetic head for improving the productivity. In this case, as shown in FIG. 91, glass insertion grooves are formed in a plurality of (three shown in FIG. 91) twin core blocks 263, 264 and 265, and glass rods 262 are inserted in the glass insertion grooves. Then, the temperature is raised to weld and integrate the plurality of (three) twin core blocks 263, 264 and 265.

Next, the sixteenth embodiment according to the present invention will now be described.

Figure 93:
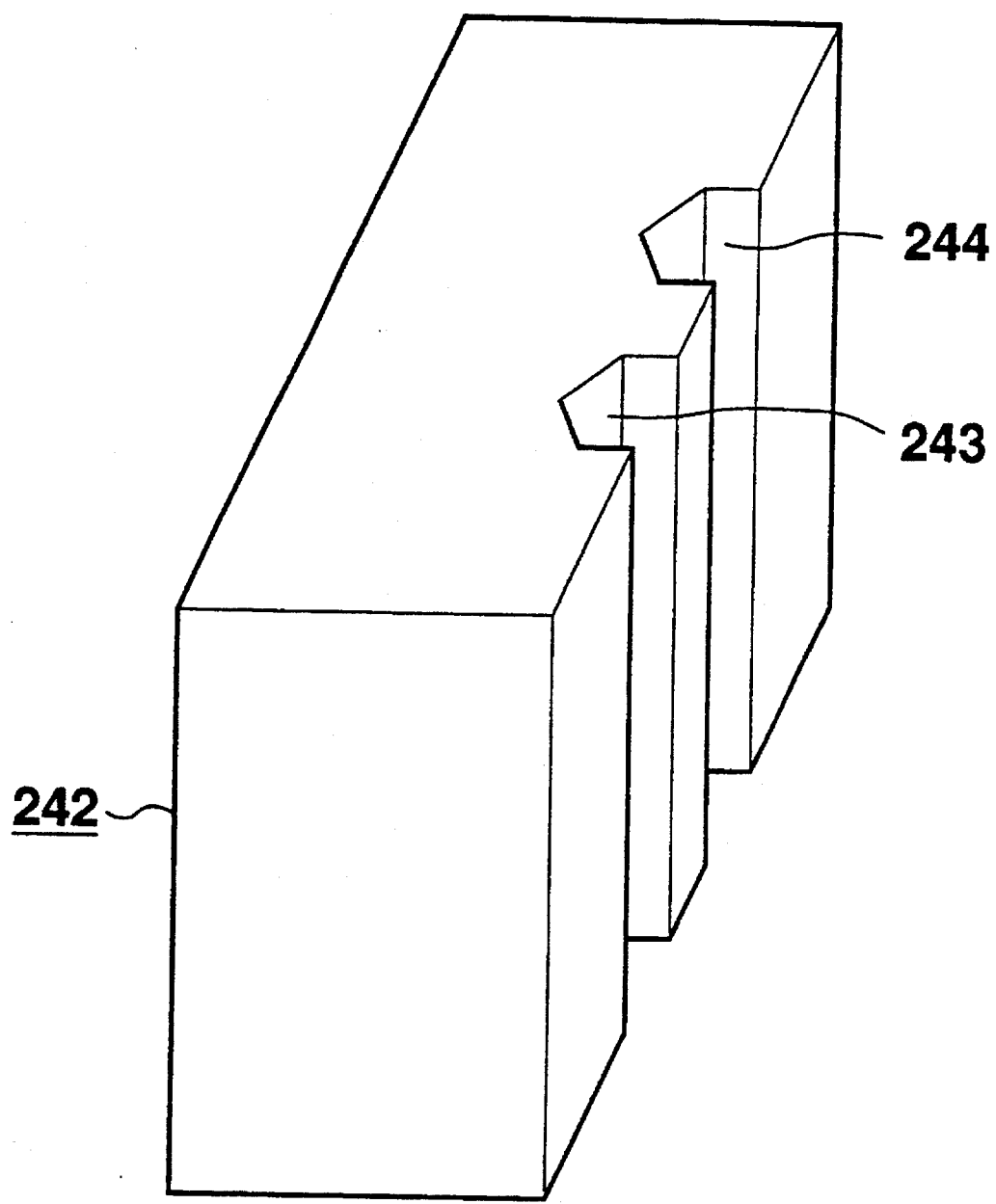
FIGS. 93 and 94 are schematic views showing another producing method of a combined magnetic head according to a sixteenth embodiment of the present invention.

In this embodiment, in FIG. 93, glass grooves 243 and 244 are formed in the I core leg part 242 of the ferrite material. Although the I core leg part 242 shown in FIG. 81 is made of the ceramic material, in this embodiment, the I core leg part 242 is composed of the magnetic material.

Figure 94:
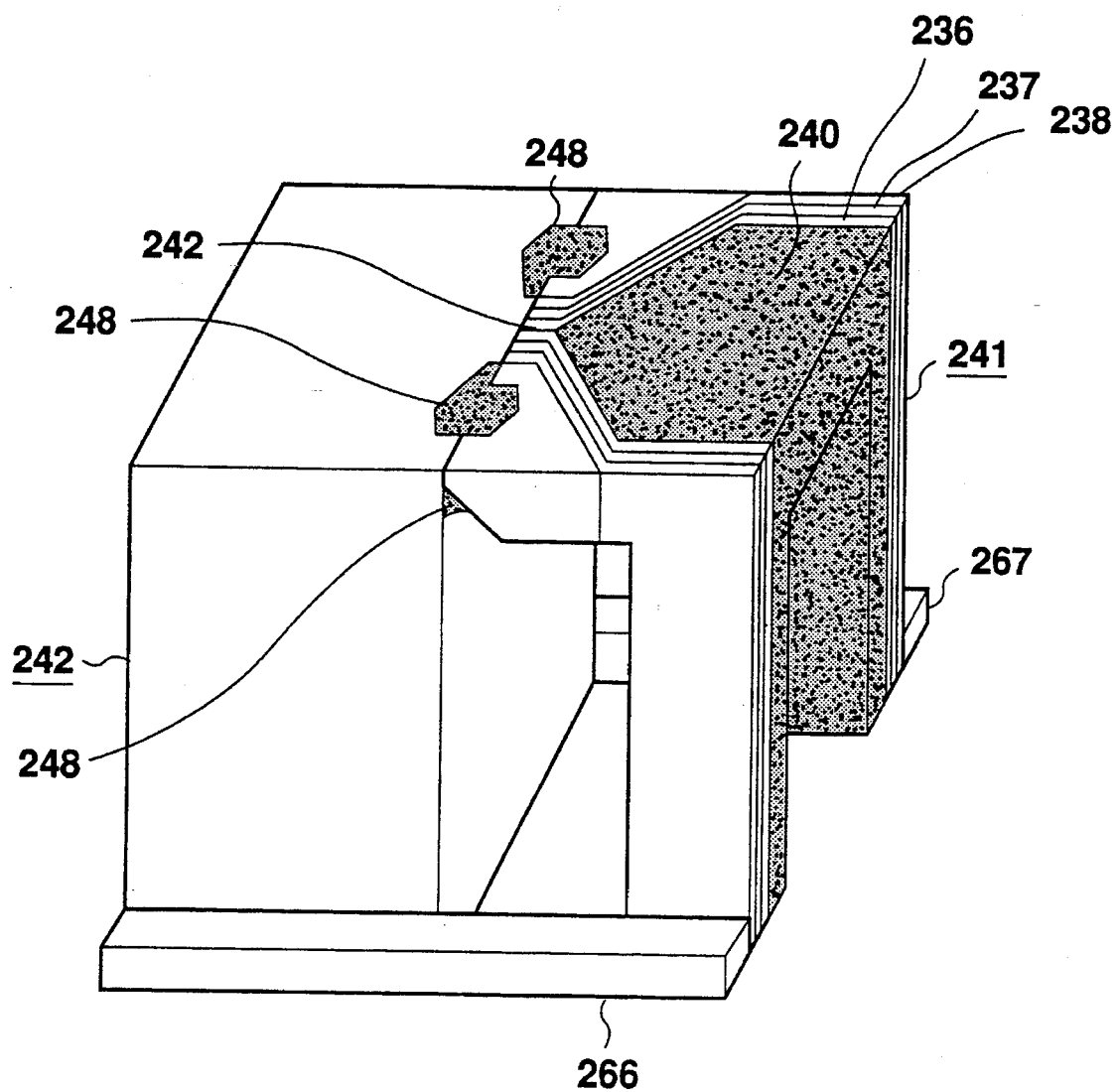

Further, in FIG. 94, a completed twin core head produced from the ceramic C core leg part 241 and the ferrite I core leg part 242 in the same manner as described above is shown.

Next, the seventeenth embodiment according to the present invention will now be described.

The twin core head is constructed from the C core leg part 241 and the I core leg part 242, and the metallic multi-layer magnetic films 254 to 256 are formed on the C core leg part 241 and the I core leg part 242 in the fourteenth embodiment described above. In this embodiment, as shown in FIG. 70, a combined magnetic head has the same construction as the twelfth embodiment shown in FIG. 69 except that an I core leg part 209 is formed as one body structure having no magnetic separation layer and is composed of a metallic oxide such as Mn—Zn ferrite or Ni—Zn ferrite. The similar effects to those of the twelfth embodiment can be obtained.

Figure 70:
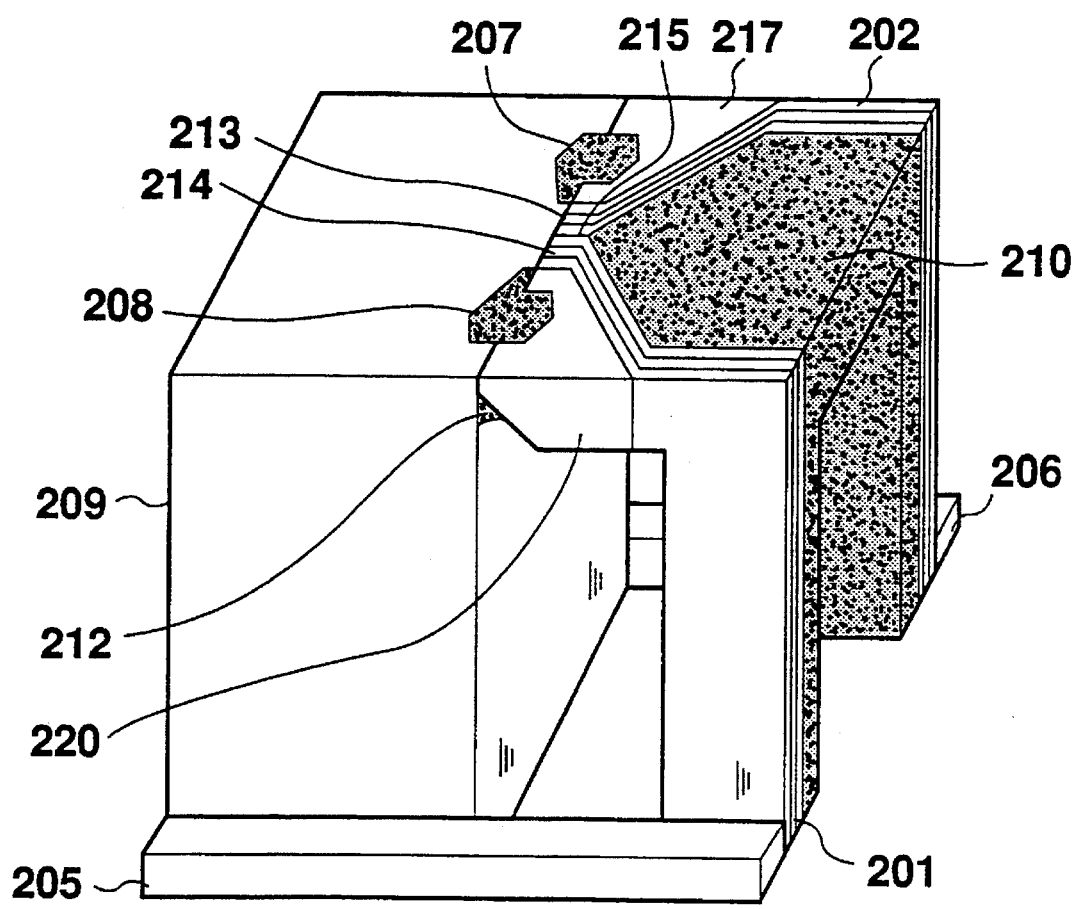
FIG. 70 is a perspective view of a seventeenth embodiment of a combined magnetic head according to the present invention.

When the combined magnetic head shown in FIG. 70 is used for a read/write head, as shown in one example applied to various high recording density device, the C core leg part whose main part is formed by the metallic magnetic material of the high saturation flux density is positioned in the output side of the medium. Because the magnetization intensity recorded in the medium depends on the intensity of the magnetic field of the trailing edge (output end of the medium) of the gap.

Next, the eighteenth embodiment according to the present invention will now be described.

FIG. 71 shows the eighteenth embodiment of a combined magnetic head according to the present invention. Although the twin core head having no erase head is described in the twelfth embodiment shown in FIG. 69 and the seventeenth embodiment shown in FIG. 70, in this embodiment, a combined magnetic head includes a twin core head and an erase head which is adjacent to an I core leg part of the twin core head and has the I core leg part for common use. As already described above, by using this combined magnetic head, a large capacity magnetic recording apparatus having some features can be implemented.

In FIG. 71, mold glasses 221 and 223 regulate the track width of the erase head and integrate the I core leg part 203 of the twin core head and a C core leg part 224 of the erase head, and the C core leg part 224 is composed of the same material as the I core leg part 209 shown in FIG. 70. An erase gap 222 is composed of the same material as that shown in FIG. 69.

In this embodiment, although the read/write head and the erase head have the I core leg part for common use, in order to reduce the cross talk between both the heads, a magnetic insulation spacer can be provided in the central part of the I core leg part.

Next, the nineteenth embodiment according to the present invention will now be described.

FIG. 72 shows the nineteenth embodiment of a combined magnetic head according to the present invention.

Compared with the twin core head attached with the preceding erase head in the eighteenth embodiment shown in FIG. 71, a tunnel erase head is integrally arranged in rear of a twin core head via a magnetic insulation spacer to obtain a combined magnetic head, and by applying this combined magnetic head, as described in the operation in twelfth embodiment, the large capacity magnetic recording apparatus having some features can be produced. This is also included in the present invention.

In FIG. 72, mold glasses 221, 223 and 226 regulate the track width of the erase head and integrate the C core leg part and the I core leg part, and erase gaps 225 and 227 for a trimming erase are composed of the same material as the read/write gap shown in FIG. 69.

Also, an I core leg part 209 and a C core leg part 224 of the tunnel erase head are composed of the same material as the I core leg part shown in FIG. 69.

A magnetic insulation :spacer 228 for preventing the cross talk between both the heads is composed of a crystallized glass, a ceramic or the like.

Next, the twentieth embodiment according to the present invention will now be described.

FIG. 73 shows the twentieth embodiment of a combined magnetic head according to the present invention. In this embodiment, the twin core head in the twelfth embodiment shown in FIG. 69 and a read/write head with a preceding erase head used in the current 4 MB drive or a read/write head with a tunnel erase head are arranged in parallel on one slider to obtain a combined magnetic head shown in FIG. 73. By using this combined magnetic head, a large capacity FDD of a high recording density having a complete lower compatibility with the current drives can be implemented.

In FIG. 73, the combined magnetic head includes a twin core head 230 obtained in the twelfth embodiment shown in FIG. 69, a read/write head 231 with a preceding erase head and slider members 232 to 234 composed of calcium titanate or the like.

Figure 95:
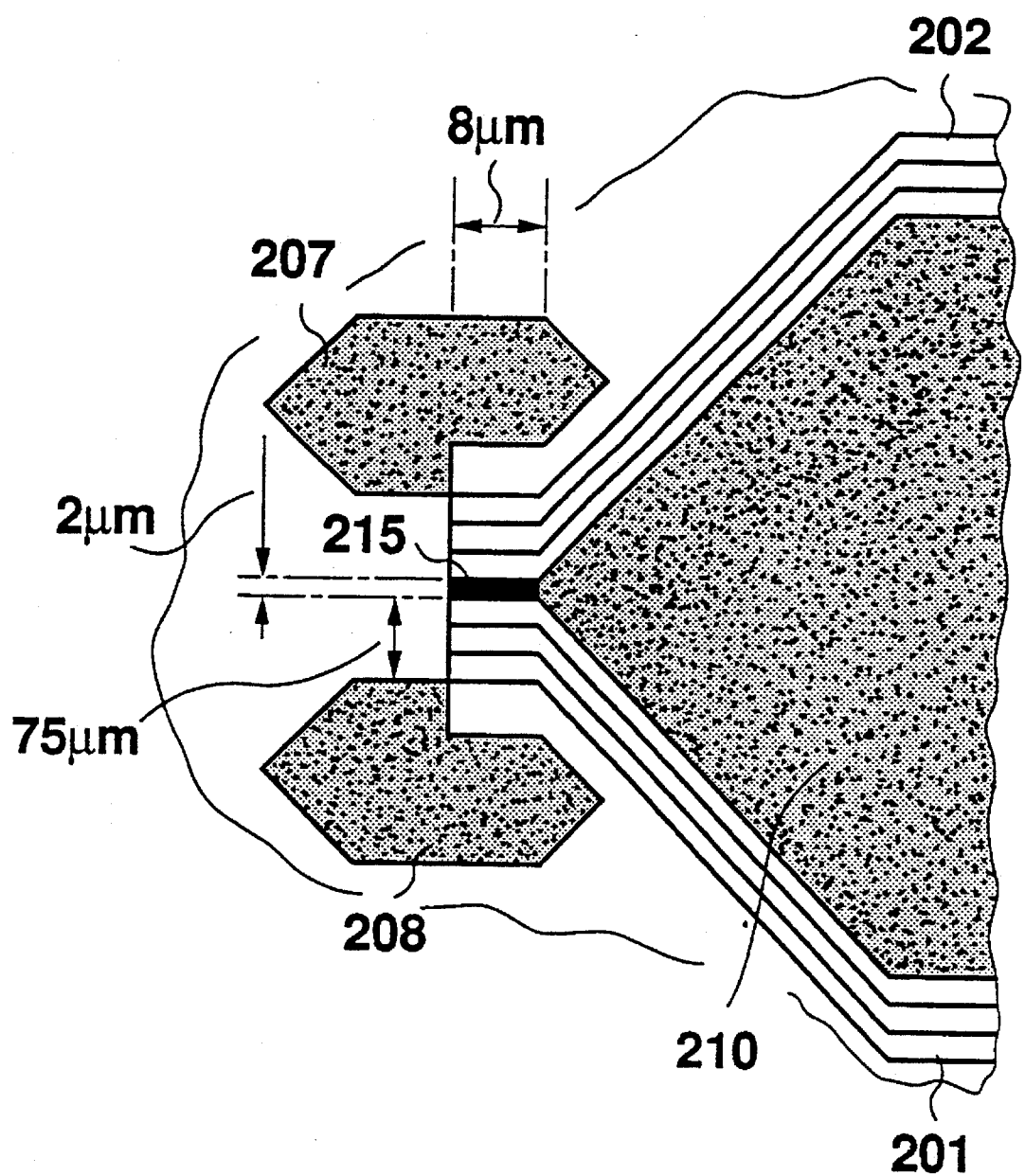
FIG. 95 is an enlarged top view of a gap part of a disk contact surface of the combined magnetic head produced in the twelfth embodiment for explaining a magnetic resistance of the gap part when there is an insulation spacer between C core leg parts.
Figure 96:
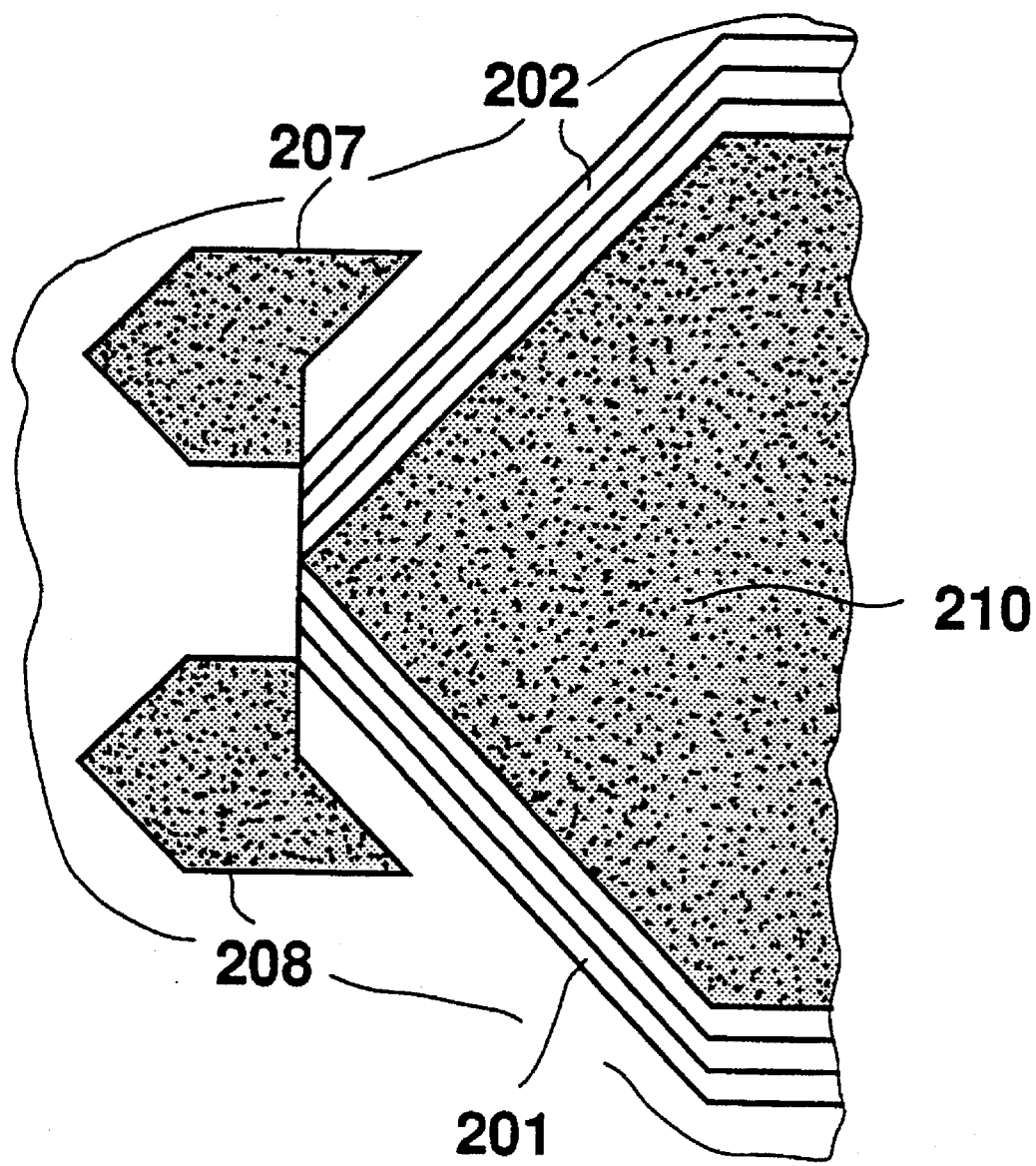
FIG. 96 is an enlarged top view of the gap part of the disk contact surface of the combined magnetic head produced in the twelfth embodiment for explaining the magnetic resistance of the gap part when there is no insulation spacer between C core leg parts.

In this embodiment, when the two magnetic heads are independently used in a recording system, the cross talk due to a flux leakage between the heads becomes a problem. In order to solve this problem, for achieving 0.1 (−20 dB) of a ratio between the leakage flux and the main flux in this head, a value obtained by dividing the product of the track width (narrower track width when the track widths are different) of one of adjacent two heads and the thickness of the non-magnetic insulation layer by the product of the gap length and the length of the non-magnetic insulation layer is set to at least 10. For example, as shown in FIG. 95, when the track width is 57 µm, the insulation layer thickness is 2 µm, the insulation layer length (cut depth) is 8 µm, and the magnetic permeability of the head core material is at least 5000, the cross talk of at most −20 dB can be obtained. In order to further reduce the cross talk, a head having a structure shown in FIG. 96 in which the cut depth is near zero can be preferably used.

Next, the twenty first embodiment according to the present invention will now be described.

Figure 97:
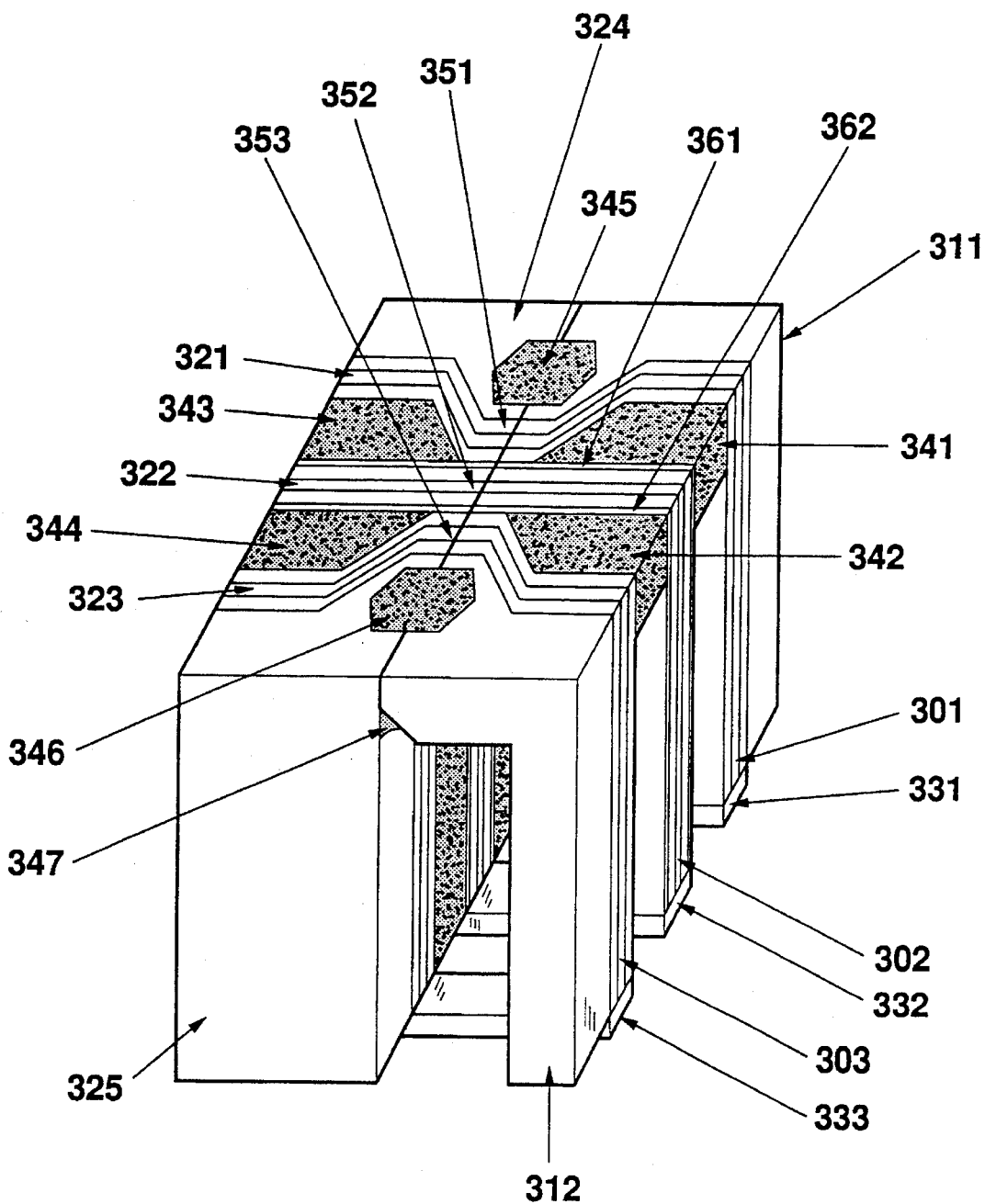
FIG. 97 is a perspective view of a combined magnetic head of an in-line gap triple structure according to a twenty first embodiment according to the present invention.

FIG. 97 shows the twenty first embodiment of a combined magnetic head according to the present invention. In this embodiment, the combined magnetic head is of a triple structure and a main core part is composed of a metallic magnetic multi-layer film.

In FIG. 97, the combined magnetic head includes three C core magnetic parts 301 to 303 which are formed in a multi-layer (three layers in FIG. 97) film via non-magnetic insulation films therebetween and are composed of a metallic magnetic material of a high saturation flux density and a high magnetic permeability such as a sendust (Fe—Al—Si alloy), an amorphous alloy (Co—Zr—Nb) or the like; three I core magnetic parts 321 to 323 composed of the same material as the C core magnetic parts 301 to 303; three back bars 331 to 333 composed of the same material as the C core magnetic parts 301 to 303 or a metallic oxide such as Mn—Zn ferrite or the like for magnetically shunting C core parts and I core parts; mold glasses 341 to 347 of flint glass or the like; read/write gaps 351 to 353 composed of a thin film of $SiO_2$, $Al_2O_3$ or the like by a sputtering, a vapor deposition or the like; non-magnetic insulation layers 361 and 362 which are formed between three magnetic heads and composed of the same material as the read/write gaps 351 to 353; structural parts 311 and 312 of the C core parts, composed of ceramic material such as calcium titanate, barium titanate or the like; and structural parts 324 and 325 of the I core parts, composed of the same material as the structural parts 311 and 312. In FIG. 97, read/write coils wound around the C core legs are omitted for brevity.

In this embodiment, the head positioning operation by using the tracking servo is carried out by the two magnetic heads located in both the sides. The reproducing signals of the two heads are compared with each other, and the heads are moved to the positions where the signal levels of the two heads are equal to perform the on-track operation. At this time, only the data information is recorded on the central track and the information of the signal comparison for the tracking servo is recorded on the parts of the two sides data tracks. When the data information is recorded or reproduced onto or out of the magnetic recording medium, three magnetic heads of the triple structure are independently used and the data information is separately recorded on three parallel data tracks. At this time, when the cross talk exists, the reading error occurs and it is not preferable. Hence, according to the present invention, a value obtained by dividing the product of the track width (the narrower track width when the track widths are different) of one of the three heads and the thickness of the non-magnetic insulation layer by the product of the gap length and the length of the non-magnetic insulation layer is set to at least 10. In this case, when the magnetic permeability of the head core is at least 5000, the cross talk of at most –20 dB can be obtained.

Next, the producing method of the combined magnetic head in the twenty first embodiment shown in FIG. 97 will now be described in connection with FIGS. 98 to 115.

Figure 98:
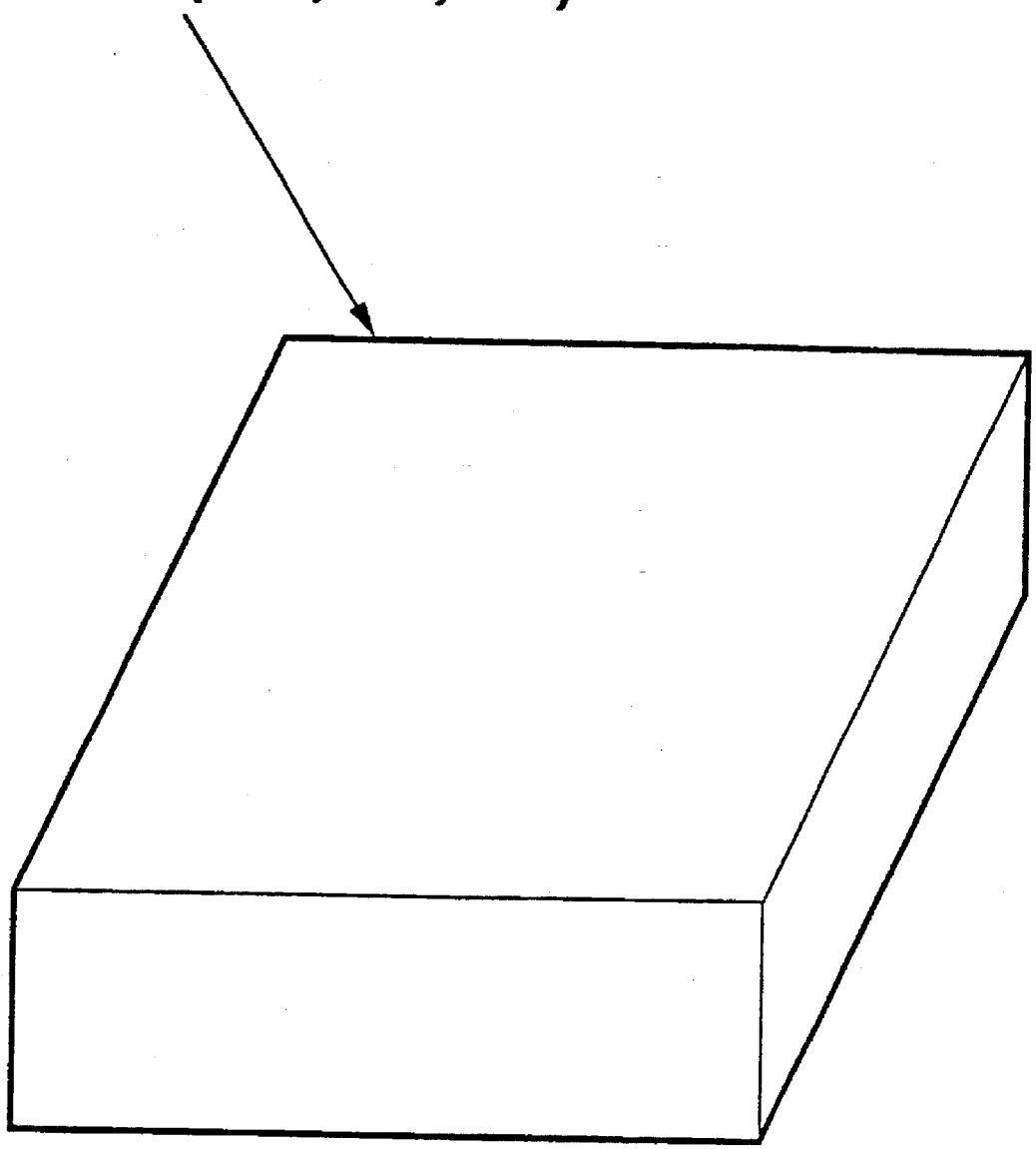
FIGS. 98 to 115 are schematic views showing a producing method of the combined magnetic head shown in FIG. 97 and FIG. 116.

First, in FIG. 98, a ceramic material such as calcium titanate, barium titanate or the like is finished to the desired dimension by a grinding processing, a lapping processing and the like to obtain a ceramic piece.

Figure 99:
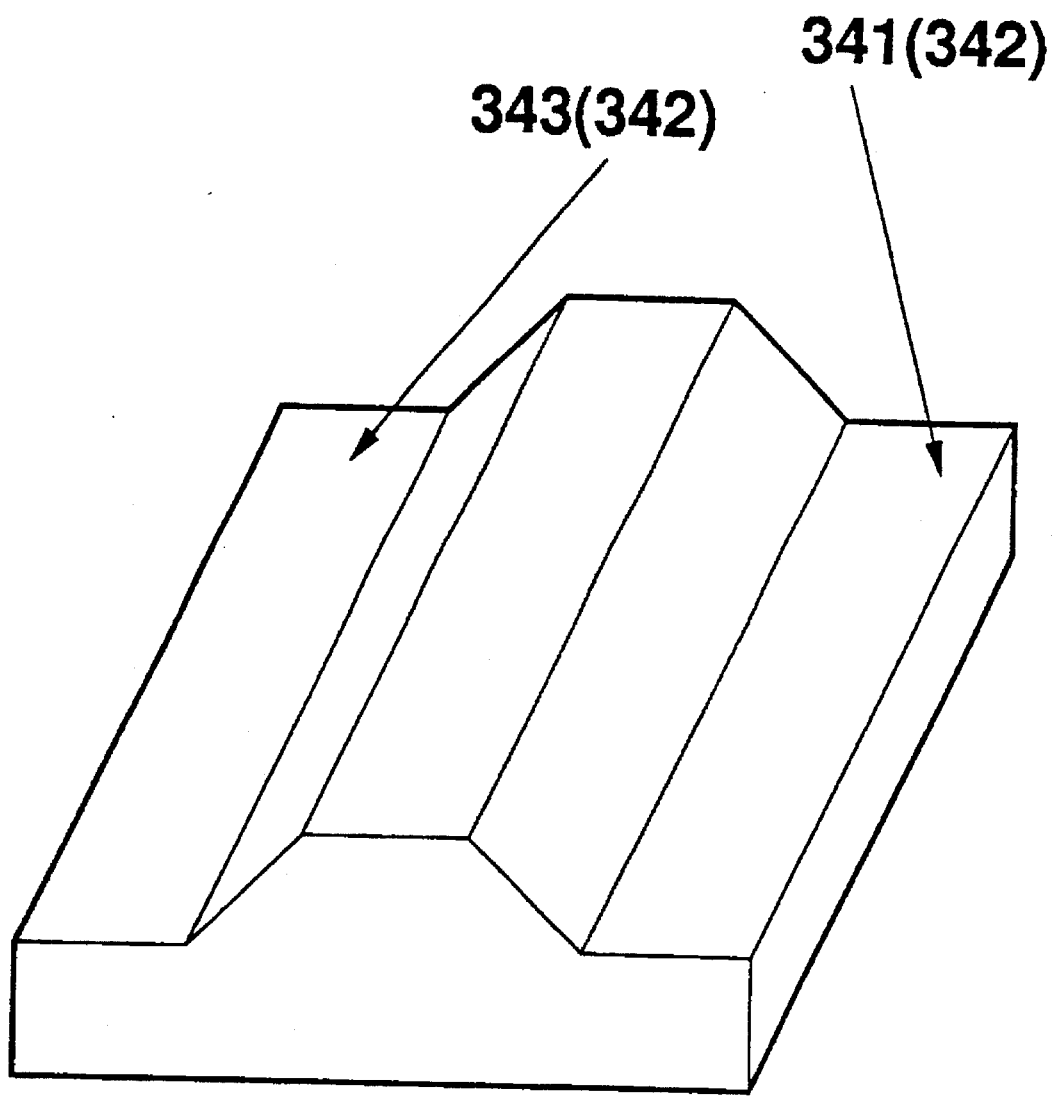

In FIG. 99, two separation grooves among adjacent heads are formed in the ceramic piece by a cutting operation.

Figure 100:
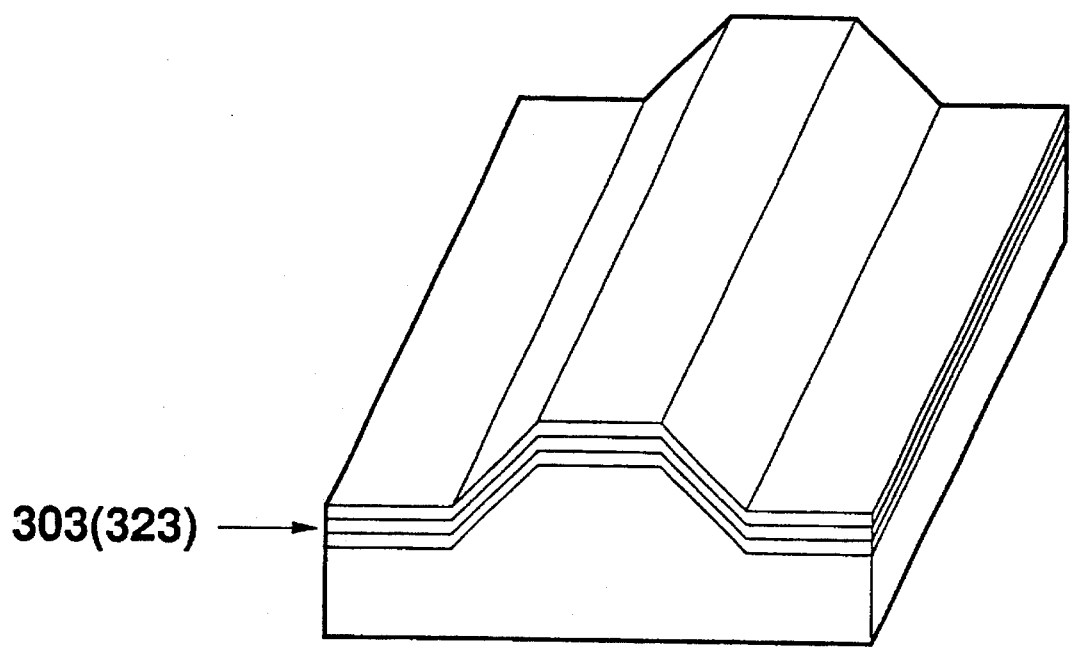

In FIG. 100, metallic magnetic multi-layer films of the high saturation flux density and the superior high frequency magnetic property rather than the Mn—Zn ferrite are formed on the surface of the ceramic piece by using a thin film formation technique such as a sputtering.

Figure 101:
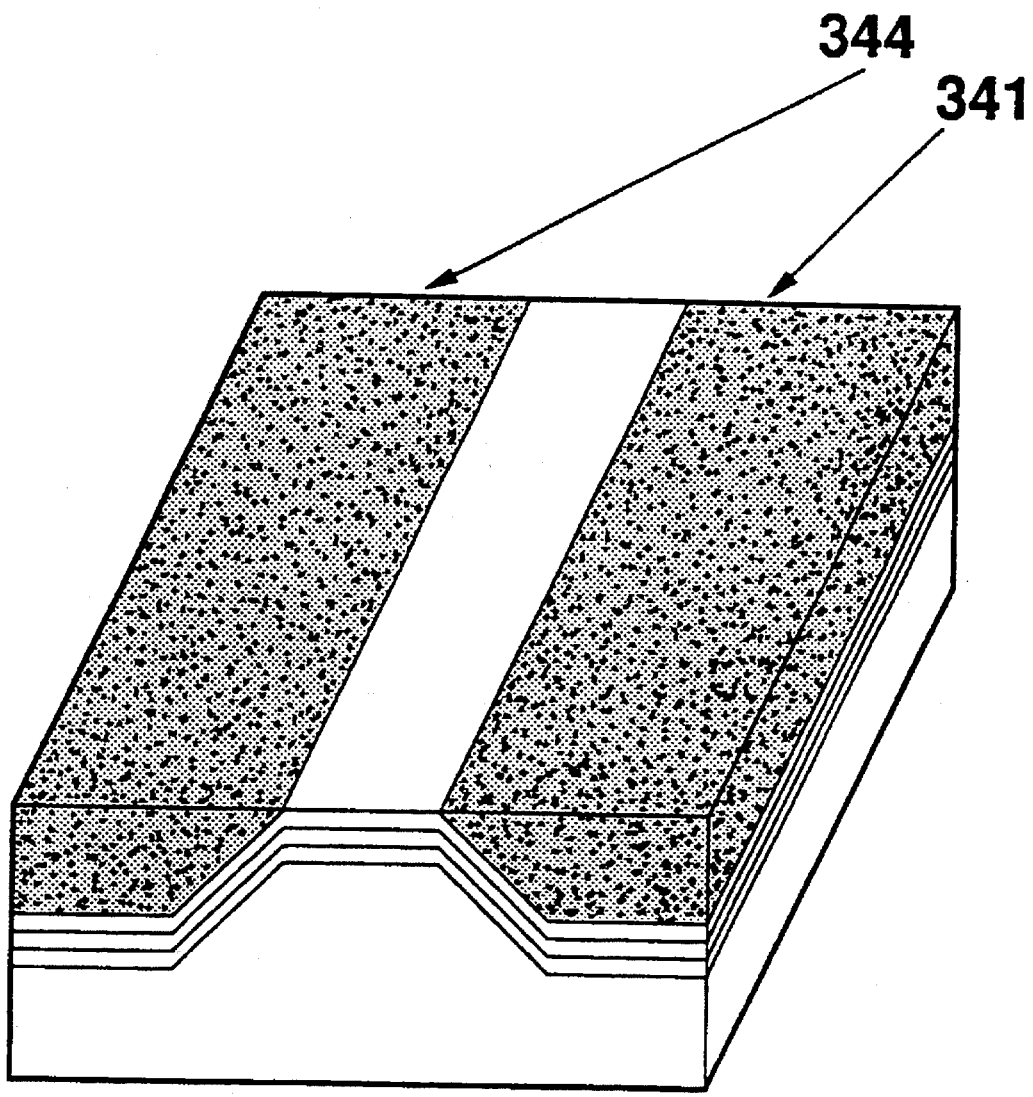

In FIG. 101, glass is molded in the separation grooves of the ceramic piece formed with the metallic magnetic multi-layer films, and the excess glass is removed by the lapping processing.

Figure 102:
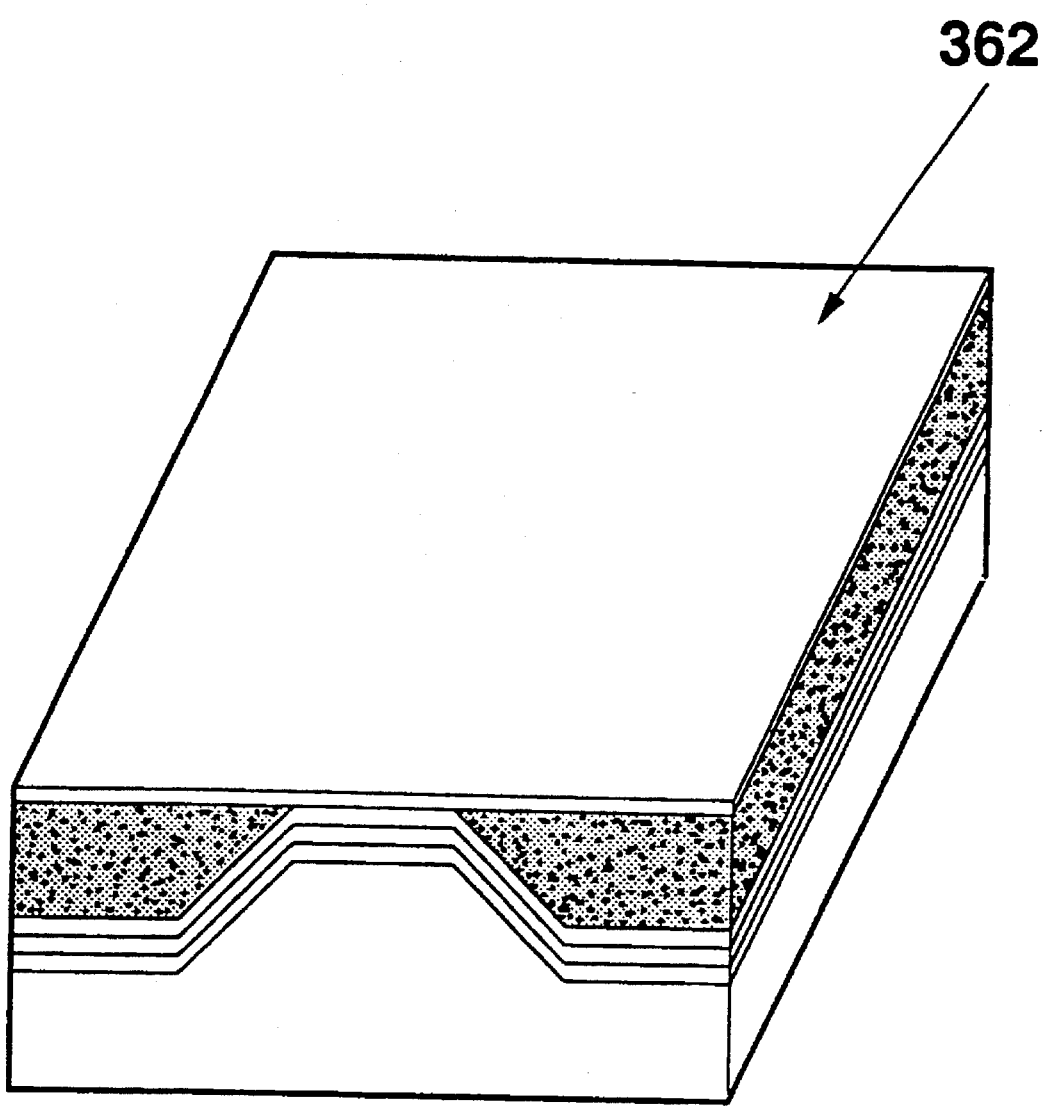

In FIG. 102, a non-magnetic insulation layer film for magnetically separating the heads is formed on the surface of the ceramic piece.

Figure 103:
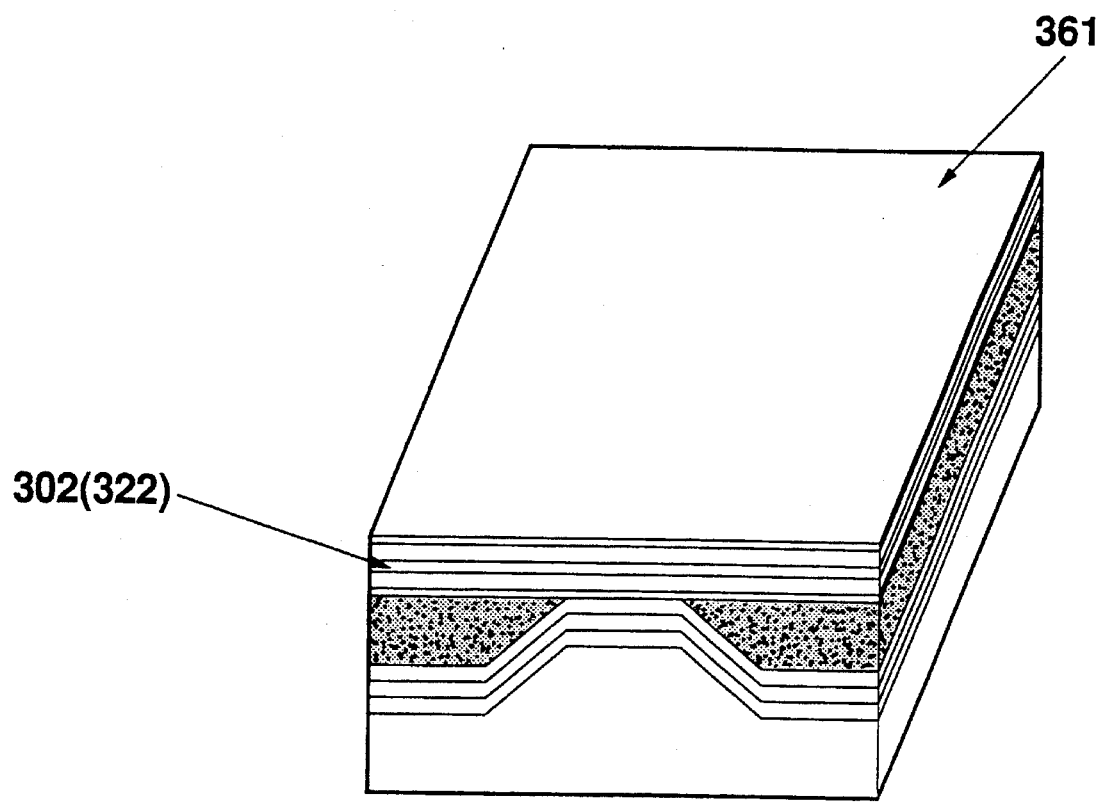

In FIG. 103, a metallic magnetic multi-layer film and another non-magnetic insulation layer film are consecutively formed on the surface of the ceramic piece.

Figure 104:
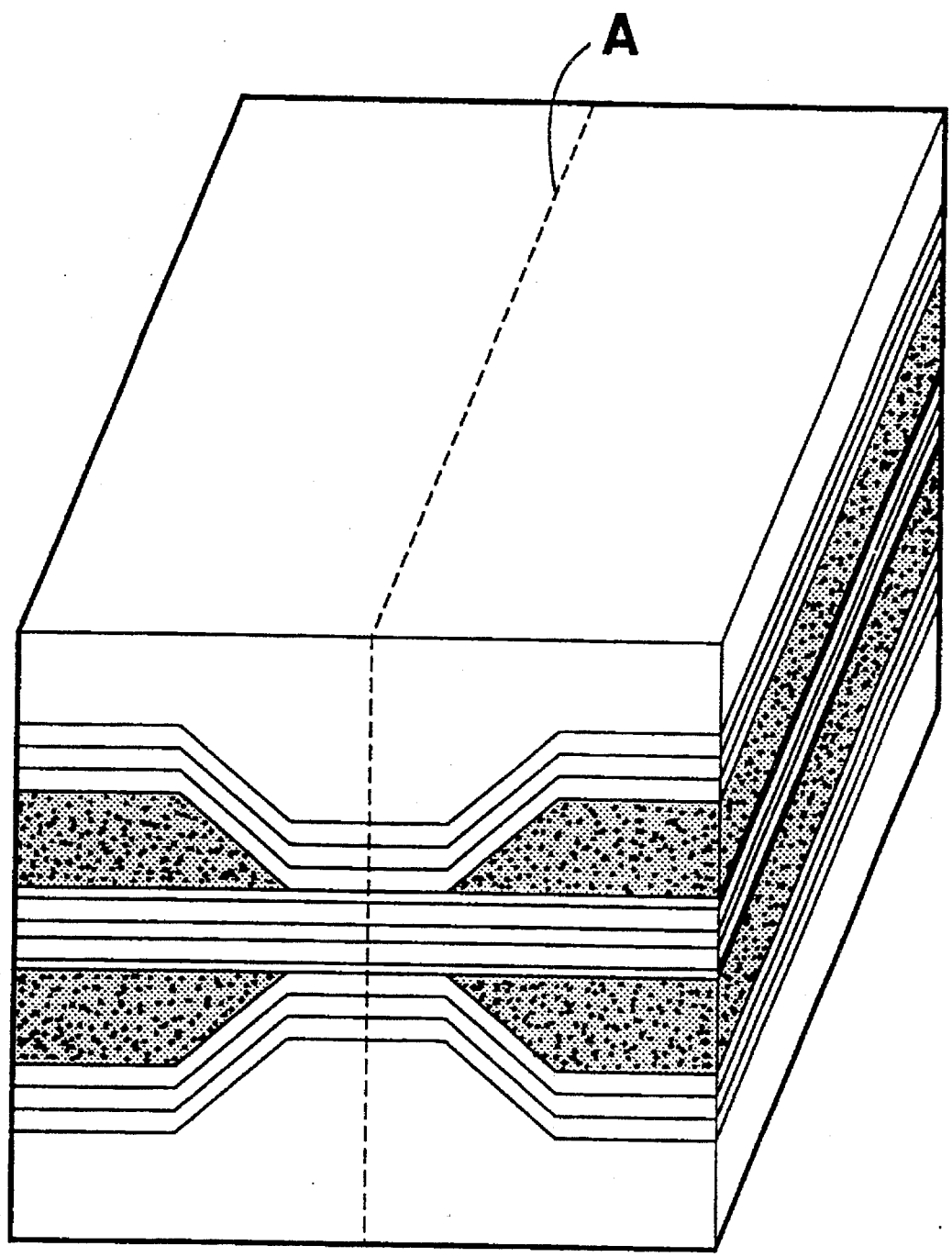

In FIG. 104, the pieces obtained in the steps shown in FIGS. 101 and 103 are combined so as to contact the surfaces thereof, and the temperature is raised to weld the glass to integrate the pieces.

Figure 105:
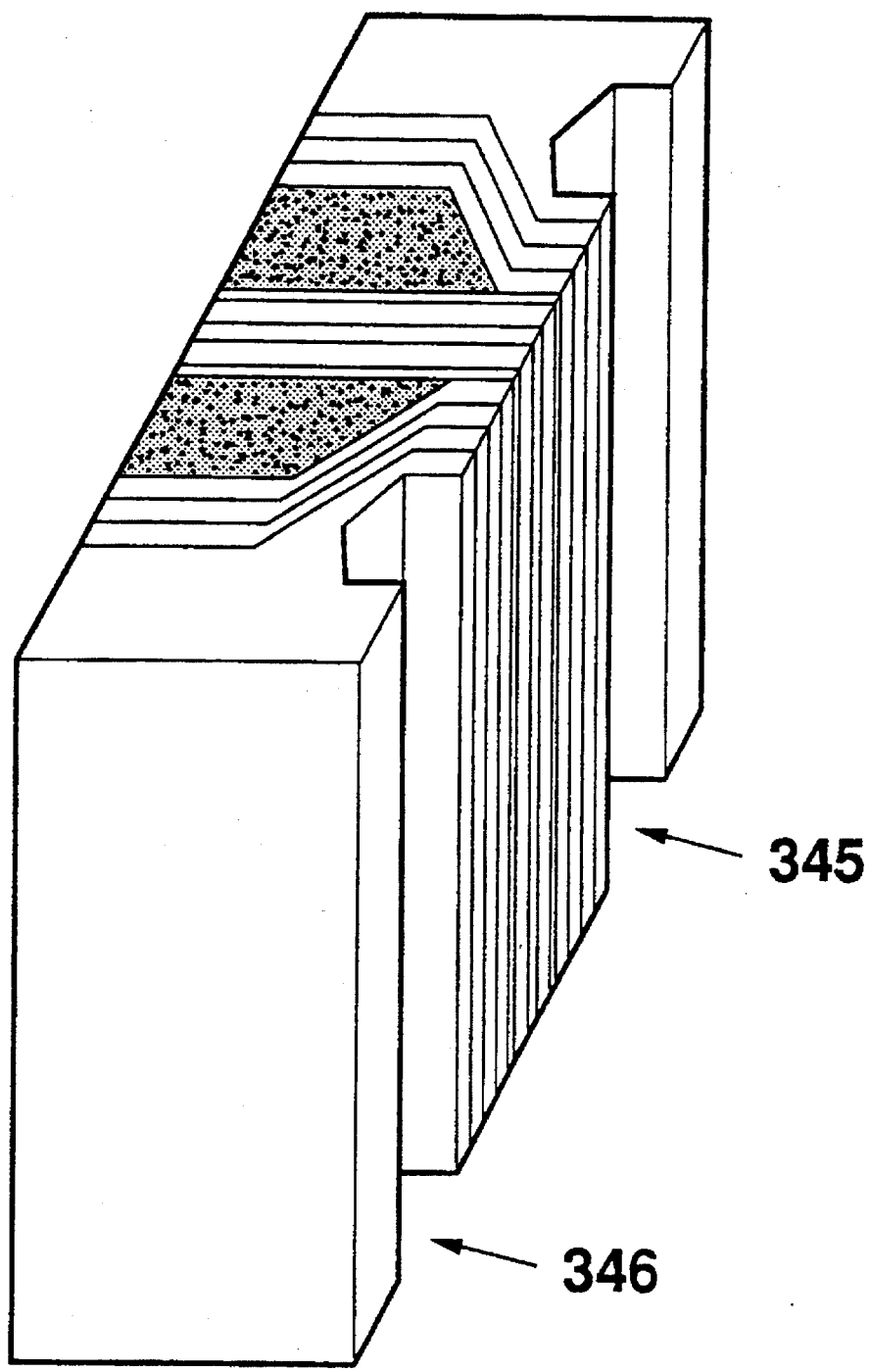
Figure 106:
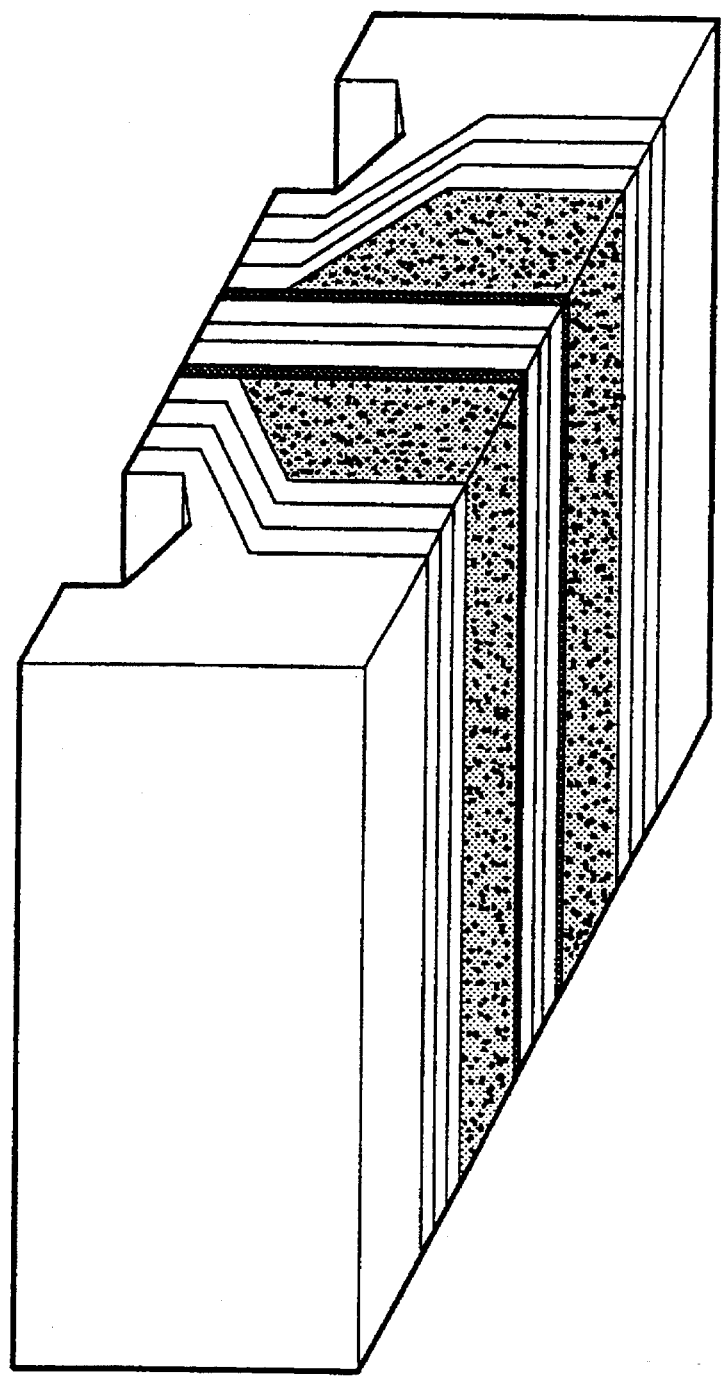

In FIG. 105, the obtained block is cut into two blocks along a broken line A shown in FIG. 104, and two glass insertion grooves 345 and 346 are formed in the blocks. FIG. 106 shows the block shown in FIG. 105, seen from another angle.

Figure 107:
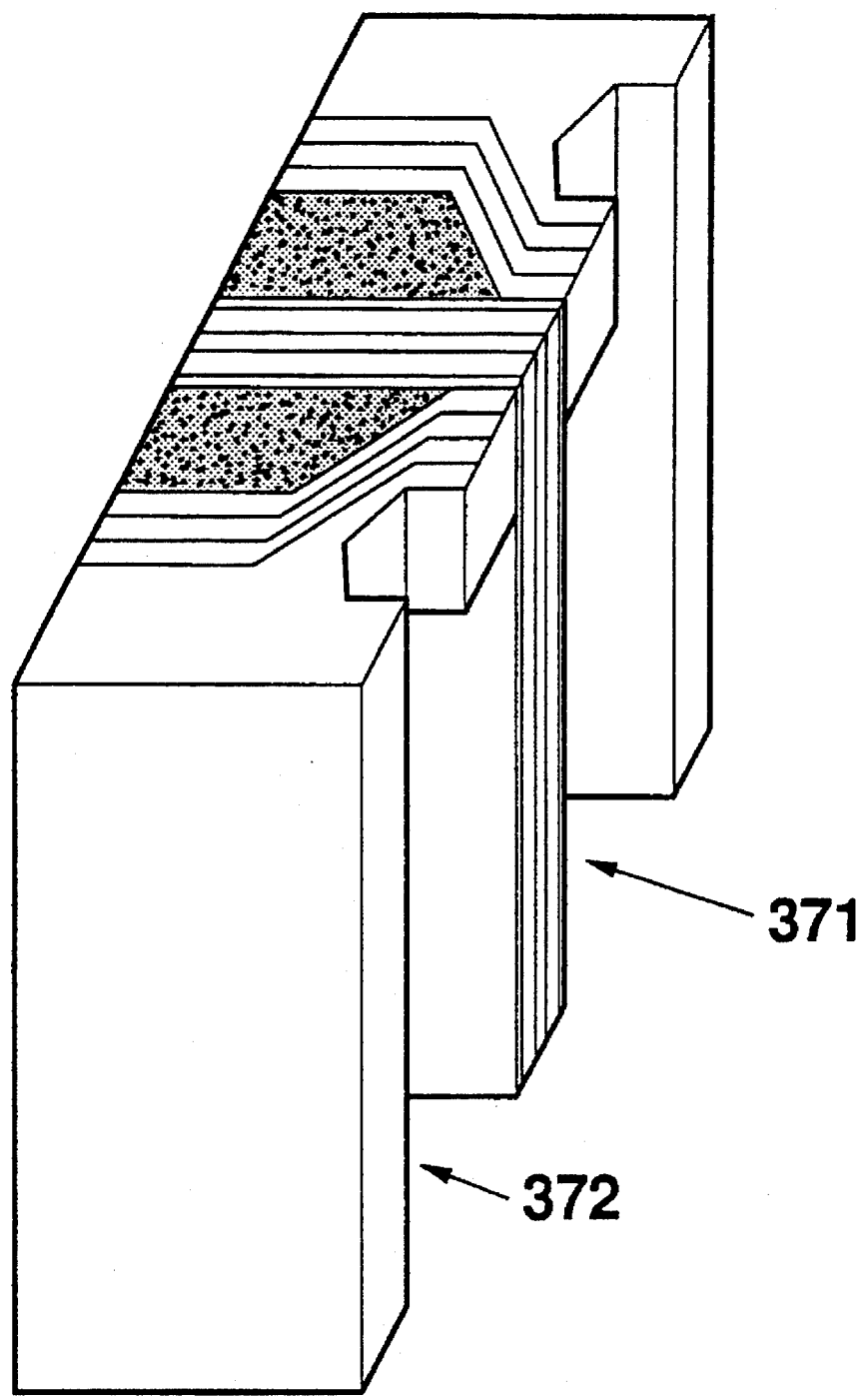
Figure 108:
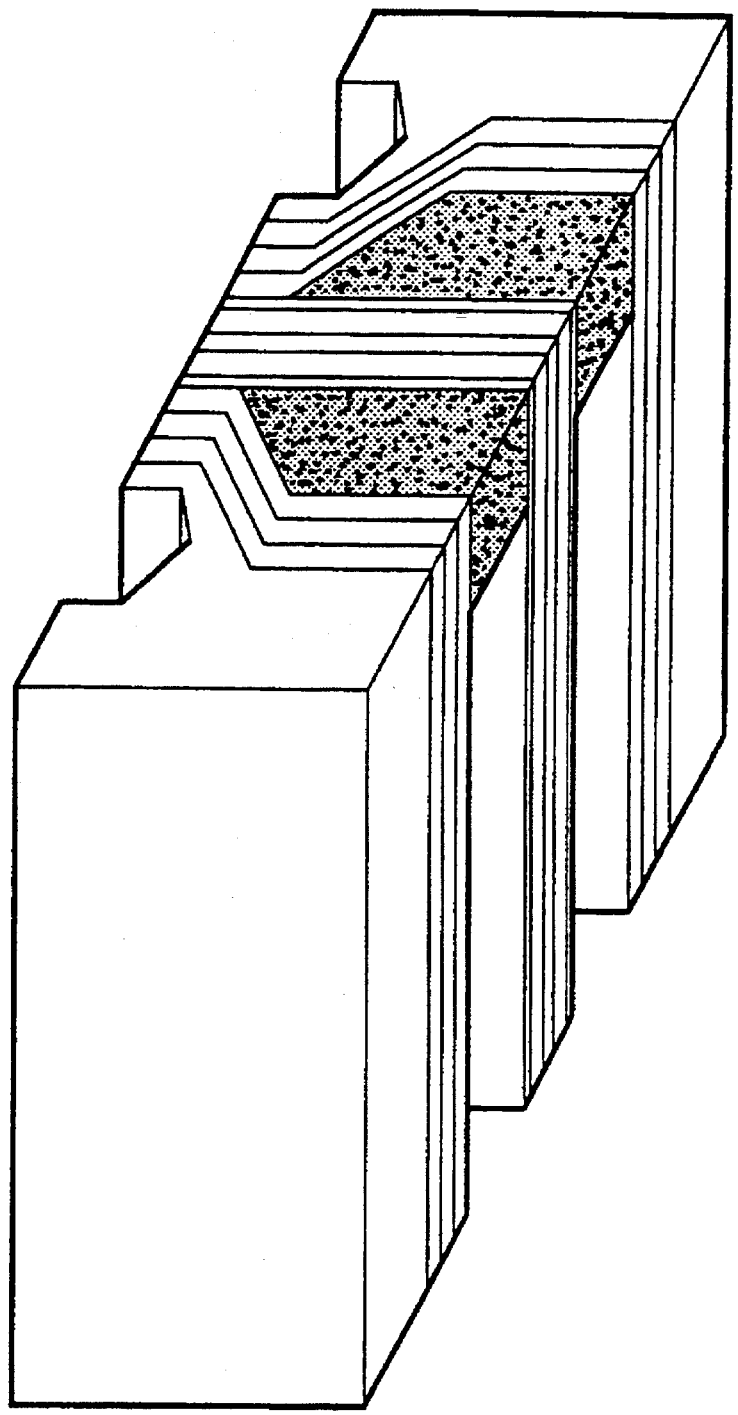

In FIGS. 107 and 108, read/write coil insertion grooves 371 and 372 are formed in one block.

Figure 109:
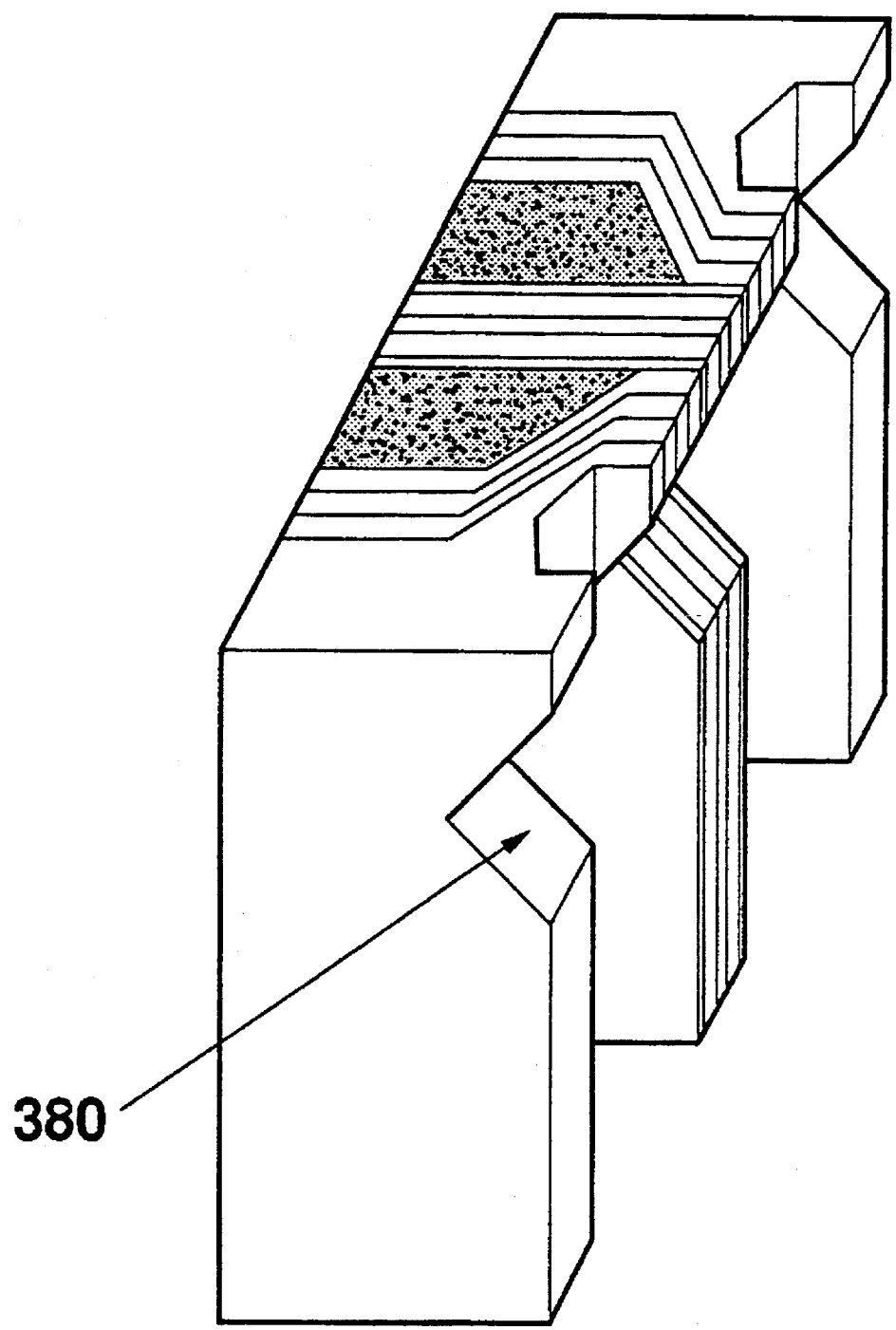

In FIG. 109, a V-shaped groove 380 for inserting a glass rod is formed in the block after the step shown in FIGS. 107 and 108.

Figure 110:
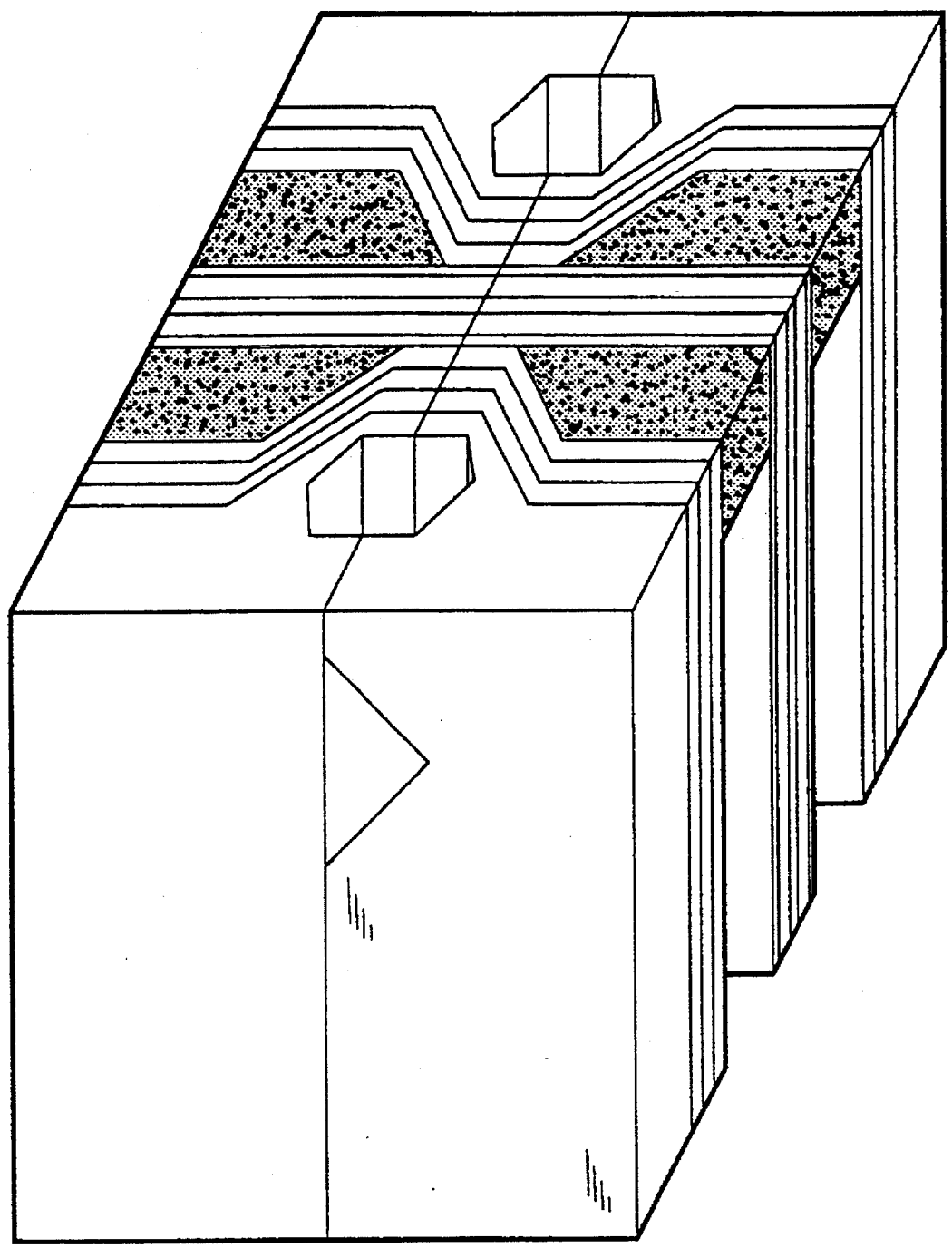

In FIG. 110, the blocks shown in FIGS. 107 and 109 are combined.

Figure 111:
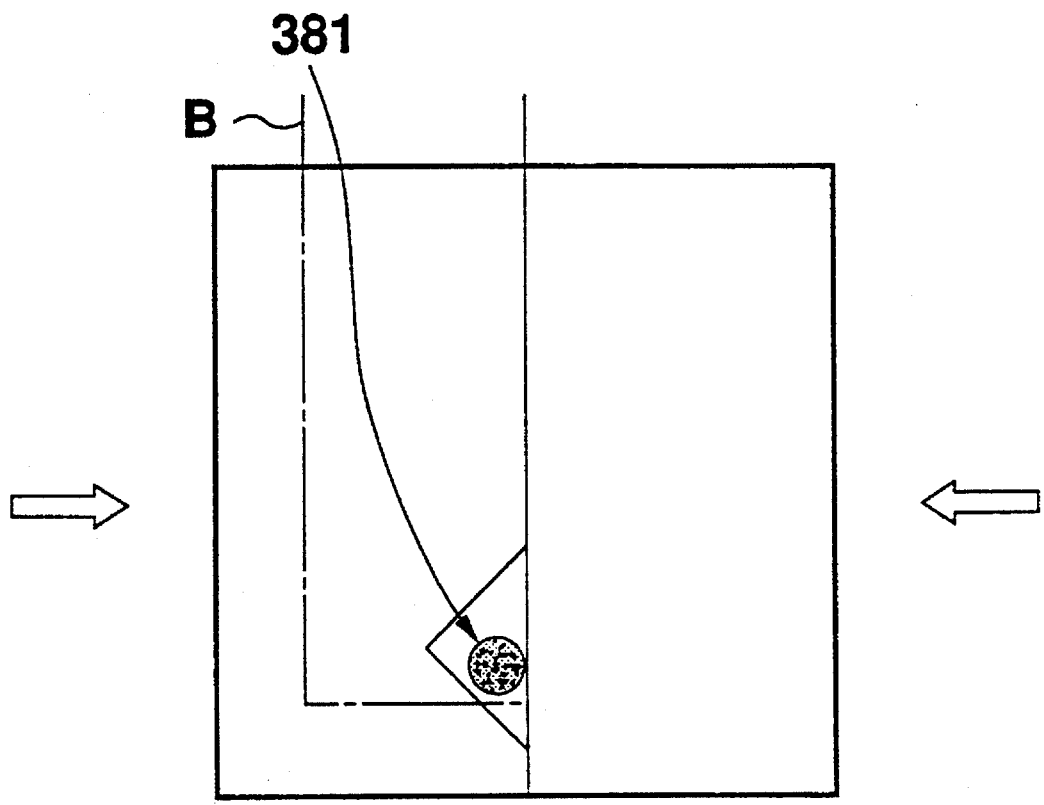

In FIG. 111, the glass rod is inserted in the V-shaped groove 380 of the combined blocks, and while loads are applied in directions indicated by arrows, the temperature is raised to weld and integrate the blocks.

Figure 112:
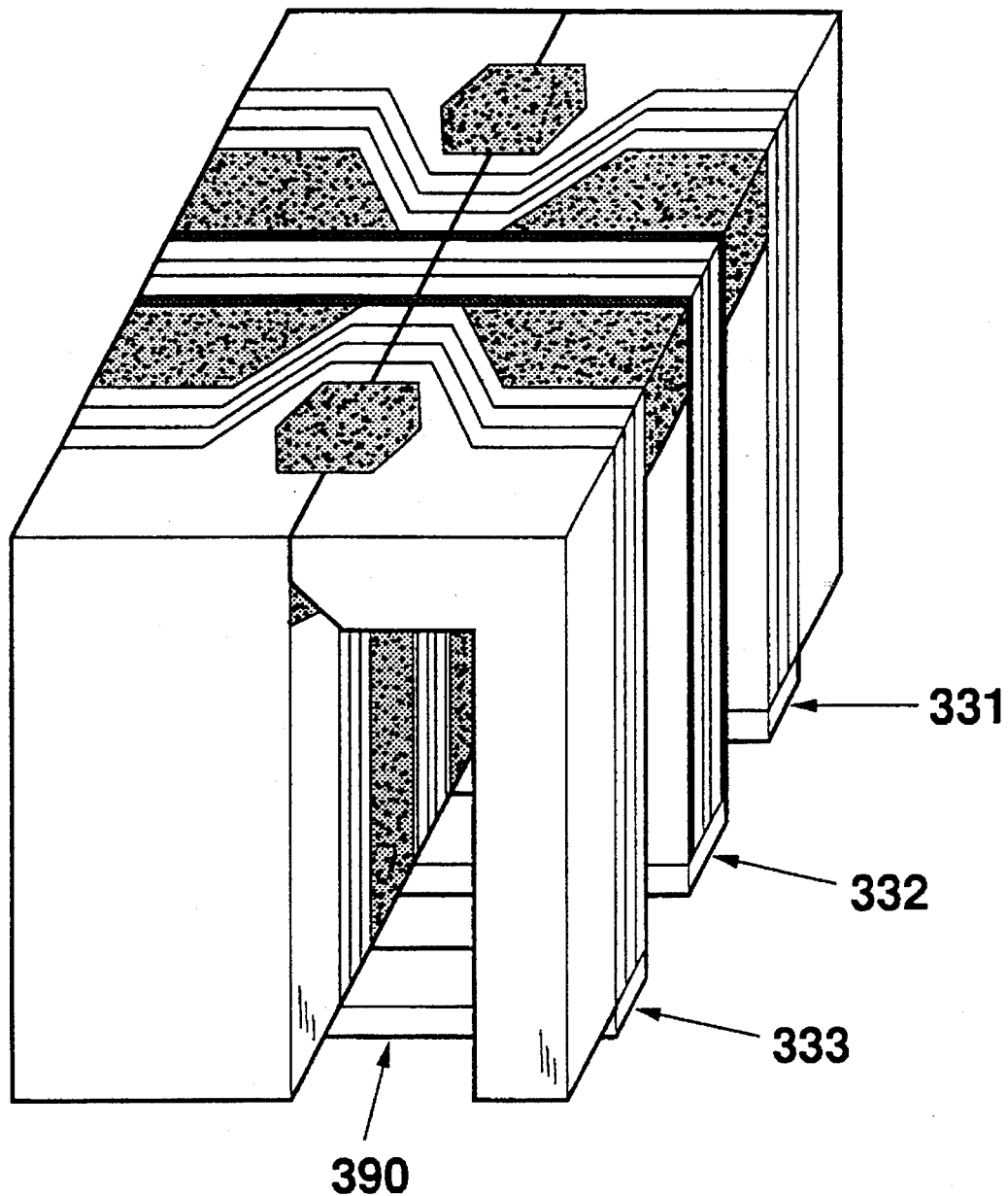

In FIG. 112, a read/write coil insertion groove 390 is formed along one-dotted line B shown in FIG. 111. Then, back bars 331, 332 and 333 for magnetically shunting the C core legs are attached to the C core legs to obtain a combined magnetic head shown in FIG. 21.

Figure 113:
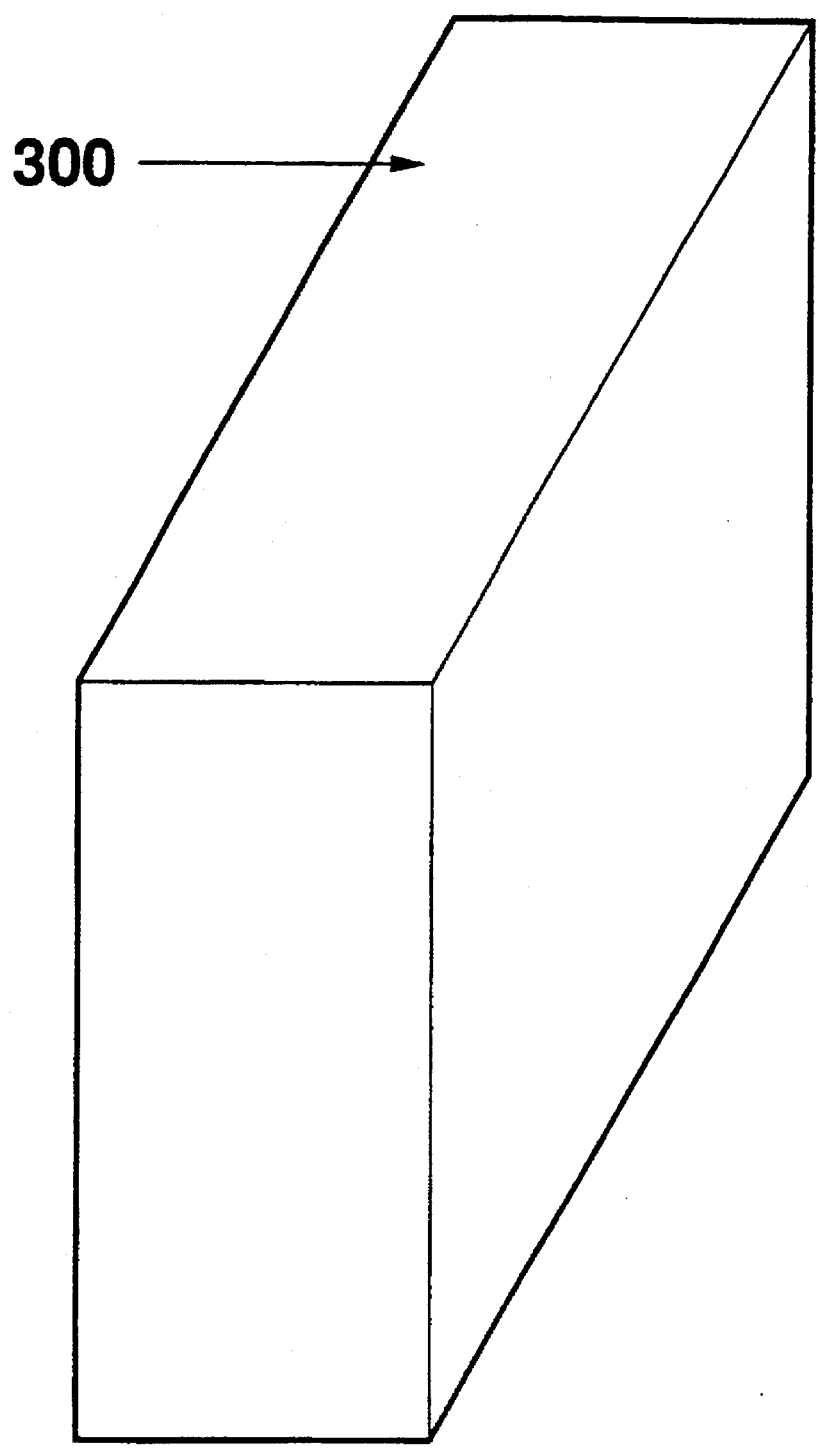
Figure 116:
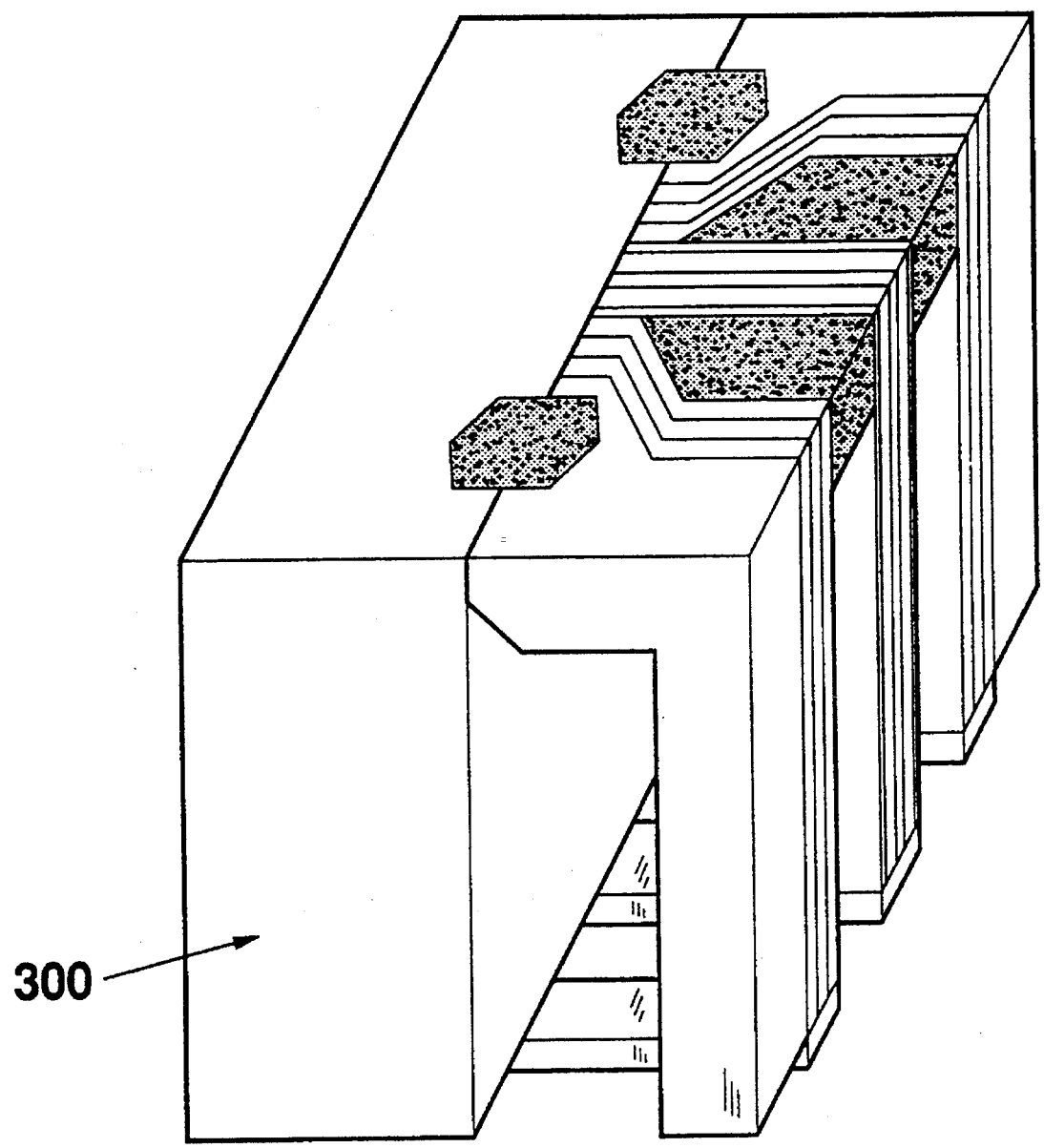
FIG. 116 is a perspective view of a combined magnetic head according to a twenty second embodiment of the present invention.

In FIG. 113, a metallic oxide material such as Mn—Zn ferrite is finished in the same manner as described above to obtain a core block for forming an I core leg of a combined magnetic head in the twenty second-embodiment shown in FIG. 116.

Figure 114:
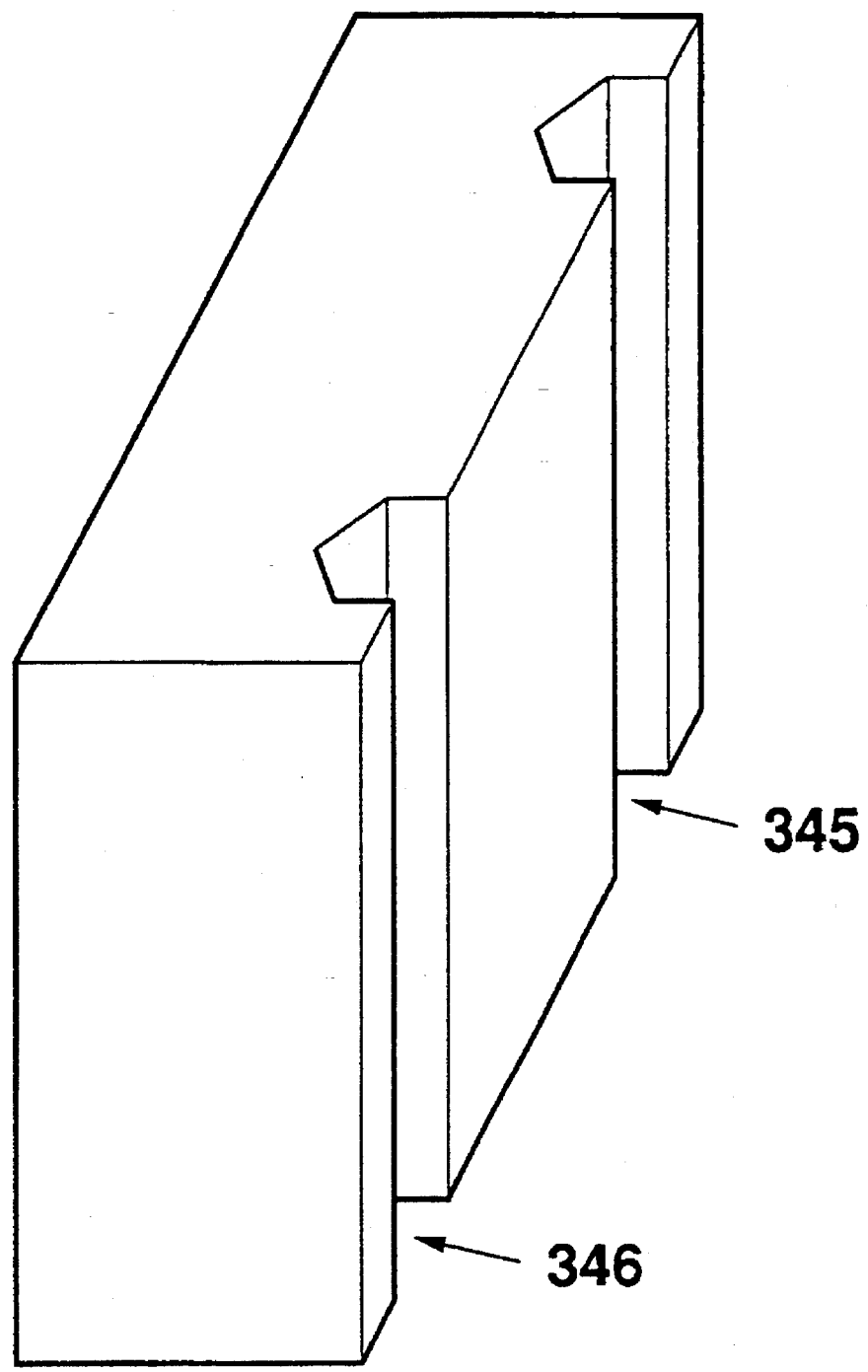

In FIG. 114, glass insertion grooves 345 and 346 are formed in the core block in the same manner as described above.

Figure 115:
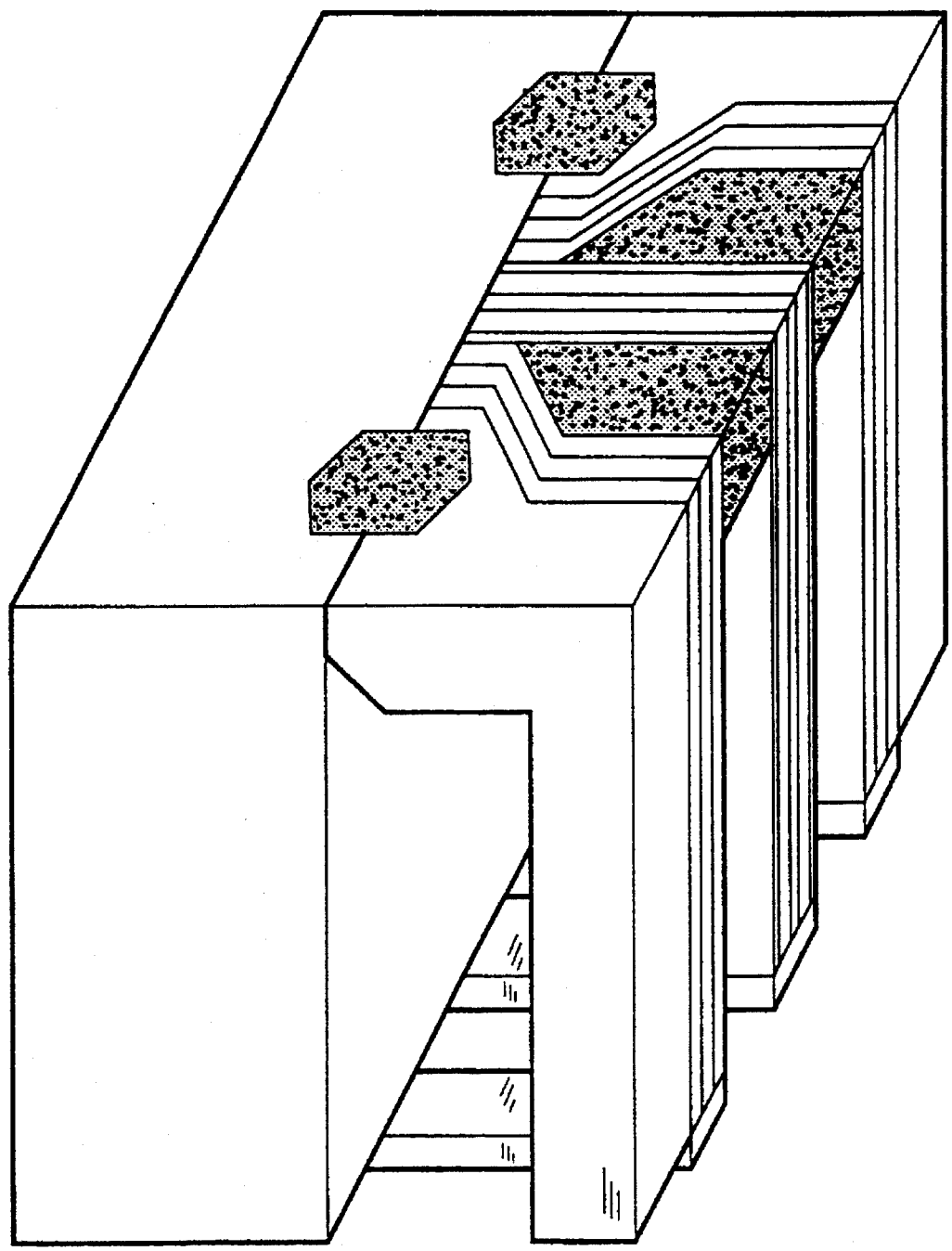

In FIG. 115, the block shown in FIG. 109 and the core block shown in FIG. 114 are combined, and the combined block is processed in the same manner as the steps shown in FIGS. 110 and 111 to obtain the combined magnetic head in the twenty second embodiment shown in FIG. 116.

Next, the twenty second embodiment according to the present invention will now be described.

FIG. 116 shows the twenty second embodiment of a combined magnetic head according to the present invention. In this embodiment, an I core leg part 300 is composed of a metallic oxide such as a ferrite. According to the present invention, the I core leg part can be integrally formed with the C core leg part.

In this case, the recording efficiency depends on the intensity of the magnetic field of the head gap part on the output side of the medium, and thus the C core leg part composed of the metallic magnetic multi-layer film of the high saturation flux density should be located on the output side of the medium.

Next, the twenty third embodiment according to the present invention will now be described.

Figure 117:
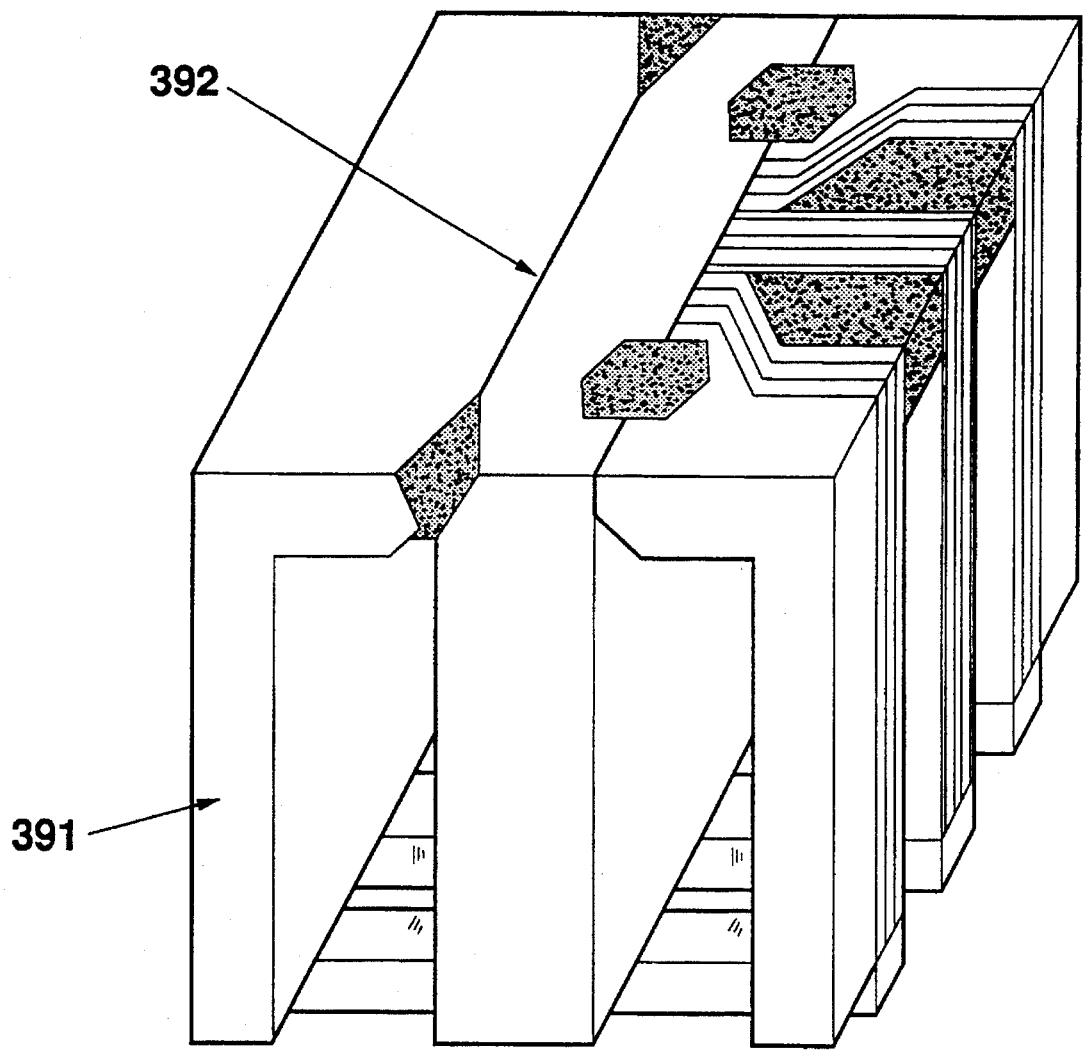
FIG. 117 is a perspective view of a combined magnetic head of an in-line gap triple structure with an erase head according to a twenty third embodiment of the present invention.

FIG. 117 shows the twenty third embodiment of a combined magnetic head according to the present invention. Although the combined magnetic head includes only the read/write head in the twenty first and twenty second embodiments, in this embodiment, an erase head 391 of the metallic oxide such as ferrite with a track width of approximately double of the sum of the track widths of the three read/write heads of the triple core head is attached to the front side of the combined magnetic head shown in FIG. 116. This combined magnetic head with the erase head is included in the present invention.

In this case, the sum of the track widths of the three read/write heads is set to the track width of the the head of the current low density 1 MB, 2 MB and 4 MB drive, and read/write coils of the three heads are connected in series so as to operate as a single head and to function as a lower compatible drive.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A combined magnetic head for recording and reproducing magnetic information on a magnetic recording medium for use in a magnetic recording and reproducing apparatus, comprising:

an I core body;

a first core half body arranged in relation to said I core body to form a first magnetic circuit with said I core body, a portion of said first core half body being spaced away from a first portion of said I core body to define a first read/write gap;

a second core half body arranged in relation to said I core body to form a second magnetic circuit with said I core body, a portion of said first core half body being spaced away from a second portion of said I core body to define a second read/write gap, said first and second read/write gaps being aligned with one another along a straight line;

a first glass member interposed between the I core body and the first core half body at a position laterally adjacent said first read/write gap;

a second glass member interposed between the I core body and the second core half body at a position laterally adjacent said second read/write gap;

first and second coils wound around the first and second core half bodies, respectively;

a non-magnetic thin film insulation layer interposed between the first and second core half bodies and substantially perpendicularly with respect to said read/write gaps; and a third glass member interposed between a portion of the first core half body and a portion of the second core half body such that said non-magnetic thin film insulation layer extends between one end of said third glass member and one end of each of said first and second read/write gaps.

2. The combined magnetic head according to claim 1, wherein said non-magnetic thin film insulation layer has a thickness of less than 5 μm.

3. The combined magnetic head according to claim 1, wherein said first core body comprises a substantially L-shaped member and a first back core member forming a magnetic path between said first substantially L-shaped member and said I core body.

4. The combined magnetic head according to claim 1, wherein said second core body comprises a substantially L-shaped member and a second back core member forming a magnetic path between said second substantially L-shaped member and said I core body.

5. The combined magnetic head according to claim 1, wherein said first and second read/write gaps together define a continuous linear gap, and said non-magnetic thin film layer is arranged such that a linear projection of said non-magnetic thin film layer divides said continuous gap into said first and second read/write gaps.

6. The combined magnetic head according to claim 5, wherein the first read/write gap and the second read/write gap have differing widths, and wherein the non-magnetic insulation layer, the first read/write gap, the second read/write gap, and the continuous gap are dimensioned to satisfy the relation:

$$\frac{W_{R/W} \times T_{Ins}}{L_{CG} \times L_{Ins}} \geq 10$$

where $W_{R/W}$ is the width of the narrower of the first and second read/write gaps, $T_{Ins}$ is the thickness of the non-magnetic insulating layer, $L_{CG}$ is the width of the continuous gap, and $L_{Ins}$ is the length of the non-magnetic insulating layer.

7. The combined magnetic head according to claim 5, wherein the first read/write gap and the second read/write gap have the same width, and wherein the non-magnetic insulation layer, the first read/write gap, the second read/write gap, and the continuous gap are dimensioned to satisfy the relation:

$$\frac{W_{R/W} \times T_{Ins}}{L_{CG} \times L_{Ins}} \geq 10$$

where $W_{R/W}$ is the width of the first and second read/write gaps, $T_{Ins}$ is the thickness of the non-magnetic insulating layer, $L_{CG}$ is the width of the continuous gap, and $L_{Ins}$ is the length of the non-magnetic insulating layer.

8. A combined magnetic head for recording and reproducing magnetic information on a magnetic recording medium for use in a magnetic recording and reproducing apparatus, comprising:

an I core body;

a first core half body arranged in relation to said I core body to form a first magnetic circuit with said I core body, a portion of said first core half body being spaced away from a first portion of said I core body to define a first read/write gap;

a second core half body arranged in relation to said I core body to form a second magnetic circuit with said I core body, a portion of said first core half body being spaced away from a second portion of said I core body to define a second read/write gap, said first and second read/write gaps being aligned with one another along a straight line;

a first glass member interposed between the I core body and the first core half body at a position laterally adjacent said first read/write gap;

a second glass member interposed between the I core body and the second core half body at a position laterally adjacent said second read/write gap;

first and second coils wound around the first and second core half bodies, respectively;

a non-magnetic thin film insulation layer interposed between the first and second core half bodies at a first position and substantially perpendicularly with respect to said read/write gaps intersecting one end of each of said first and second read/write gaps; and a third glass member interposed between a portion of the first core half body not at said first position, said portion the first core half body not being wound with a coil and not having a coil inserted therein, and a portion of the second core half body not at said first position, said portion the second core half body not being wound with a coil and not having a coil inserted therein.

9. The combined magnetic head according to claim 8, wherein said non-magnetic thin film insulation layer has a thickness of less than 5 μm.

10. The combined magnetic head according to claim 8, wherein said first core body comprises a substantially L-shaped member and a first back core member forming a magnetic path between said first substantially L-shaped member and said I core body.

11. The combined magnetic head according to claim 8, wherein said second core body comprises a substantially L-shaped member and a second back core member forming a magnetic path between said second substantially L-shaped member and said I core body.

12. The combined magnetic head according to claim 8, wherein said first and second read/write gaps together define a continuous linear gap, and said non-magnetic thin film layer is arranged such that a linear projection of said non-magnetic thin film layer divides said continuous gap into said first and second read/write gaps.

13. The combined magnetic head according to claim 12, wherein the first read/write gap and the second read/write gap have differing widths, and wherein the non-magnetic insulation layer, the first read/write gap, the second read/ write gap, and the continuous gap are dimensioned to satisfy the relation:

$$\frac{W_{R/W} \times T_{Ins}}{L_{CG} \times L_{Ins}} \geq 10$$

where $W_{R/W}$ is the width of the narrower of the first and second read/write gaps, $T_{Ins}$ is the thickness of the non-magnetic insulating layer, $L_{CG}$ is the width of the continuous gap, and $L_{Ins}$ is the length of the non-magnetic insulating layer.

14. The combined magnetic head according to claim 12, wherein the first read/write gap and the second read/write gap have the same width, and wherein the non-magnetic insulation layer, the first read/write gap, the second read/write gap, and the continuous gap are dimensioned to satisfy the relation:

$$\frac{W_{R/W} \times T_{Ins}}{L_{CG} \times L_{Ins}} \geq 10$$

where $W_{R/W}$ is the width of the first and second read/write gaps, $T_{Ins}$ is the thickness of the non-magnetic insulating layer, $L_{CG}$ is the width of the continuous gap, and $L_{Ins}$ is the length of the non-magnetic insulating layer.

* * * * *